US006583800B1

United States Patent
Ridgley et al.

(10) Patent No.: US 6,583,800 B1
(45) Date of Patent: Jun. 24, 2003

(54) METHOD AND DEVICE FOR FINDING, COLLECTING AND ACTING UPON UNITS OF INFORMATION

(76) Inventors: Brad Ridgley, 6626 Boulevard View, Alexandria, VA (US) 22307; Samuel A. Lucente, II, 108 Primrose Way, Palo Alto, CA (US) 94303

( * ) Notice: Subject to any disclaimer, the term of this patent is extended or adjusted under 35 U.S.C. 154(b) by 0 days.

(21) Appl. No.: 09/353,546

(22) Filed: Jul. 14, 1999

Related U.S. Application Data

(60) Provisional application No. 60/092,804, filed on Jul. 14, 1998.

(51) Int. Cl.⁷ .................................................. G06F 3/00
(52) U.S. Cl. ....................................... 345/854; 345/802
(58) Field of Search ................................ 345/818, 767, 345/859–861, 853–855, 804–805, 708, 712–713, 744–747, 802; 707/10, 11, 200; 709/230, 231

(56) References Cited

U.S. PATENT DOCUMENTS

| | | | |
|---|---|---|---|
| 5,257,185 A | * 10/1993 | Farley et al. | ................ 345/854 |
| 5,485,175 A | * 1/1996 | Suzuki | ........................ 345/856 |
| 5,630,117 A | 5/1997 | Oren et al. | |
| 5,630,125 A | 5/1997 | Zellweger | |
| 5,638,523 A | 6/1997 | Mullet et al. | |
| 5,644,736 A | 7/1997 | Healy et al. | |
| 5,684,969 A | 11/1997 | Ishida | |
| 5,689,669 A | 11/1997 | Lynch et al. | |
| 5,701,137 A | 12/1997 | Kiernan et al. | |
| 5,720,007 A | 2/1998 | Hekmatpour | |
| 5,801,703 A | 9/1998 | Bowden et al. | |
| 5,812,134 A | 9/1998 | Pooser et al. | |
| 5,815,155 A | 9/1998 | Wolfston, Jr. | |
| 5,852,439 A | 12/1998 | Musgrove et al. | |
| 6,417,874 B2 | * 7/2002 | Bodnar | ........................ 345/854 |

* cited by examiner

*Primary Examiner*—Steven Sax
(74) *Attorney, Agent, or Firm*—Whitham, Curtis & Christofferson, P.C.

(57) ABSTRACT

An information interface and method for finding, collecting and acting upon information which has been arranged in hierarchical form. In its best mode of implementation, the interface has a display area with four components: a content area for showing units of information at a particular level in a hierarchy, a context area for showing the information node which is parent to the displayed level of units, an identity area for showing the sequence of such parents in the user's navigation history through the information relative to the currently displayed level, and a desire area for the user to collect and act upon desired units of information. The method of the invention provides two functions: one for clarification, for navigating the hierarchy of information, moving forward and backward through the nodes and branches; and a second for memorization, for collecting desired units of information and then acting upon them. The invention further provides overlay modes, using the clarification and memorization functions, for identifying properties usable for limiting content displayed during clarification, and for providing alternative choices for acting upon memorized units of information.

66 Claims, 80 Drawing Sheets

| 1 | 2 ABC | 3 DEF |
|---|---|---|
| 4 GHI | 5 JKL | 6 MNO |
| 7 PQR | 8 TUV | 9 WXYZ |
| * | 0 OPER | # |

FIG. 8H

| 1 | 2 ABC | 3 DEF |
|---|---|---|
| 4 GHI | 5 JKL | 6 MNO |
| 7 PQR | 8 TUV | 9 WXYZ |
| * | 0 OPER | # |

FIG. 8G

DENOTES TOUCH ACTIVATED AREA

| | interactive computer net. INC. | NORTHERN VIRGINIA YELLOW PAGE DIRECTORY |
|---|---|---|
| ACCOUNTANTS TO AUTOMOBILES | BANKS TO CHIROPRACTERS | CHURCHES TO DENTISTS |
| DRAPERIES TO FLORISTS | FURNITURE TO HOSPITALS | IMPORTERS TO JEWELERS |
| KITCHENS TO LAWYERS | LIGHTING TO PET SHOPS | PHOTOGRAPHERS  ZOOS |

— 903

DENOTES TOUCH ACTIVATED AREA

DENOTES TOUCH ACTIVATED AREA

DENOTES TOUCH ACTIVATED AREA

METHOD AND DEVICE FOR FINDING, COLLECTING AND ACTING UPON UNITS OF INFORMATION

This application claims the benefit of Provisional Application No. 60/092,804 entitled Method and Device for Packaging and Dispensing Units of Information filed on Jul. 14, 1998.

BACKGROUND OF THE INVENTION

1. Field of the Invention

The present invention generally relates to information appliances, and more particularly to user interfaces for finding, collecting and acting upon hierarchically structured information.

2. Background Description

Since the advent of the personal computer there have been many efforts to improve the user interface, to make it easier for human beings to find the information they need and do with it what they want in an efficient manner.

Initial command line approaches were replaced by graphical user interfaces (GUI's), as demonstrated at Xerox's Palo Alto Research Center (PARC) with the Xerox 8010 "Star" Information System in the 1970's and implemented by the Apple Macintosh and by Microsoft Windows operating system in the 1980's and by the Mosaic graphical web browser for the Internet in the 1990's. These efforts have included graphical tools such as tool bars, pull down menus, pointers, icons, windows and desktops. These efforts are mostly task-oriented interfaces for desktop environments.

Other efforts have been directed toward information visualization techniques for handling large volumes of hierarchically arranged data. For example, researchers at PARC have considered a three dimensional technique in "Cone Trees: Animated 3D Visualizations of Hierarchical Information" in Reaching Through Technology, CHI '91 Conference Proceedings, New Orleans, Louisiana, Apr. 2–May 2, 1991 (Association of Computing Machinery Special Interest Group in Computer-Human Interaction, 1991 ACM 0-89791-383-3/91/0004/0189), pp. 189–194. This approach includes methods for focusing on smaller parts of a complex structure.

The foregoing prior art techniques illustrate methods of expanding human capacity to "see" large amounts of information, and to peruse this information looking for patterns and particular pieces of information. But they do not integrate within their methodologies techniques for accomplishing practical results beyond information visualization and retrieval.

Furthermore, while much progress has been made, the interfaces remain much too complicated for most users, and as a result the potential for mass access to the power of the computer has not been realized. There remains a need for a simple interface that is intuitive for users who are not familiar with computers, and yet powerfully enables these users to find, collect and act upon vast quantities of information made available by computer.

SUMMARY OF THE INVENTION

It is therefore an object of the present invention to provide a more efficient means for interacting with information.

It is a further object of the invention to enable a user of information to quickly find and display information, and then to perform actions on the information.

It is also an object of the invention to seamlessly integrate computer functions and a user interface.

Another object of the invention is to provide an interface to information which is implicit and transparent, enabling the user to focus on the actual data.

It is also an object of the invention to overcome the distractions of the mechanics of manipulating the interface and limit the disruptions between human thought and computer functions.

Yet another object of the invention is to create an implicit means for navigating through information, orienting with respect to information, creating new information, and acting upon information.

A further object of the invention is to allow the human user to easily make associations between information units, group information units, and act upon information units.

It is also an object of the invention to decrease the need for conventional graphical user interface devices such as tool bars, menus and icons.

It is a further object of the invention to present information to the user in a manner that complements the user's natural thought processes about the information.

Another object of the invention is to extend to humans the power of the computer to retrieve, store and process vast amounts of information.

A further object of the invention is to provide means for handling information which are compatible with existing database means for organizing and storing information.

It is also an object of the invention to integrate information navigation and retrieval techniques with the accomplishment of practical results beyond information retrieval and visualization.

The invention provides an intuitive and simple method for packaging and dispensing a body of information which has been structured into a hierarchy of component units of information, the hierarchy being multi-hierarchical and having layers, where a unit in one layer can be related to a subordinate layer and a layer can be related to a superior unit in another layer. An information appliance is disclosed which is divided into a CONTENT area for viewing and interacting directly with the content of information units, which in the best mode implementation is further divided into a three-by-three array of content sub-areas, and a base or monitor area consisting of a CONTEXT area for identifying the immediate context of the information displayed in the content area, an IDENTITY area for identifying and storing the history of prior information contexts, and a DESIRE area for collecting and acting upon selected units of information, in accordance with the desires of the user.

The foregoing elements of an information appliance are used to implement two processes which characterize the simplicity and ease of use of the invention. One process is clarification: navigating a body of information to locate desired units of information which have been organized hierarchically. Representations of units of information—preferably graphical images and/or text—at one level under one node in the hierarchy are displayed in the content area. The user can clarify a unit of information by selecting it, in which case the representation of the selected unit will be placed in the context area and units of information giving more detail about the selected unit, at the hierarchical level immediately below, will then be displayed in the content area. The former content of the context area is added to the identity area, which keeps a history of the user's navigation. By selecting this identity area the user can go backward (with reference to the function of CLARIFICATION) up the hierarchy from a subordinate layer to a superior unit in another layer.

With each of the content sub-areas there is provided an association enabling operation of the second process: MEMORIZATION. In a typical implementation, this association is provided by graphically designating a small part of each of the content sub-areas (e.g. the upper left corner). By selecting this small part of the representation of the unit of information displayed in the content area, the selected unit is copied to the desire area where multiple units of information can be collected and then acted upon. The actions can include forming the collected units as a new subordinate layer for a unit of information within the information hierarchy, or forming a new unit of information within the information hierarchy, or routing the collected information to an external information base, such as by placing an order for selected items at a local market or ordering a custom sandwich from a local deli. For example, many typical consumer objectives can be accomplished by using overlays in accordance with the invention, overlays which themselves conform to the underlying processes of clarification and memorization.

The described methodology operates in a normal mode for reviewing a body of information, and is able to move seamlessly into an overlay mode for applying additional bodies of information which provide greater particularity with respect to the context of information units and with respect to the user's desire to act upon this information.

BRIEF DESCRIPTION OF THE DRAWINGS

The foregoing and other objects, aspects and advantages will be better understood from the following detailed description of a preferred embodiment of the invention with reference to the drawings, in which:

FIGS. 5A through 5J is a series of representations of displays on the information appliance (shown in FIG. 1), demonstrating a sequence of clarifying and memorizing functions illustrating operation of the invention.

FIGS. 8A through 8L is a series of schematics showing alternative configurations for the areas of the information appliance.

FIGS. 12L through 12P is a series of representations showing operation of the invention on a hand held organizer.

DETAILED DESCRIPTION OF A PREFERRED EMBODIMENT OF THE INVENTION

Figure 10A:
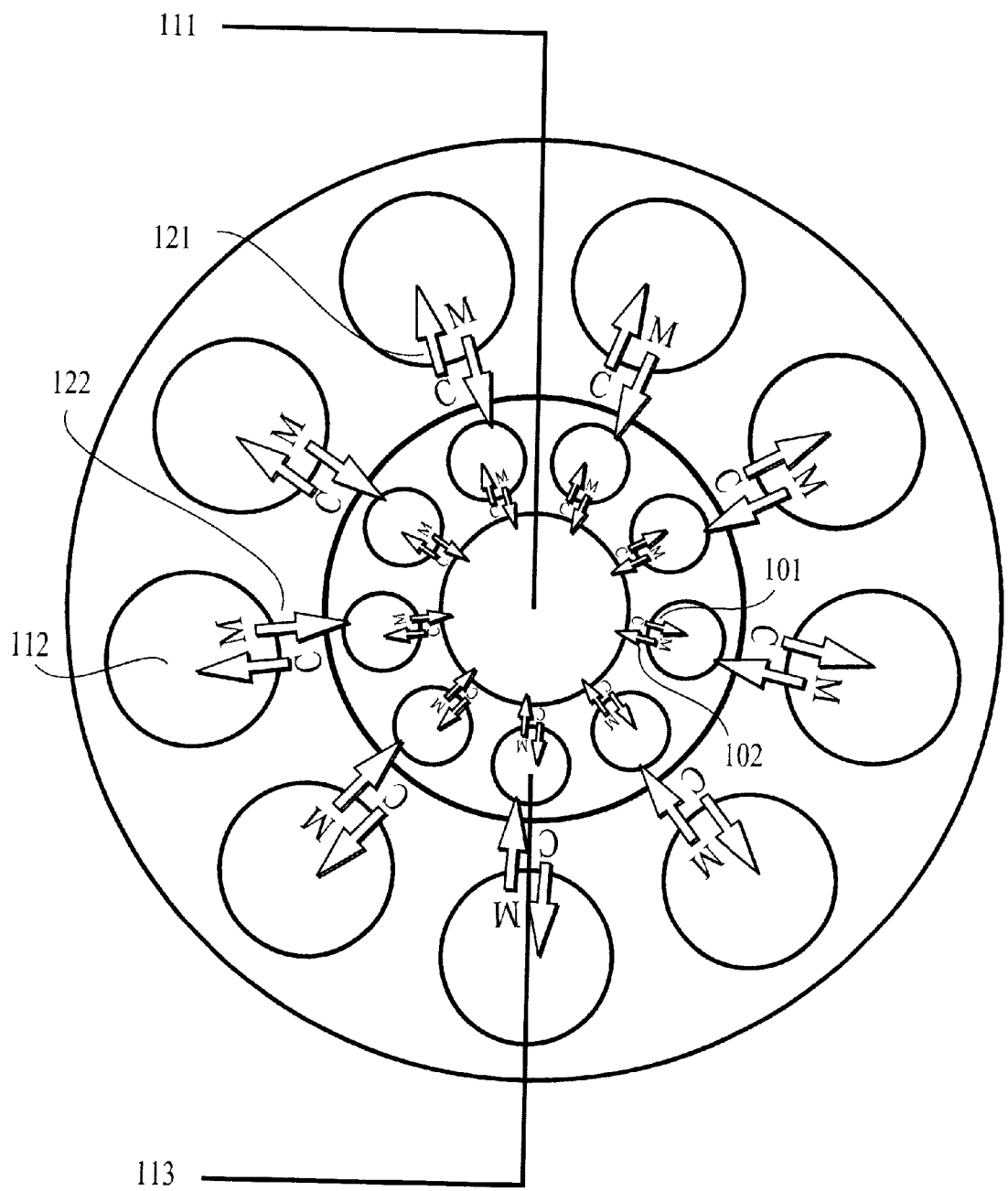
FIG. 10A is a representation of a "seed atom" concept for thinking and intelligence.

Conceptualizations of the human thought process are many and varied. The present invention is derived from a conceptualization of thinking and intelligence that locates a "seed atom" at the interface between an experiencer and the contents of experience, as shown in FIG. 10A. Under the seed atom concept, the function of intelligence is achieved from interaction of two simple movements, represented in FIG. 10A by the letters "C" and "M". "C", as shown by the arrow 121, represents outward movement where the experiencer 111 seeks to find the closest mirror content of desire in the contents of experience 112. This movement is from one to many, from whole to parts, from context to contents. "M" represents inward movement, as shown by the arrow 122, where the experiencer seeks to collect the closest mirror content of desire from the contents of experience 112. This movement is from many to one, from parts to whole, from contents to context. The function of "intelligence" may be represented as a creative combination 113 of these two simple movements. The same seed atom model may be used to describe the creative tension between existence (as 111) and potential (as 112) to create forms of intelligence (113).

While the foregoing description is philosophical in nature, its simplicity is mirrored in the present invention and, as will be shown, the present invention is quite practical. The "contents of experience" is represented by a body of one or more units of information, as is commonly understood in the art of information science. For the purposes of the present invention it will be sufficient to assume that these units of information have been structured in traditional hierarchical relationships. As will be seen, it is important to provide for a multiplicity of hierarchical relationships between and among these units of information. In order to traverse these "contents of experience" it is necessary and sufficient to navigate up and down the branches of a structured hierarchy. This navigational functionality roughly corresponds to the outward moving "C" force represented in the "seed atom" concept, and is called CLARIFICATION.

The CLARIFICATION process is a first group of functions as described hereafter which provides the ability to find individual units of information responsive to the objectives of the seeker, by traversing up and down a hierarchically structured body of information and by filtering that body of information through application of overlays of properties associated with a unit of information. These properties may themselves be arranged in a hierarchical structure, which may itself be traversed, to quickly and easily lead the user to a more intelligent (i.e. more appropriately informed) choice of detail in the course of searching for what the user desires. This process of CLARIFICATION roughly corresponds to the "seed atom" notion of seeking to find the closest mirror content of desire.

A second functional group, the process called MEMORIZATION, roughly corresponding to the inward moving "M" force of the "seed atom" concept and provides the ability to act upon the information sought, that is, to elicit the action denoted by the information unit, either immediately or after collecting separate units of information having denotations which elicit action, and then acting immediately or, if provided by the structure within which the units of information are organized, by activating an overlay which uses hierarchical structures of information and the mechanisms of the invention to quickly and easily lead the user to a more intelligent action upon the information. This process of MEMORIZATION roughly corresponds to the "seed atom" notion of seeking to collect the closest mirror content of desire.

It is important to note that, for the practical purposes of the invention, the action that could be taken or the "action denoted" by an information unit must be built into the hierarchical information structures which serve to describe and represent the units of information. Typically, this structuring will be done by those who compile particular bodies of information for the specific purpose of getting potential customers to act commercially on the information. As will be explained, the invention may be applied recursively as a tool to develop this structuring. While significant value added is provided by such structuring, the simple mechanisms of the present invention also and primarily provide an improved facility to connect people to the information units representing the world of experience at heightened levels of speed and convenience. The invention provides the user with a mastery over information in existing structures that is a significant improvement over the prior art. Indeed, the invention enables existing information structures to be tied together in ways which dramatically expand the intelligent access of ordinary citizens to the commercial marketplace—in food, entertainment, shopping, communications, transportation, and more—as well as to the marketplace of ideas. Thus the building block of the "seed atom" is a common underlying thread, working through the present invention, for transforming our management of goods, services, people, and information and realizing a higher degree of dominion for all mankind.

The invention provides an interface between the user and machine-understandable information. This information or content resides in facilities such as directory engines, search engines and databases. The invention provides a mechanism to extend and enhance practical access to the massive amounts of information content residing in these facilities, using functions which facilitate the ability of the human to constructively experience the information. The invention provides a protocol for mapping the CLARIFICATION and MEMORIZATION processes of the invention to corresponding elements in a variety of presentation schemes (as described below with particular attention to FIGS. 8A through 8L), and for modifying the presentation responsive to human selection of each mapped function (as described below with particular attention to FIGS. 11A through 11E). The invention promotes a human-assisted conceptual classification of content and projects this intelligence across the content.

Many methods are available for classifying content, especially content on the World Wide Web (WEB) or Internet. The WEB continues to be a major repository of content. The invention is compatible with facilities, foundations or methods that describe or manage WEB content. One method, specifically, XML (eXtensible Mark-up Language) could be used as a possible encoding syntax for the content of hierarchies. Another method, complementary to XML, is RDF. RDF provides the necessary foundation and infrastructure to support the description and management of WEB content. A definition of RDF is appropriate and will now be given.

Resource Description Framework (RDF) is defined in Resource Description Framework (RDF) Model and Syntax Specification, W3C Recommendation Feb. 22 1999 (http://www.w3.org/TR/REC-rdf-syntax). RDF is a foundation for processing metadata or "data about data"; it provides interoperability between applications that exchange machine-understandable information on the Web. RDF emphasizes facilities to enable automated processing of Web resources. RDF can be used in a variety of application areas; for example: in resource discovery to provide better search engine capabilities, in cataloging for describing the content and content relationships available at a particular Web site, page, or digital library, by intelligent software agents to facilitate knowledge sharing and exchange, in content rating, in describing collections of pages that represent a single logical "document", for describing intellectual property rights of Web pages, and for expressing the privacy preferences of a user as well as the privacy policies of a Web site. RDF with digital signatures will be key to building the "Web of Trust" for electronic commerce, collaboration, and other applications.

Figure 1:
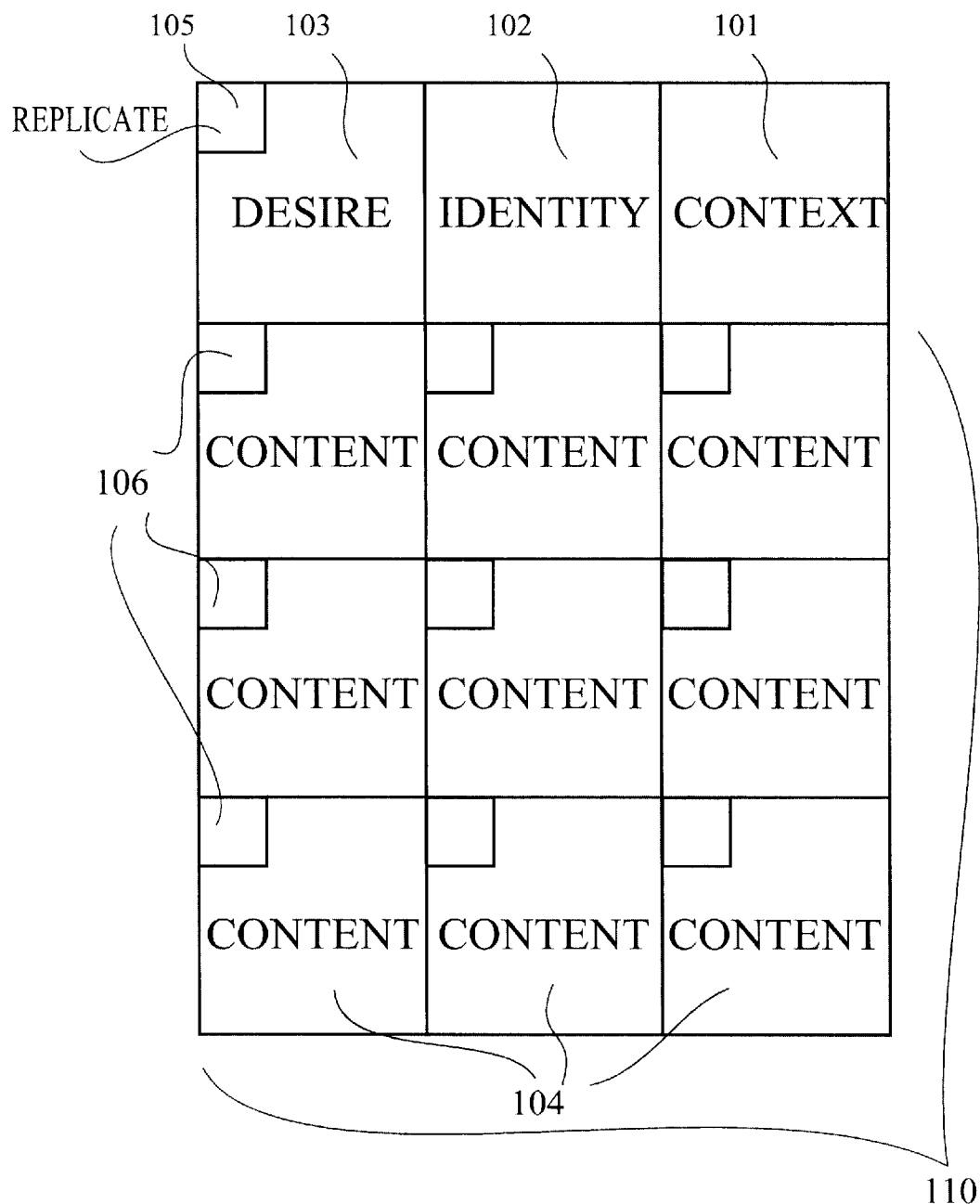
FIG. 1 is a schematic layout of an information appliance implementing the functionality of the invention.
Figure 10B:
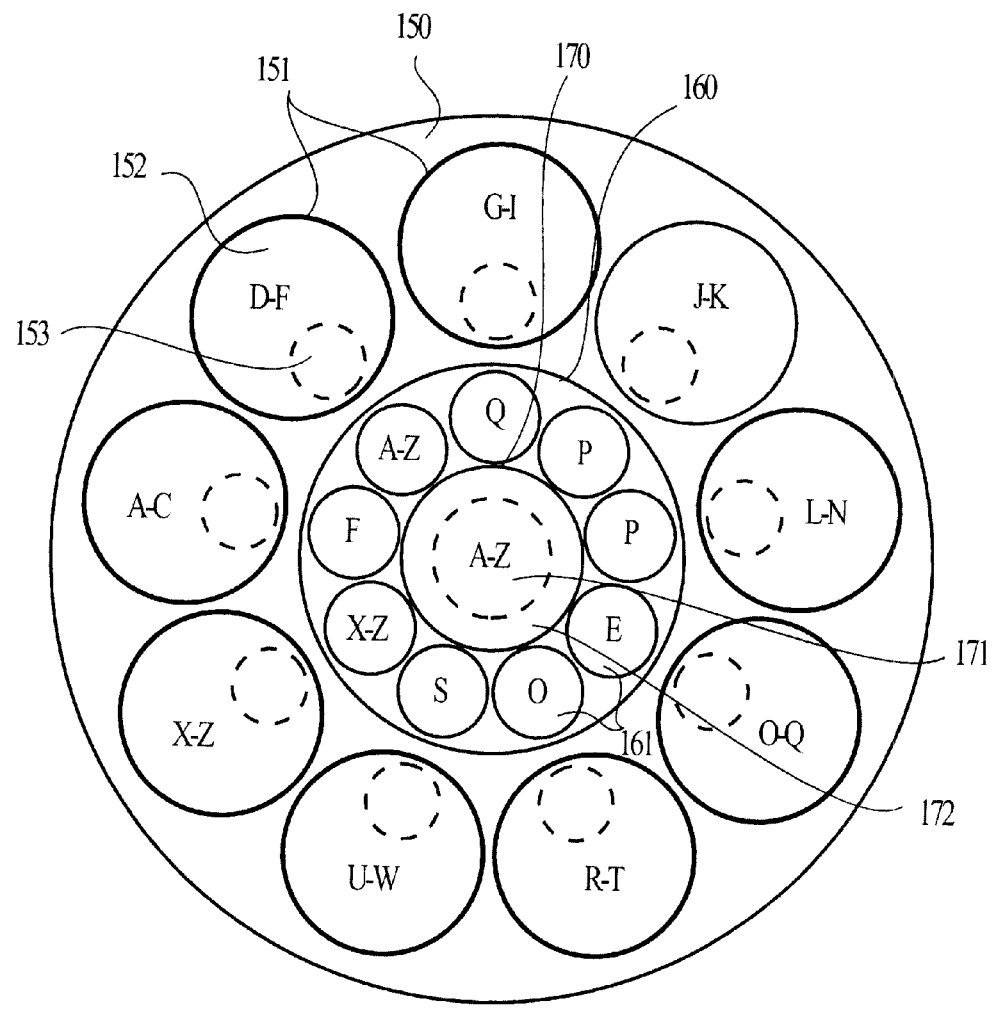
FIG. 10B is a schematic for an information appliance using a circular motif.

Referring now to the drawings, and more particularly to FIG. 1, there is shown a schematic grid layout of a user interface in accordance with the best mode of implementing the invention. The CONTENT portion 110 of the grid is composed of a three-by-three array of squares 104. Arrays of other dimensions may be used in implementing the invention. Square arrays (i.e. n×n arrays, where "n" is a positive integer) are advantageous for a user information interface because of the symmetry of spatial relationships. Rectangular arrays (i.e. m×n arrays, where "m" and "n" are positive integers and "m" is not equal to "n") are also usable for the CONTENT area. A three-by-three array is believed optimal because of the simplicity of its symmetry, and because a three-by-three array is very familiar to the vast majority of users who have used three-by-three arrays in such varied forms as a telephone keypad or numeric keypad (the numbers 1–9). Note that if there is only one item at a displayed content level, that single item would fill the entire area. It should also be noted, of course, that the invention may be implemented around a content display which is circular. A circular presentation motif is suggested by the seed atom described in connection with FIG. 10A. An exemplar presentation from a circular implementation is shown in FIG. 10B.

Figure 8A:
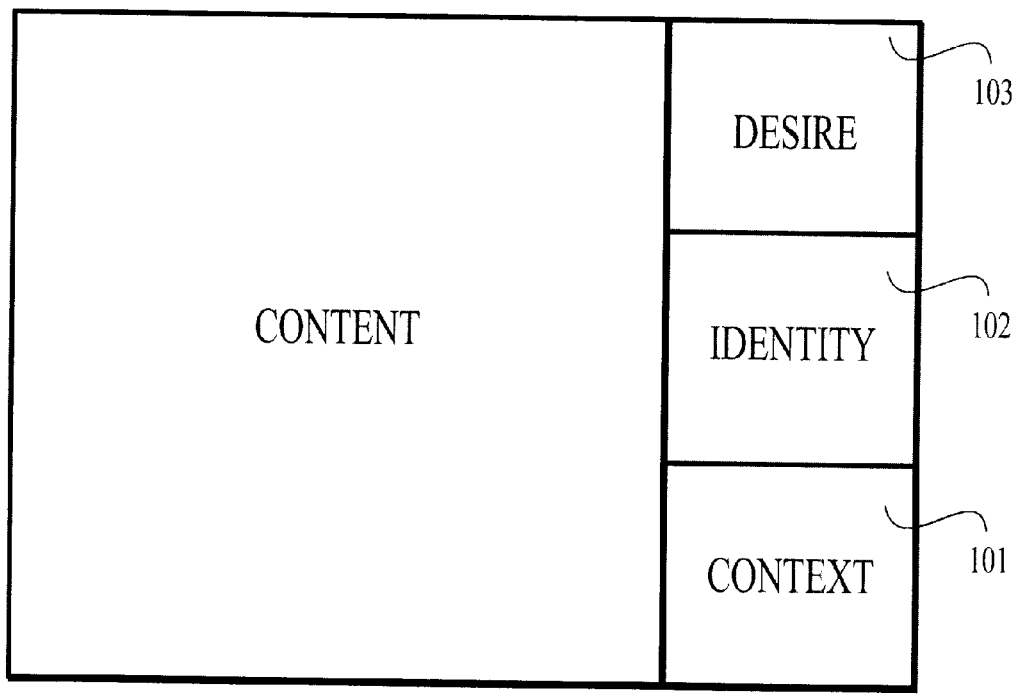
Figure 8B:
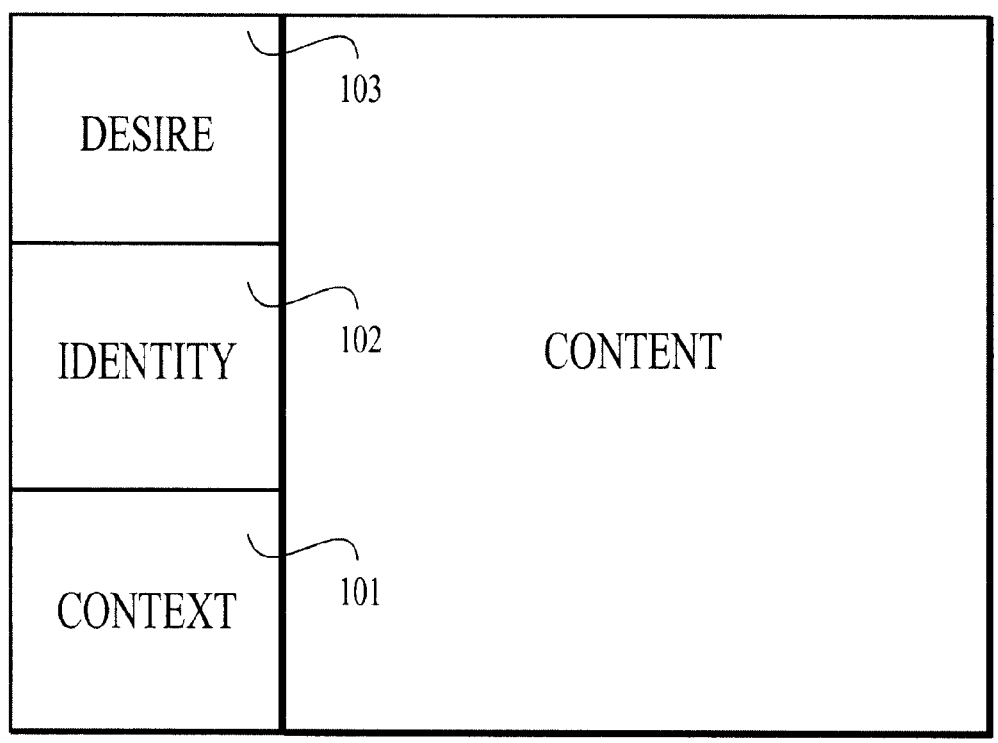
Figure 8C:
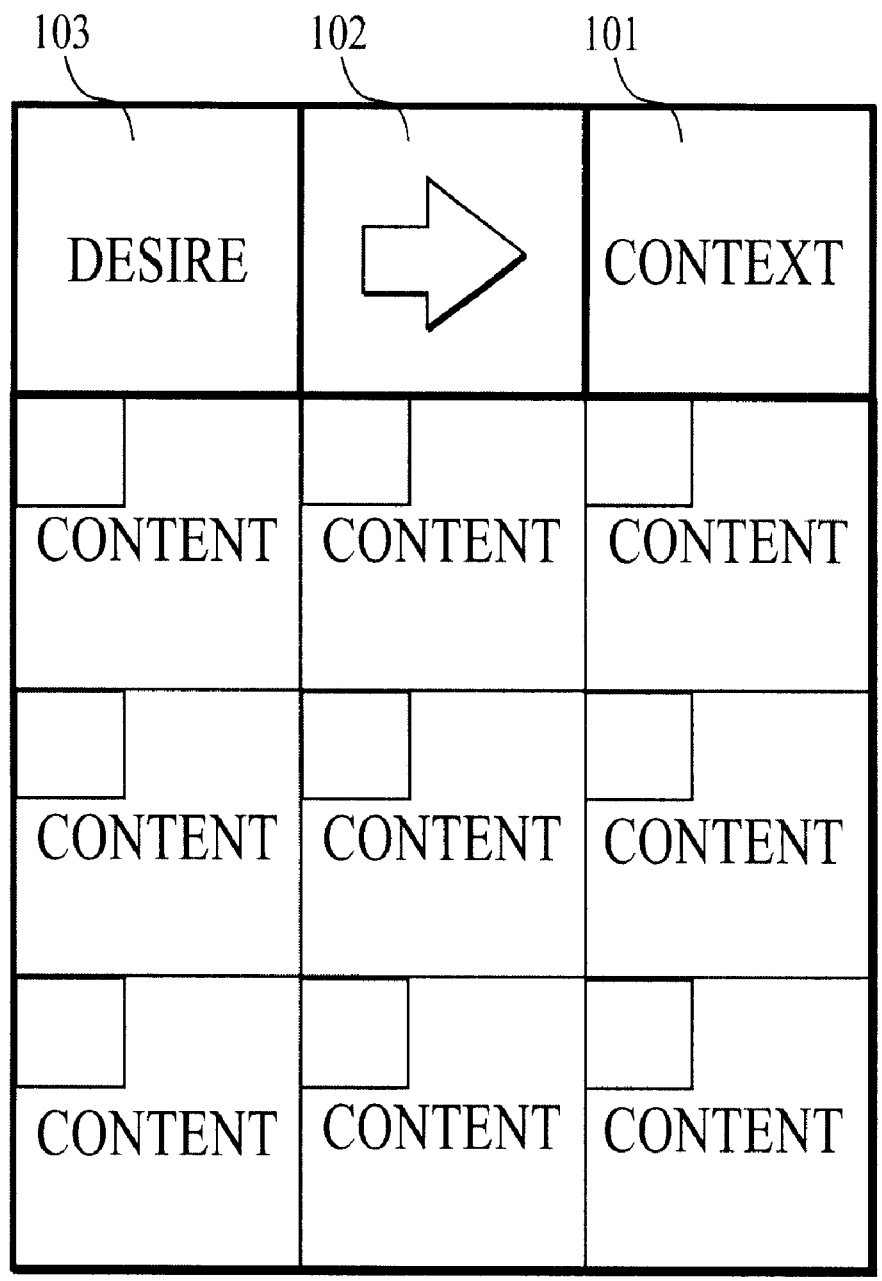
Figure 8D:
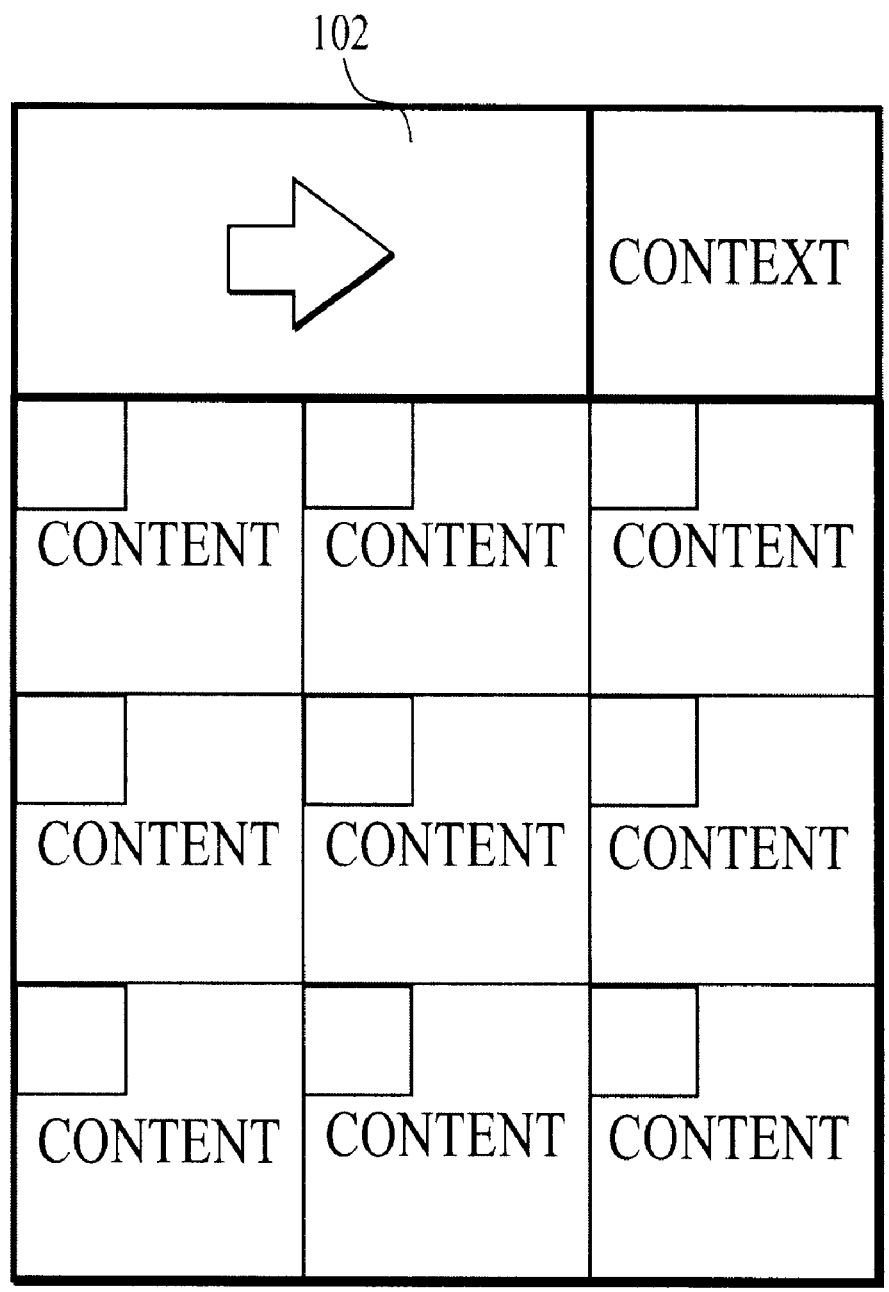
Figure 8E:
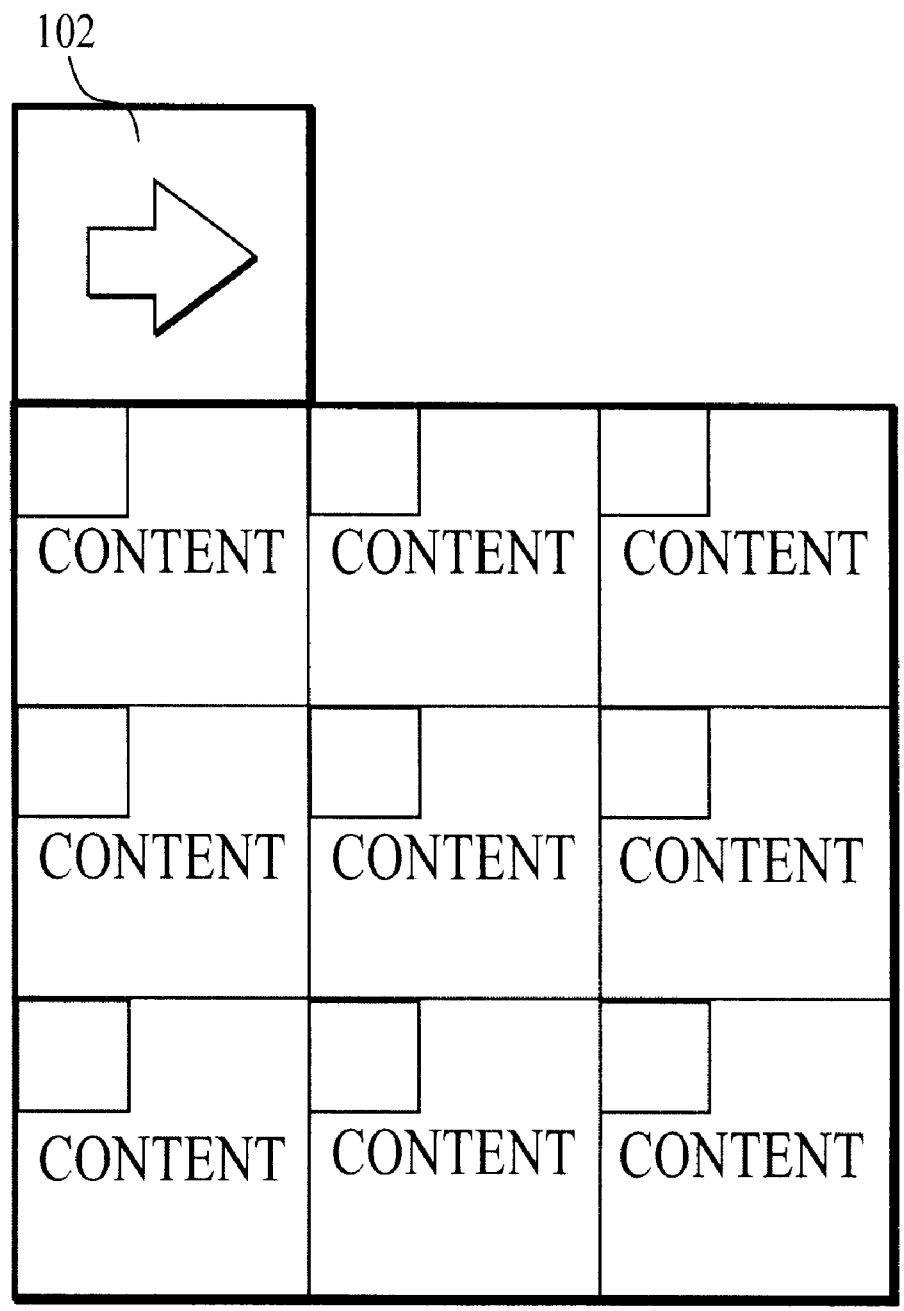

Returning to FIG. 1, areas for the DESIRE 103, IDENTITY 102 and CONTEXT 101 portions of the grid are arrayed across the top of the grid in a base or control area. Note that the base area may be configured in a variety of ways consistent with practice of the invention. Examples of several of these ways is shown in FIGS. 8A through 8F. In FIGS. 8A and 8B, respectively, the DESIRE 103, IDENTITY 102 and CONTEXT 101 areas are arranged to the right and to the left, respectively, of the CONTENT area. This enables the display to be presented in a conventional computer monitor user interface 4:3 aspect ratio. In FIGS. 8C and 8D, the IDENTITY 102 area is represented by an arrow, which would be selected to navigate up the information hierarchy but would not show a navigation history as in the preferred embodiment. In FIG. 8D the DESIRE area has been removed as well, which leaves a memorization functionality suitable for some information hierarchies which don't require intermediary collection areas for multiple units of information to be acted upon. Similarly, in FIG. 8E, the CONTEXT area has also been removed, leaving only an arrow 102 for navigating back up the information hierarchy.

Figure 8F:
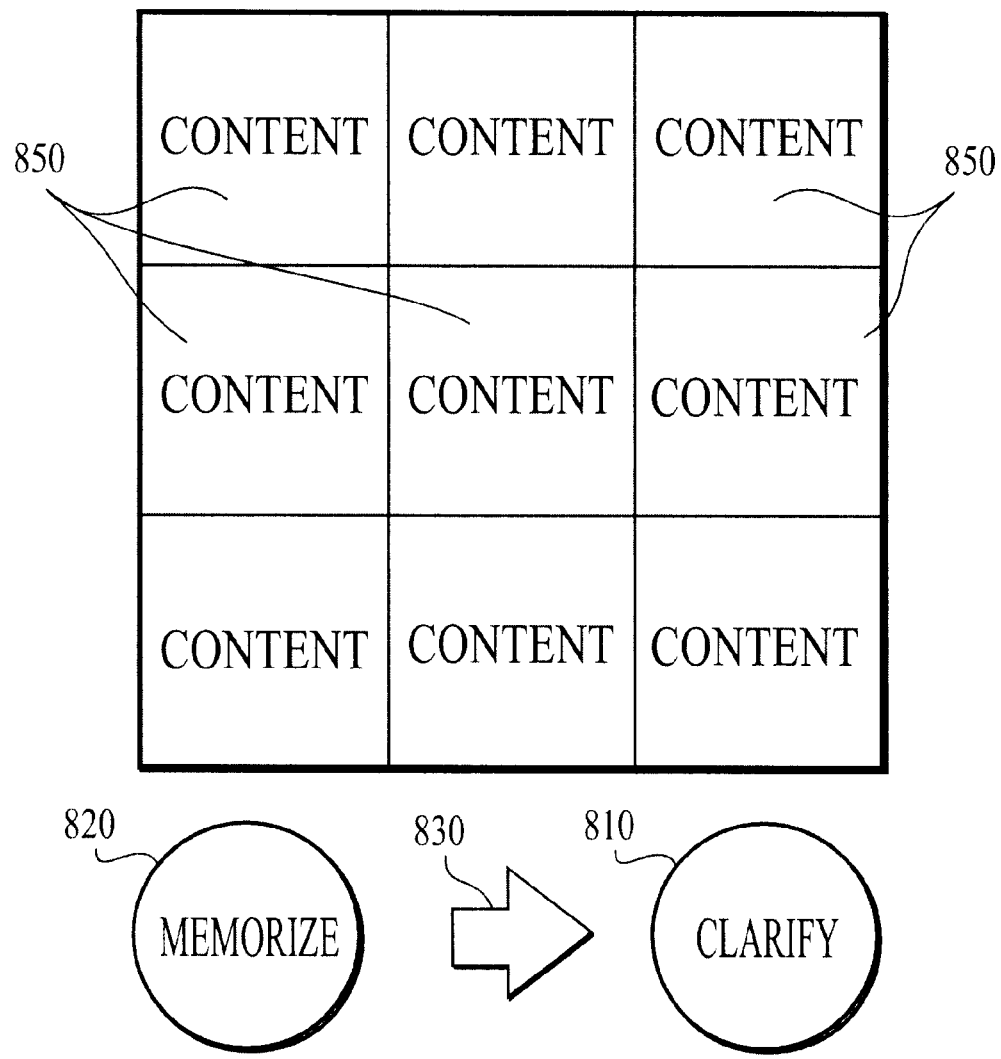

A further variation is shown in FIG. 8F, which shows the same three-by-three array of sub-content areas 850, but where the two processes of clarification and memorization are represented by buttons 810 and 820, respectively, and the IDENTITY area is represented by an icon button 830 (e.g. an arrow, as similarly shown in FIG. 8C). In this variation, operation of the invention may be described by a selection sequence. There is no separate area for memorization designated within a content sub-area 850. Selection of a content sub-area is therefore ambiguous with respect to the functions available. This ambiguity is resolved by mapping these functions unambiguously to convenient elements of a presentation protocol. In this example, this is accomplished by considering the sequence of user selections as an element of the presentation protocol, and in particular the interpretation of the very next selection. If the next selection is clarify button 810, then the information item represented by the immediately prior selected content sub-area becomes the context and the hierarchy level immediately below that information item is used to fill the content area. On the other hand, if the next selection is memorize button 820, then the information item represented by the immediately prior selected content sub-area is memorized for such action, if any, as may be called for in accordance with the organization and structure of the hierarchy or hierarchies of which the selected information item is a part.

The utility of the foregoing selection sequence implementation of the invention's functionality may be understood with reference to FIG. 8G, which shows a conventional telephone keypad 860. It is readily apparent how the numbers 1–9 may be mapped to the three-by-three grid content area which is also shown in FIGS. 8A–8F. The ubiquity of the telephone key pad, and the general familiarity of potential users of the invention with the telephone keypad, is one reason why the three-by-three grid implementation of the CONTENT area is a preferred embodiment of the invention.

It is also readily apparent how the other keys ("*" 862, "0" 863, and "#" 861) can be mapped to enable the functions of the invention. The "#" key 861 can serve as the CLARIFY button, the "*" key 862 can serve as the MEMORIZE button, and the "0" key 863 can serve to represent the IDENTITY area. It is important to note that the mapping necessary to implement the invention can be accomplished in a variety of ways, as may be seen by contrasting FIG. 8H with FIG. HG. While FIG. 8H shows the same keypad as in FIG. 8G, the mapping of the available twelve keys on the pad is modeled after the arrangement shown in FIG. 8C, with the top row of keys being mapped, respectively, as a CLARIFY button 864, a MEMORIZE button 865 and an IDENTITY area 866. The remaining nine keys in the lower three-fourths of the pad then map to the CONTENT sub-areas. This mapping flexibility extends the basic function of the grid to any common keypad enabled device, a worldwide universal layout. This is especially useful when visual displays are not available. Typically, the keypad would be augmented by an Audio User Interface (AUI) with or without a visual display. The layouts shown in FIGS. 8G and 8H are merely examples, and many other designs are compatible with the invention and within its spirit. Also, alphanumeric data can be entered using the alphanumeric nomenclature on existing phone keypads using a time sequencing consistent with an audio user interface. Note that overlays can be activated by holding down appropriate keys (e.g. CLARIFY button 862 to invoke a context overlay, and MEMORIZE button 861 to invoke a desire overlay) for a set period of time.

Figure 8J:
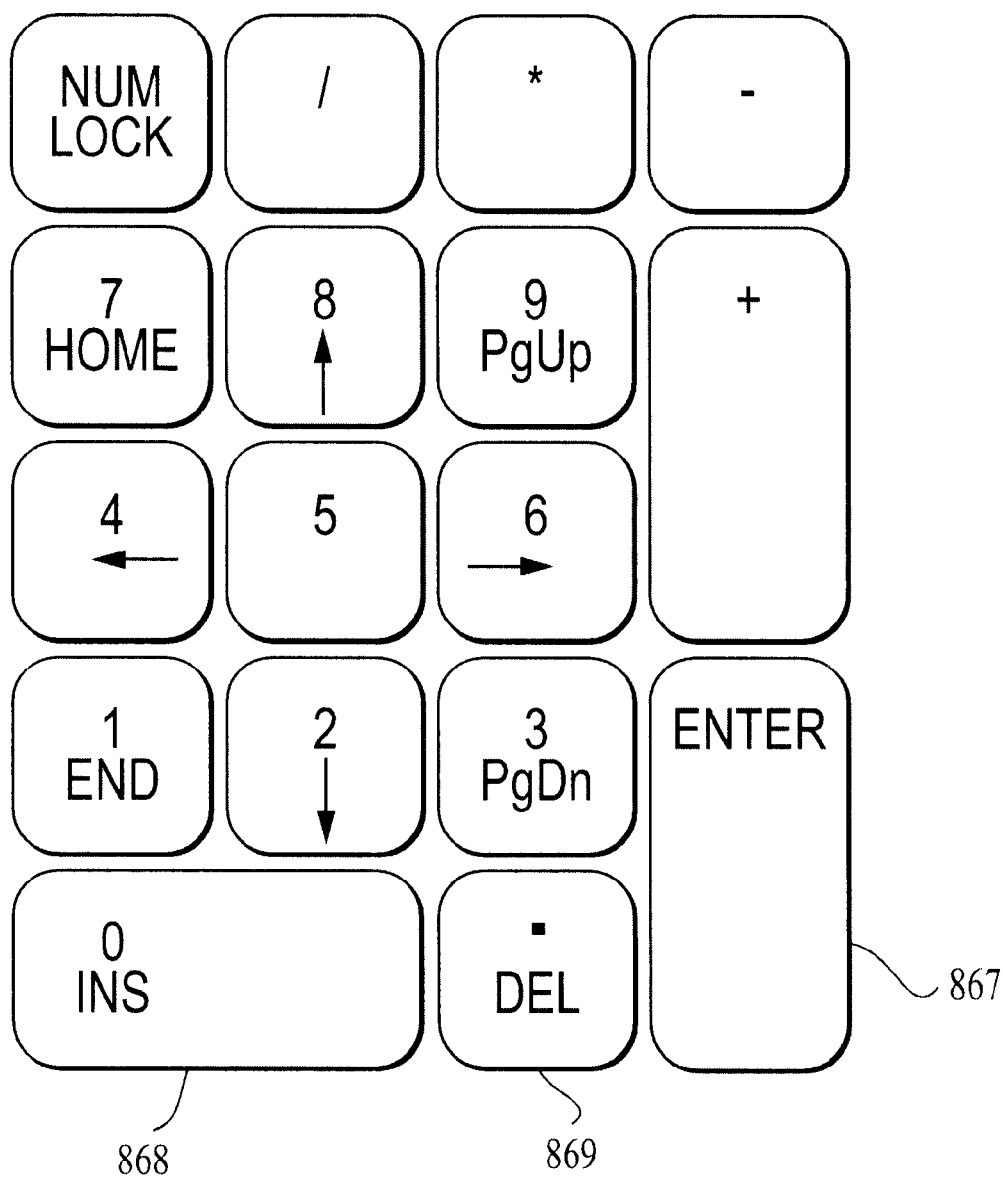

A similar mapping to three additional keys can be accomplished to implement the invention using the numeric keypad portion of a computer keyboard as shown in FIG. 8J. There, the keys 1–9 serve for the content area, with mapping of the Insert key 868 to serve as a CLARIFY button, the Enter key 867 to serve as a MEMORIZE button, and the Delete key 869 to serve as the IDENTITY area. Alternatively—since there are more than three keys in addition to the numeric pad which are available for mapping—other key mappings to could prove convenient. Consequently, in the manner already described in connection with FIG. 8F, a telephone keypad or a numeric keypad on the computer can be used with a selection sequence mode of operation to implement the invention.

By connecting a telephone keypad to a visual display such as a television (or using the connection between a computer's numeric keypad and a display on a computer monitor), it may be understood how the invention may be implemented in a manner which is accessible to, and usable by, a vast audience. A three-by-three array of information items in the CONTENT area, may be displayed on a television and a connected telephone keypad may be used in the manner described above to achieve the functionality of the invention.

Figure 8K:
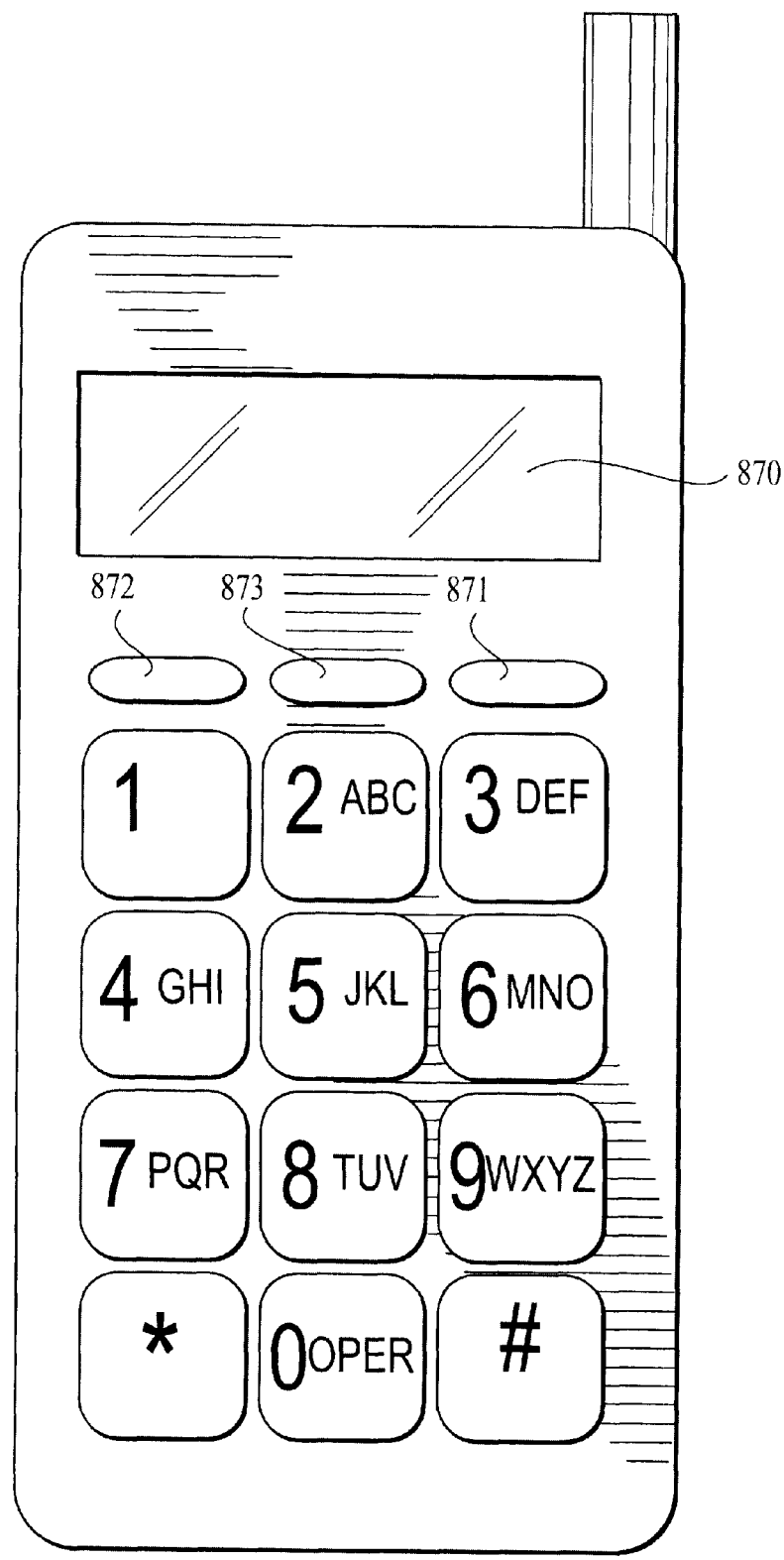

FIG. 8K shows how the aforementioned mapping techniques may be used to accommodate a cell phone to operation of the invention, complete with a visual display area 870. Note that the additional buttons 871–873 immediately below the visual display area 870 provide additional flexibility for mapping the functions of the invention, as will be appreciated by one skilled in the art. A particular mapping configuration is a design choice which may be made following appropriate user and market studies.

It should also be understood that the selection sequence mode of operation can similarly be used with the telephone keypad to implement additional functionality of the invention. For example, after a content sub-area (850 in FIG. 8F or keys 1–9 in FIG. 8G) has been selected and then clarified by next in sequence selecting "#" key 861 in (or clarify button 810 in FIG. 8F), a further selection of the "#" key 861 can be interpreted as selection of the CONTEXT area, so as to implement an overlay with respect to the clarified item of information, if such an overlay has been designed into the information base. Similarly, after a content sub-area (850 in FIG. 8F or keys 1–9 in FIG. 8G) has been selected and then memorized by next in sequence selecting "*" key 862 in (or memorize button 820 in FIG. 8F), a further selection of the "*" key 862 can be interpreted as selection of the DESIRE area, so as to implement an action overlay with respect to the memorized item of information (or with respect to any items of information accumulated in the DESIRE area), if such an overlay has been designed into the information base. Note that in the selection sequence mode, if an option is not available (e.g. a MEMORIZE selection sequence is applied where the selected content sub-area is not available for memorization, or a context overlay option sequence is applied where no overlay is available) it would be convenient to provide a sound (e.g. a "beep") or other feedback to confirm to the user that the option selected is not available.

However, in the preferred embodiment, there is contained in the upper left hand corner of each square in the content portion of the grid a memorization area 106 whose use will be explained below in reference to FIGS. 2 and 5. A similar corner area 105 is shown in the desire portion of the grid shown in FIG. 1.

Note that while the arrays and corner areas shown are a best mode of implementing the invention, other workable configurations will be readily evident to those skilled in the art. What is important for practice of the invention is that there be a distinction apparent to the human user enabling two different processes (CLARIFICATION and MEMORIZATION, as described below) associated with each content sub-area. The distinctions may be based on space, as shown of a corner area in the figures, or based on time, or a combination. For example, the necessary binary distinction could be based upon different patterns of illumination, with selection while one pattern is operable triggers CLARIFICATION and selection while the other pattern is operable triggers MEMORIZATION. Another example would be as shown in connection with FIG. 8F, where the necessary binary distinction is based on a timing sequence, i.e. a content sub-area is first selected, and then either a clarify or memorize button is the very next selection. Note that an advantage of the preferred embodiment with respect to the memorization option is that if the memorization option is not available there will be no visual marking which can be associated by selection; by contrast, in the sequence mode of operating the invention, the key sequence is always available, even if a visually distinct cue is given (e.g. a particular pattern of illuminating the applicable content sub-area on the display) to indicate that the option is not available. Thus a confirming "beep" or other distinct error indicator for application in such circumstances would be a convenient addition to the implementation.

Figure 8L:
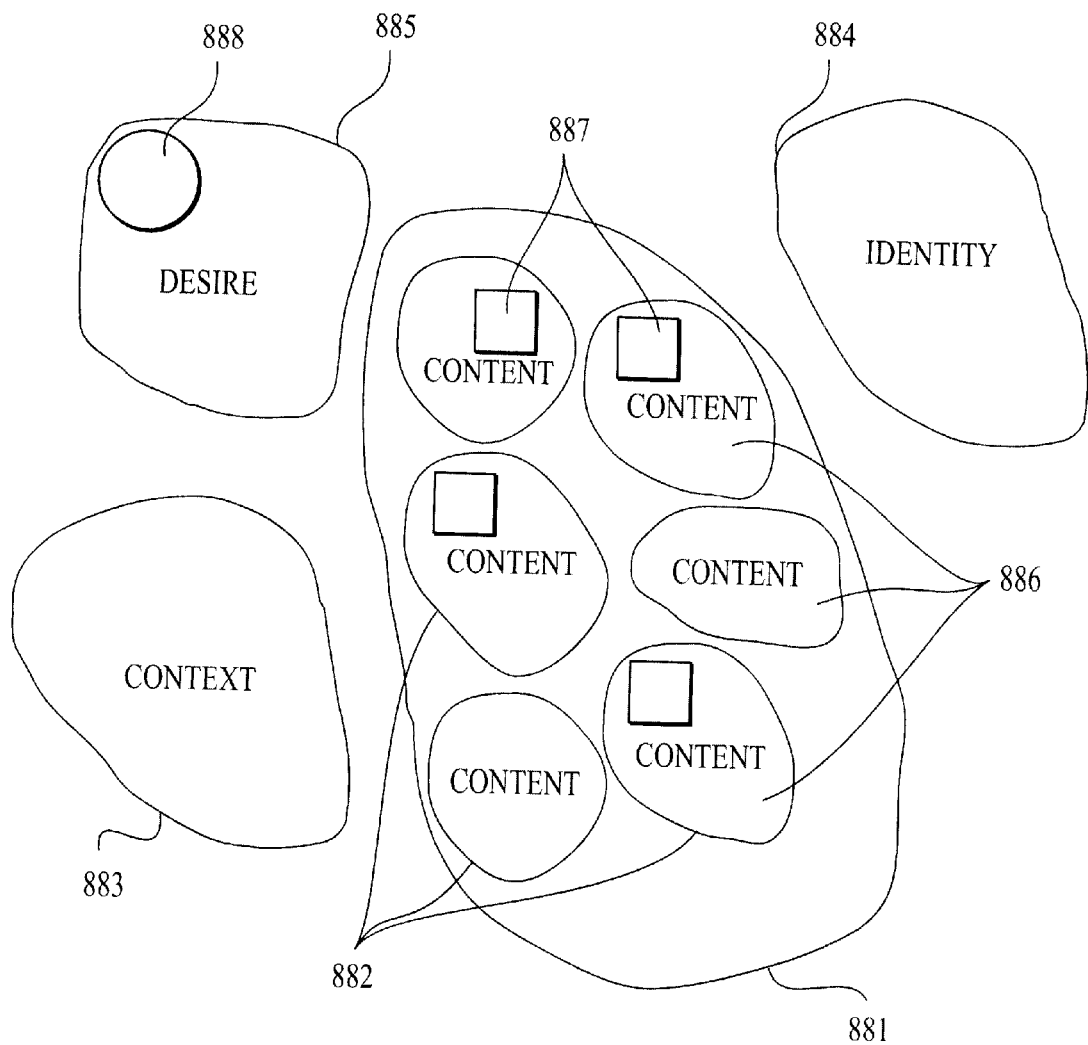

The different mappings of particular user distinguishable user interface structures which can implement the invention's functionality may be summarized with reference to FIG. 8L, to which we now turn. The topology shown in FIG. 8L distinctly identifies the presentation user control elements of the invention, namely, a CONTENT area 881, CONTENT sub-areas 882, a CONTEXT area 883, an IDENTITY area 884, a DESIRE area 885, areas 886 and 887 associated with CLARIFICATION and MEMORIZATION, respectively, of individual units of information, and area 888 for REPLICATION of desire.

It will be appreciated that at a visual presentation level these structures are topologically comparable to the best mode of implementation shown in FIG. 1, and that FIG. 8L represents an abstraction from the matrix structure of FIG. 1 so as to focus upon those structural elements which characterize the invention, thereby highlighting differences which are immaterial to practice of the invention. Furthermore—recognizing the restrictions upon description placed by the limitations of paper media—FIG. 8L may also be used to represent the full range of visual, auditory, tactile, olfactory, temporal and spatial stimuli and combinations thereof which may be distinguishable by the human user and therefore usable in a practical user interface to implement the invention. While visual examples are particularly well suited to the paper media of this specification, some examples of auditory and temporal combinations have also been given so that differences in implementation which are immaterial to practice of the invention may be illustrated. In accordance with the invention, a body of information is presented to, and experienced by, a human user. The presentation may be visual, where a layer of information in a hierarchy is set out in the CONTENT sub-areas of a grid as shown in FIG. 1. But for humans whose visual senses are impaired the same information may be presented aurally using a combination of auditory and temporal stimuli understandable and distinguishable by a human user. For example, CONTENT sub-areas 882 could be labeled aurally with a number or other identifier and presented aurally; and the user interface could provide for supplemental auditory or tactile user controls to repeat aural presentations of labeled CONTENT sub-areas 882, so as to simulate the ability of the visual user to review the entire information content of the display. Similarly, for those whose visual and auditory senses are impaired the same information may be presented using tactile stimuli, for example through use of a Braille device configured so that separate tactile Braille areas corresponding to CONTENT sub-areas 882 would be distinguishable by the user, or by using a temporal and tactile combination so that different CONTENT sub-areas 882 would be temporally distinguished by a human user on a single tactile Braille area. It is an important object of the invention that the invention's functionality be provided to human users using whatever stimuli may be distinguishable by them.

In the best mode of implementation, the presentation and user control elements of the invention are integrated, that is, the same elements used to display information also serve as user controls. For example, the CONTENT sub-areas are used to display a layer in a hierarchy of information, and these very display areas are selectable by the user to activate particular functions of the invention (as will be described in greater detail hereafter and in connection with FIGS. 11A–11E), e.g. areas 886 for CLARIFICATION and areas 887 for MEMORIZATION. Similarly, CONTEXT area 883 is in the best mode used for the display of the unit of information which is the immediate parent of the layer of information displayed in the CONTENT area, and is also selectable by the user for a particular function of the invention, e.g. to activate a context overlay. IDENTITY area 884 is in the best mode used for the display of the navigation history of the CLARIFICATION process, and is also user selectable to activate a navigation function (i.e. clarify up) of the invention. DESIRE area 885 is in the best mode used for the display of items of information collected by the memorize function, and also contains the user selectable REPLICATE area 888 to act upon the information collected in the DESIRE area. While it is a design choice how to map the REPLICATE function (and it is possible to use the entire DESIRE area for the function), in the preferred three-by-three grid embodiment of the invention the REPLICATE function is mapped to an upper left corner square in the DESIRE area which parallels use of the upper left corner squares of the CONTENT sub-areas for the memorize function.

However, the overlapping of presentation structures and user control structures as described for the best mode of implementation is not necessary to implement the invention. For example, as described above with respect to the use of a telephone keypad, the presentation structures (e.g. implemented on a television screen) may be entirely separate from the user control structures (e.g. implemented on a telephone keypad). Furthermore, in at least one mode of implementation (as shown in FIG. 8F) units of information may be presented minimally in the CONTENT sub-areas, with the user control structures being implemented by a protocol which uses a combination of tactile selection and timing sequences. For implementation of the invention, there must be a presentation structure (minimally, for a layer of an information hierarchy and, optimally, for a parent unit of information, for a navigation history of parent units of information, and for collecting memorized units of information), and there must be a user control structure mapped to the functionality of the invention, namely the CLARIFICATION process (minimally, navigating downward and upward through an information hierarchy and, optimally, applying a context overlay for filtering the information in the hierarchy) and the MEMORIZATION process (minimally, memorizing selected units of information which mirror the content of the user's desire and then acting upon them and, optimally, applying a desire overlay for choosing alternate actions).

Figure 3:
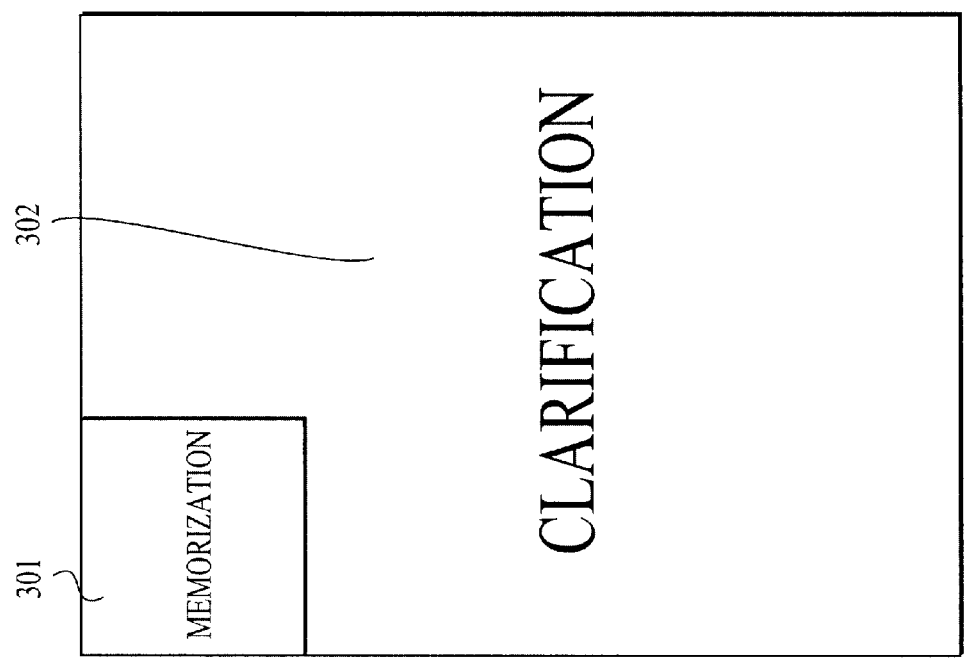
FIGS. 2 and 3 are schematic layouts showing areas of the information appliance (shown in FIG. 1) used for implementing the clarification and memorization processes of the invention.
Figure 4:
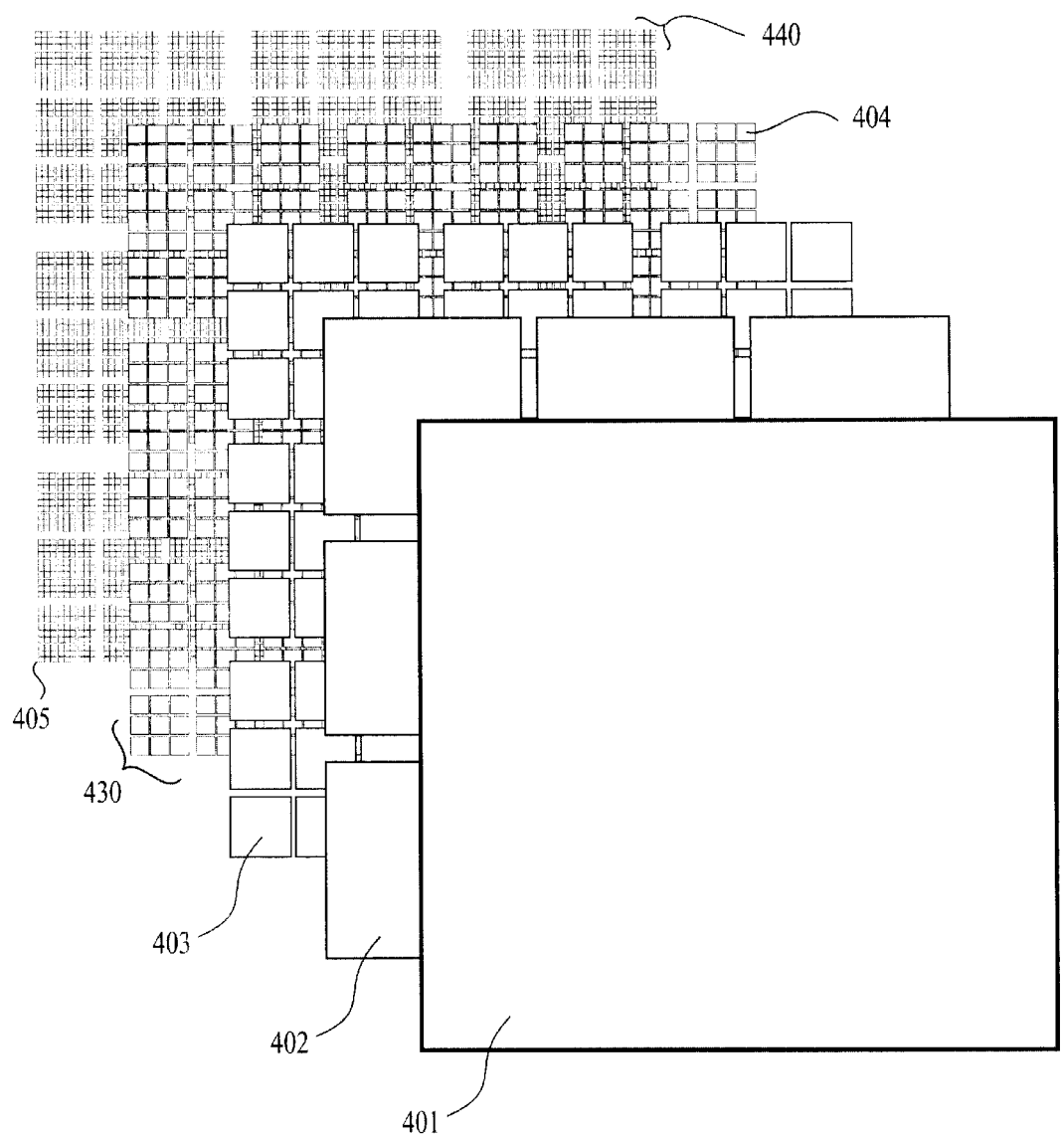
FIG. 4 is a schematic representation of a body of information organized in a hierarchy.

The grid is the best mode for implementing the two processes of the invention, CLARIFICATION and MEMORIZATION. The preferred implementation is shown in FIGS. 2 and 3, which operate on a hierarchically arranged body of information shown schematically in FIG. 4. The schematic in FIG. 4 shows a hierarchy having five levels (401 to 405), with each unit in each level being expanded to a three-by-three array at the next lower level of the hierarchy (e.g. third level unit 403 is expanded to a three-by-three array 430 at level four, and fourth level unit 404 is expanded to a three-by-three array 440 at level 5). In a best mode implementation, each unit is represented by a thumbnail image appropriately reflecting the information content associated with that unit.

The clarification process is accomplished using the content, context and identity portions of the grid (combined in area 302 in FIG. 3). The memorization process uses the memorization areas (201 in FIG. 2 and 106 in FIG. 1B) within each of the squares 202 in the content portion and, optionally, the desire portion of the grid (area 301 in FIG. 3 and area 103 in FIG. 1B). These divisions of functional areas are shown schematically in FIGS. 2 and 3.

As will be evident to those skilled in the art, the foregoing four areas (CONTENT, CONTEXT, IDENTITY, DESIRE) and two processes (CLARIFICATION and MEMORIZATION) could be presented in a user interface in a variety of other configurations without departing from the spirit and substance of the invention. Similarly, a body of information could be structured hierarchically in levels in a variety of ways, in accordance with principles which are well established in the art. For example, different branches of a hierarchy need not have the same number of levels, there may be a variety in the number of units at a particular level, and any particular unit of information may be represented in multiple contexts within a hierarchy. All these variations in form and structure may be conformed to practice of the invention.

Figure 2:
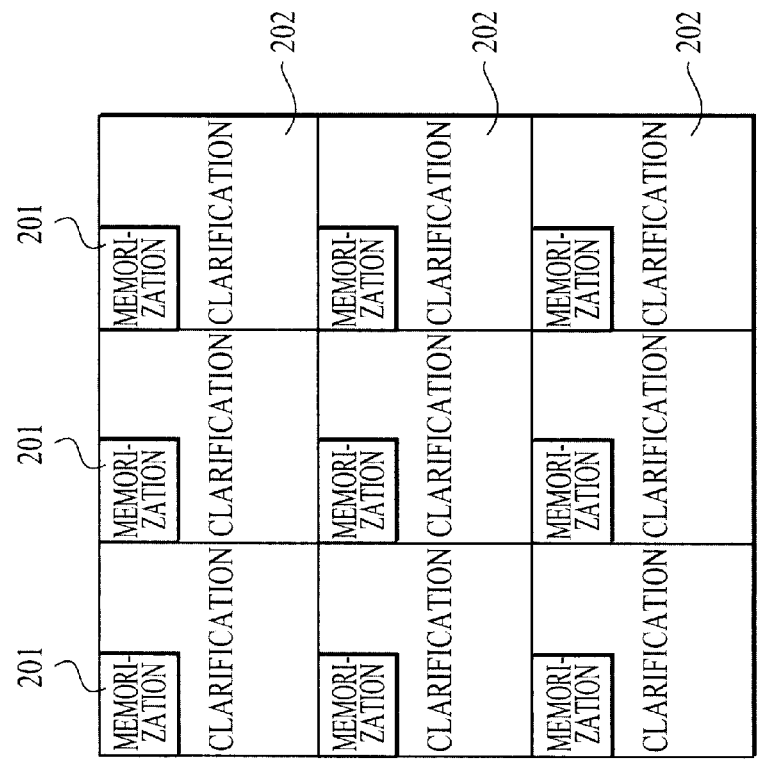

For purposes of illustration, however, we will continue to use the grid structure shown in FIGS. 1 through 3 and the schematic representation of an information hierarchy shown in FIG. 4.

Turning now to FIG. 5 we will illustrate operation of the grid in accordance with the invention. In this example, information content will be represented abstractly by a conventional numerical notation, where successive levels in a hierarchy are separated by periods and the respective units at a particular level each are represented by a distinct number. For example, the numerical notation "1.5.3.8" refers to a unit of information designated by "8" at a fourth level, coming out of a node designated "3" at a third level, coming out of a node designated "5" at a second level, and so forth. This notation will help explain the invention, although in practice a thumbnail and/or text image, as shown hereafter in connection with FIG. 9, would better serve the user in navigating through the body of information and acting on that information in accordance with the user's purposes. Note that the layout of FIGS. 5A through 5J follows the exemplar pattern shown in FIG. 1B, with the areas of CONTEXT 101, IDENTITY 102 and DESIRE 103 being arrayed from right to left in a row across the top of the 3×3 array of CONTENT areas 104. For convenience, therefore, reference will be made to item numbers from FIG. 1B in discussion of FIG. 5 (and also, subsequently, in discussion of FIGS. 6, 7 and 9) and it will be understood that reference is being made to the corresponding area of FIG. 5 (and similarly for FIGS. 6, 7 and 9) even though the reference number from FIG. 1B is not redrawn on the later figure.

Figure 5A:
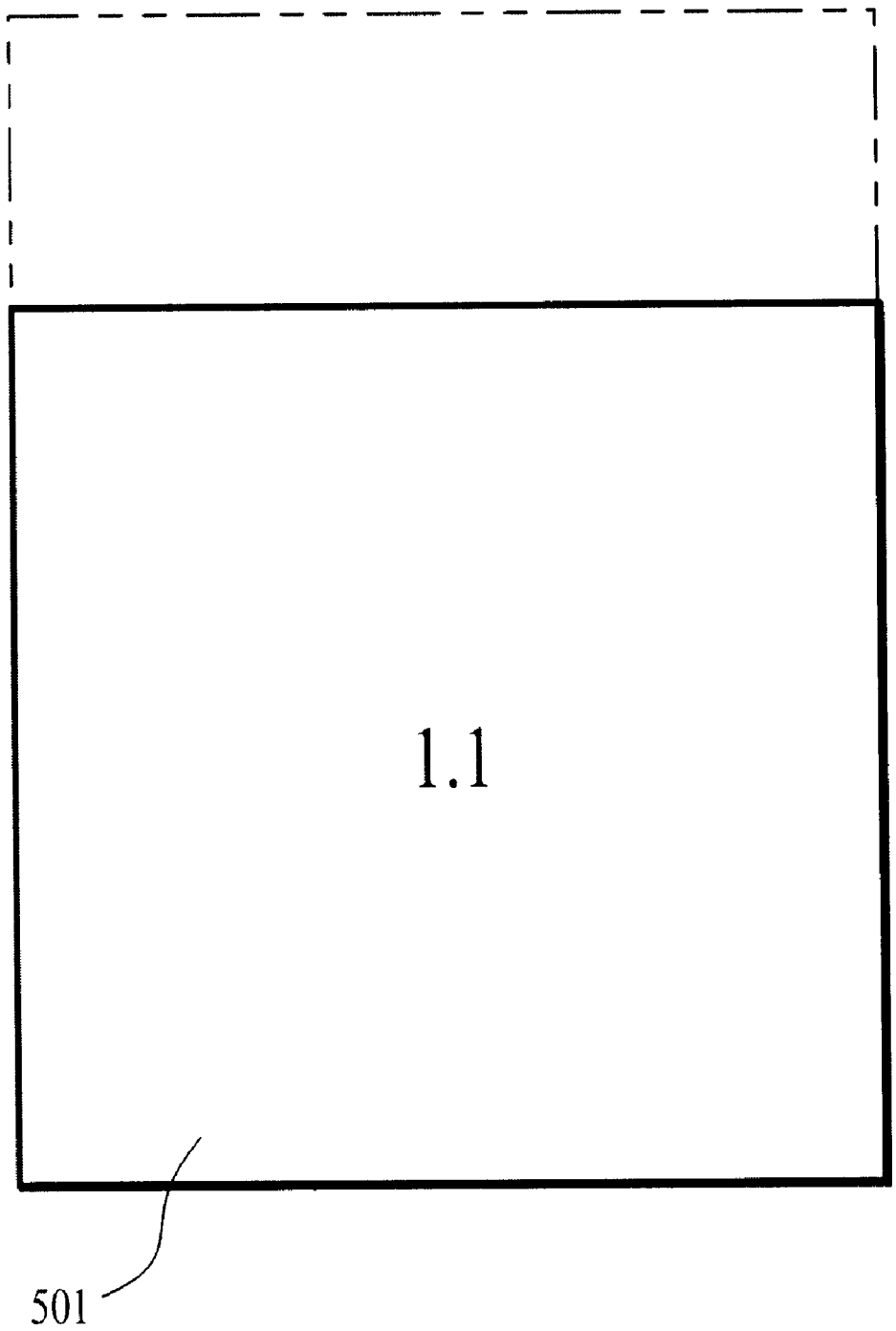
Figure 5B:
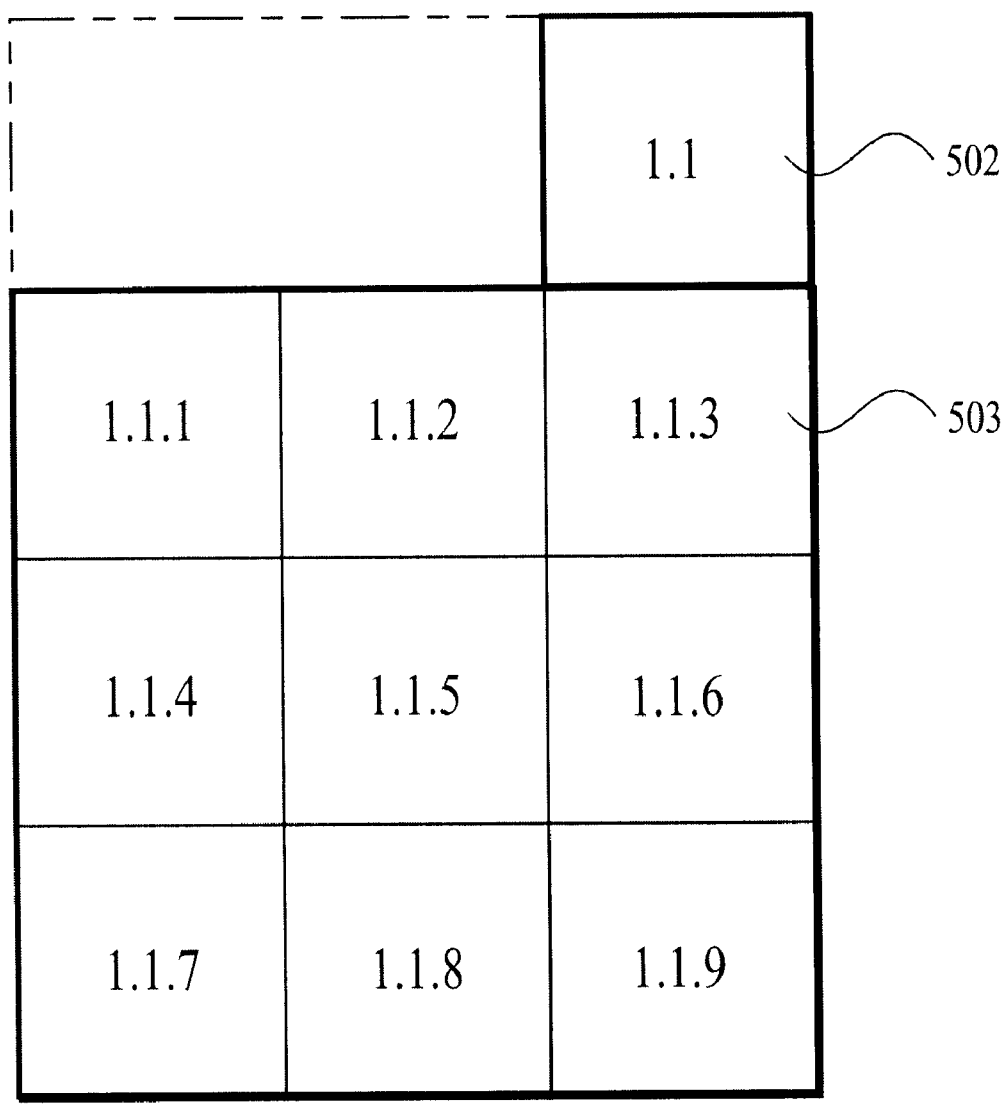

In FIG. 5A the content portion of the grid 501 is taken up with unit of information "1.1". In order to clarify this unit of information, the user selects it in a manner which is well known in the art, e.g. by touching it if the grid is implemented on a touch screen or by locating a pointing device icon in the selection area and pressing a button on the pointing device, such as a mouse. Selection could also be accomplished with other means, including use of voice commands or a telephone keypad configured with a "dumb" display. The results of that selection are shown in FIG. 5B. The representation of the selected unit of information now appears in the context portion 502 of the grid, and the units of information under that unit at the next level in the hierarchy (represented by "1.1.1" through "1.1.9") are displayed in squares of the three-by-three array in the content portion of the grid.

Figure 5C:
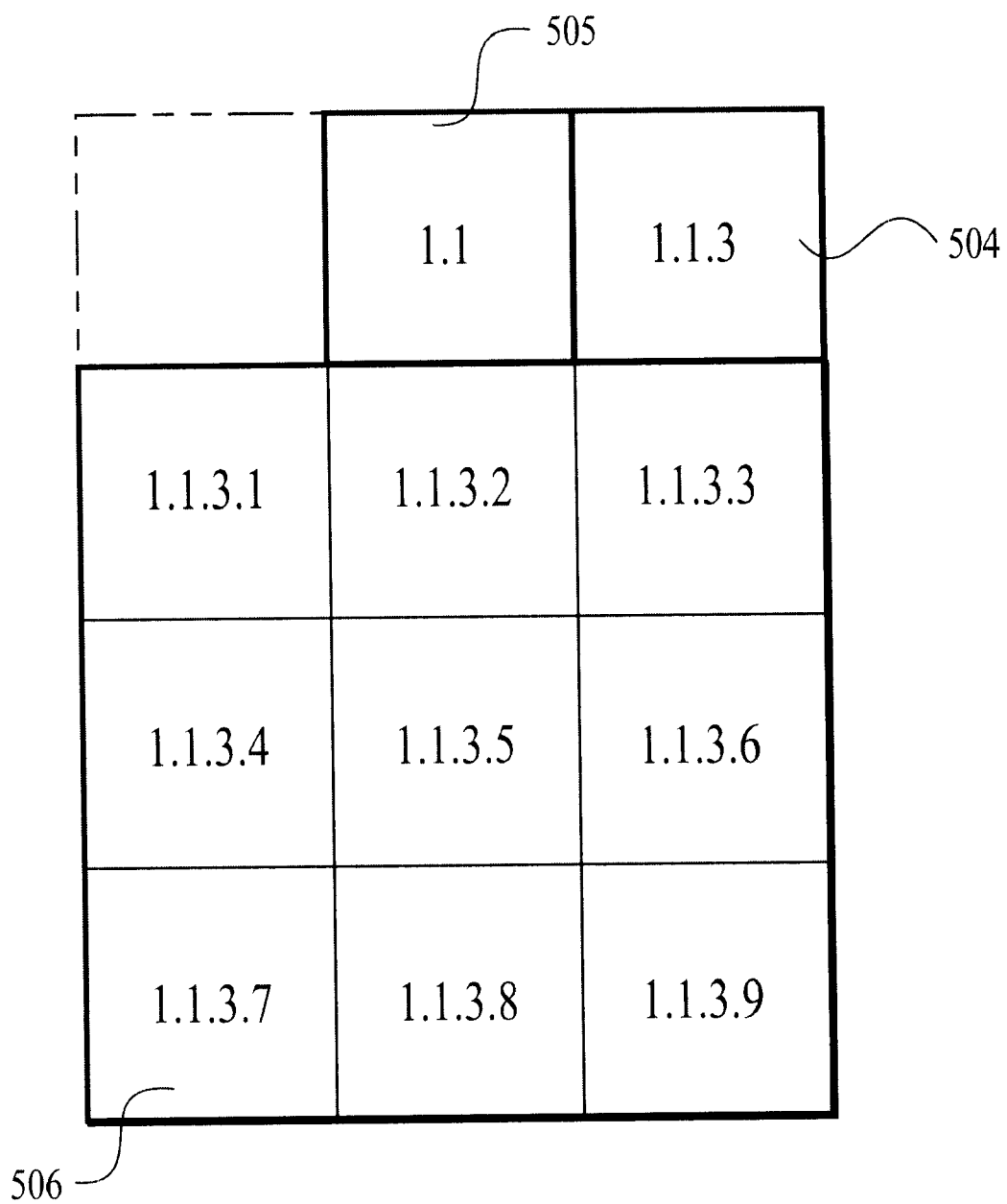

Next, the user seeks to clarify the content of the unit of information 503 represented as "1.1.3" in FIG. 5B by selecting that unit. The result of that selection is shown in FIG. 5C. The representation of the selected unit now appears in the context area 504, with the prior contents of the context area (unit of information "1.1") now appearing in the identity portion 505 of the grid. Note that in FIGS. 5A, 5B, 5C and 5D none of the units of information there shown contain a corner area marked for memorization. The significance of this omission will become evident in connection with the discussion below of FIG. 5E.

Figure 5D:
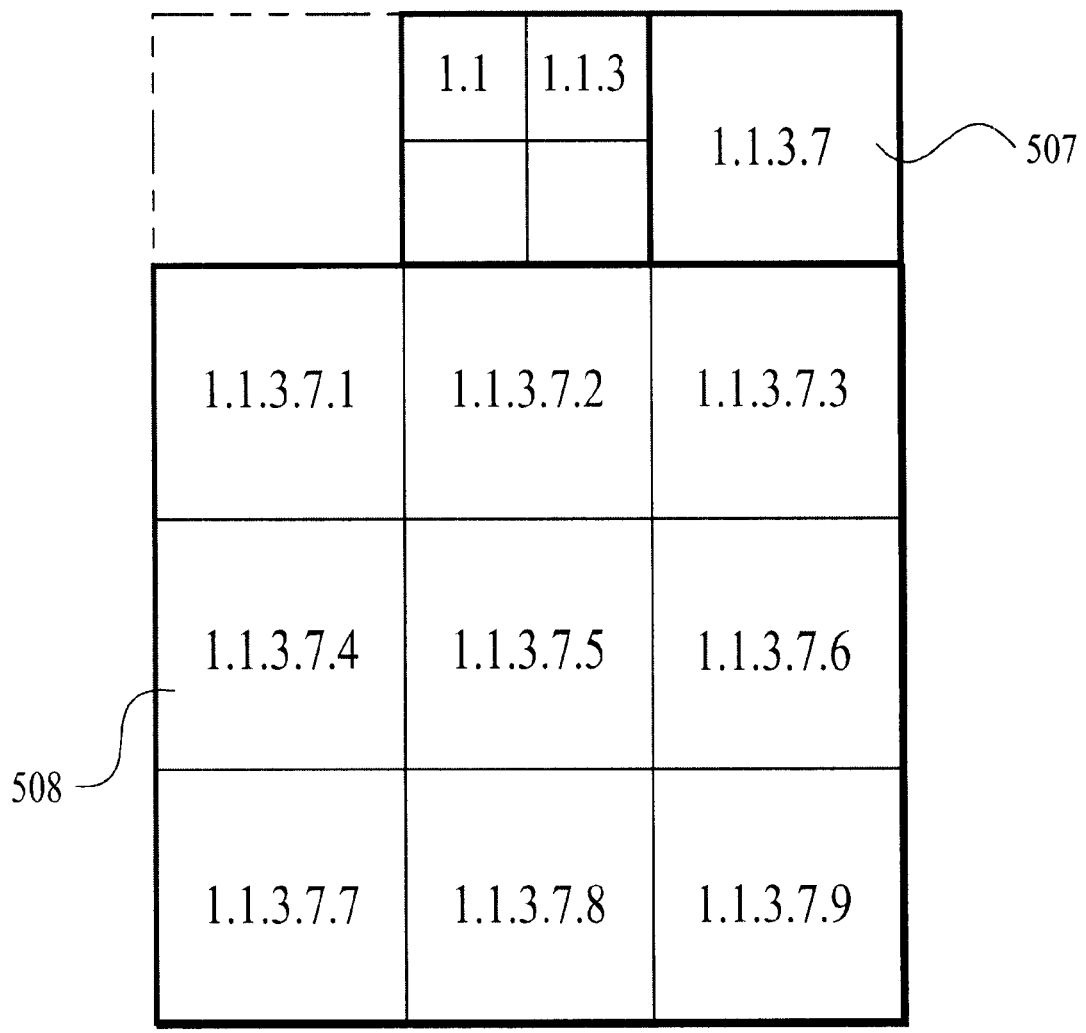

The clarification process is repeated until the user's desires are satisfied, insofar as the body of information has been organized to so satisfy the user. The user selects unit "1.1.3.7" 506 in FIG. 5C, and the results of that selection are shown in FIG. 5D. As before, the representation of the selected unit now appears in the CONTEXT portion of the grid, with the prior contents of the CONTEXT portion (the unit represented by "1.1.3" 504 in FIG. 5C) being moved to the IDENTITY portion of the grid. Note that now there are two units of information represented in the IDENTITY portion of the grid, unit "1.1" (as shown in the CONTEXT area as item 502 in FIG. 5B) and unit "1.1.3" (as shown in the CONTEXT area as item 504 in FIG. 5D). This provides a means for the user to navigate back out of the path taken down the information hierarchy. For example, by selecting anywhere in the IDENTITY area in FIG. 5D the user returns to the preceding display shown in FIG. 5C. Note that the IDENTITY area acts as a last-in-first-out (LIFO) buffer: unit "1.1.3" was the last unit placed in the IDENTITY area (as shown in the progression from FIG. 5C to FIG. 5D) and would be the first unit removed upon activating the IDENTITY area (thereby reversing the navigation and going from FIG. 5D back to FIG. 5C). If the IDENTITY area were selected again, then unit "1.1" 505 (as shown in FIG. 5C) would be removed and the display would return to that shown in FIG. 5B.

Seeking further clarification, continuing from FIG. 5C, the user selects unit "1.1.3.7.4" 508 in FIG. 5D. In the same manner as demonstrated above, the selected unit represented as "1.1.3.7.4" now appears as item 509 in the CONTEXT area, with the former contents of that CONTEXT area (unit "1.1.3.7" 507 as shown in FIG. 5D) now being moved to the IDENTITY portion of the grid in FIG. 5E. Note that now there are three units of information represented in the IDENTITY portion of the grid, unit "1.1" 512, unit "1.1.3" 511 and unit "1.1.3.7" 510. As before, the contents of the IDENTITY portion of the grid provide a means for the user to navigate back to higher levels in the information hierarchy. Note also that the size of the representations of the units of information shown in the identity portion of the grid has been reduced (compare "1.1" in the IDENTITY portion of the grid in FIG. 5C with "1.1" in the IDENTITY portion of the grid in FIG. 5D) in order to accommodate the number of units shown. Note further that the number of units shown corresponds to the number of levels in the hierarchy that have been traversed by the user in navigating the body of information. The general concept of retaining and displaying a hierarchical history of navigation is old in the art. However, the implementation described here—where the items in the history display are spatially configured in a two dimensional array rather than linearly in an outline form, and where the history display is integrated with the clarification and memorization processes described herein—is believed to be novel and useful.

Figure 5E:
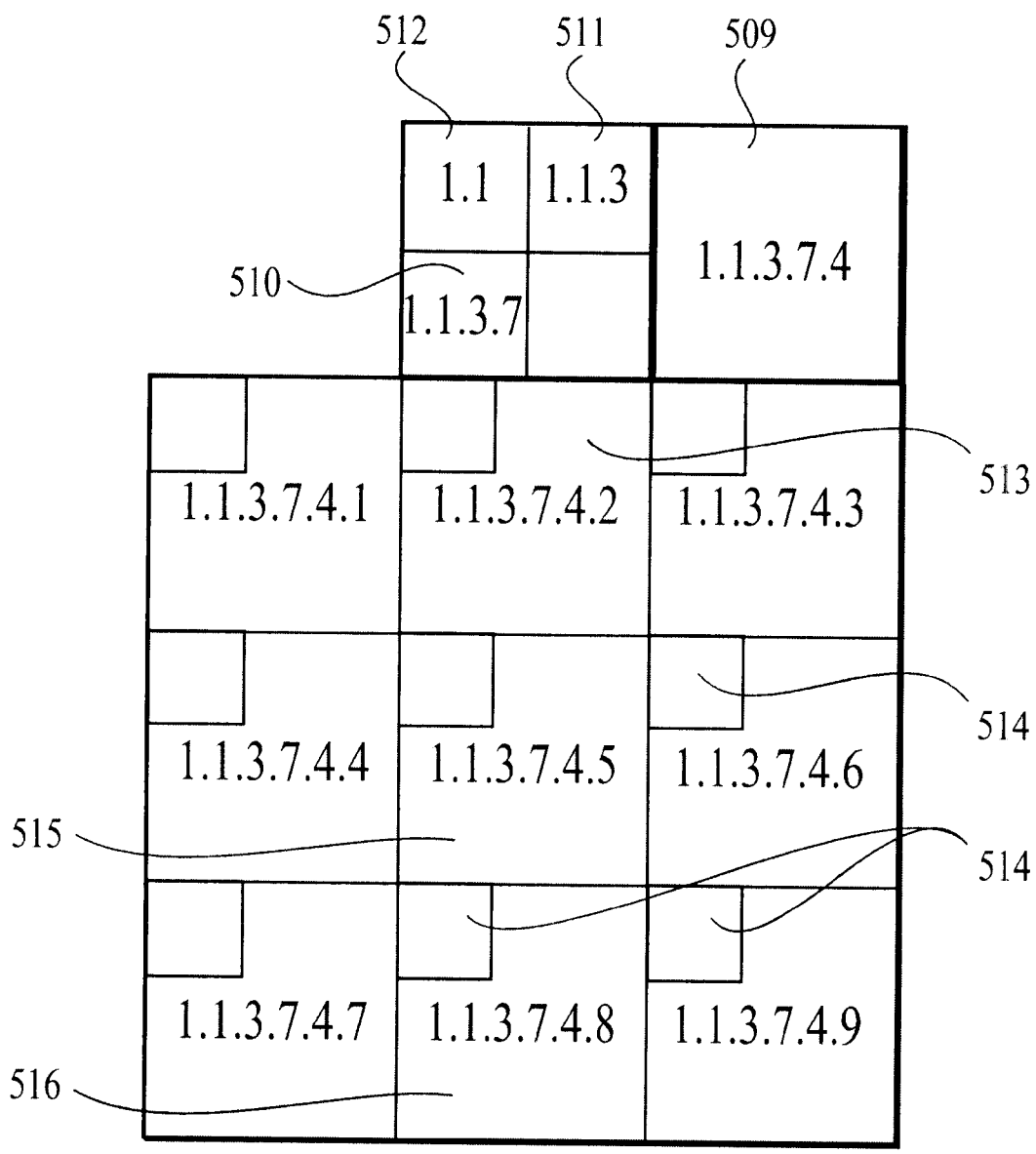

Note that in FIG. 5E there is shown, in each square in the three-by-three array within the content portion of the grid, a corner marked for the memorization function (e.g. 514). This marking indicates, in accordance with the design of the body of information, that the indicated units of information may be selected by the user in accordance with the memorization function of the invention. Each body of information can have its own unique rules for whether and how its various units of information can be acted upon by the MEMORIZATION function: a) no MEMORIZATION option at all, in which case there will be no MEMORIZATION indicator 106 when that unit of information is shown in a CONTENT area; b) collection in the DESIRE area with other information units until action on the collected units is elicited in accordance with the structure of the body of information, either automatically or by user selection of the DESIRE area; or c) selecting the MEMORIZATION indicator will directly elicit the action represented by the information unit in the corresponding CONTENT area.

Figure 5F:
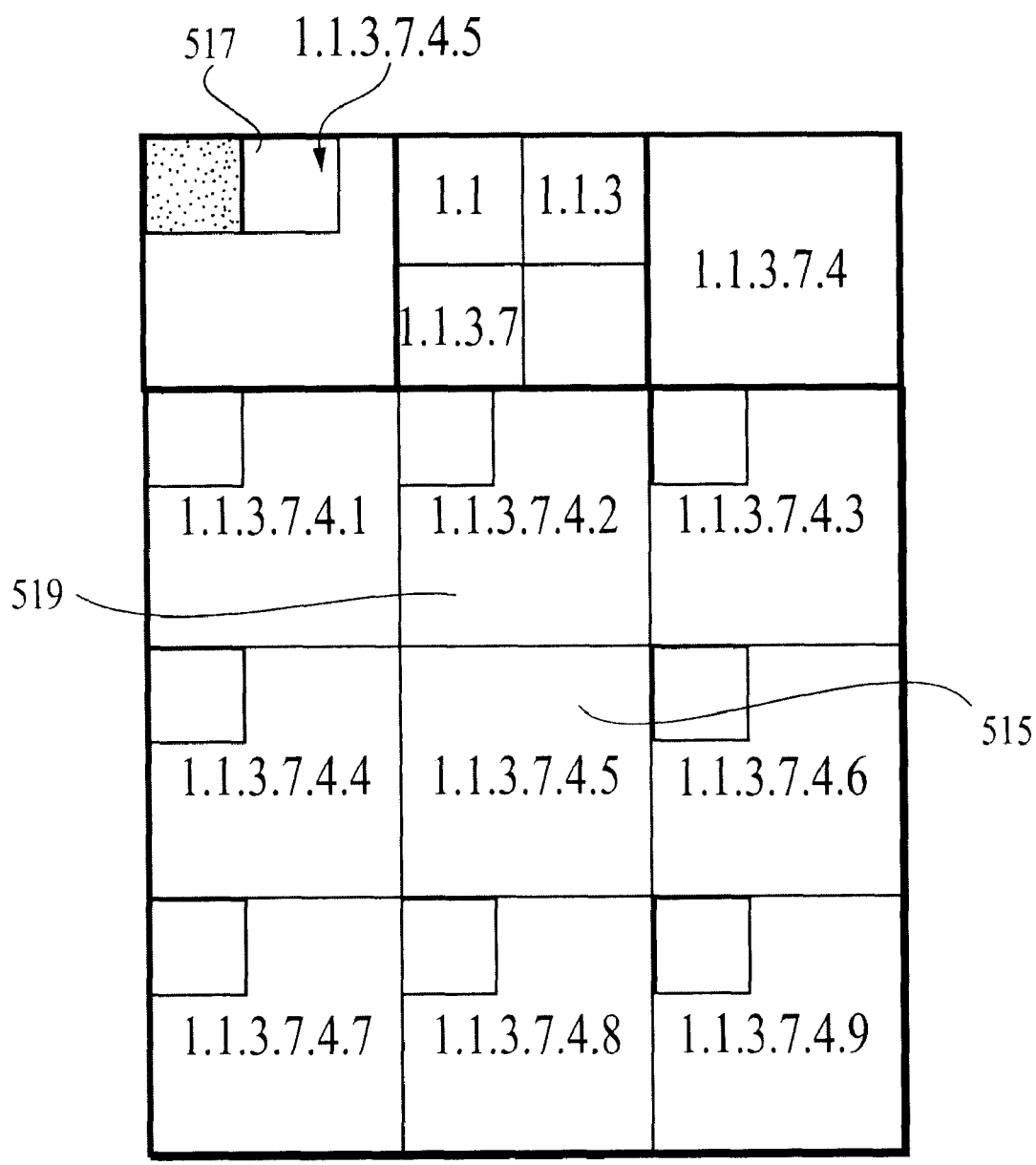
Figure 5G:
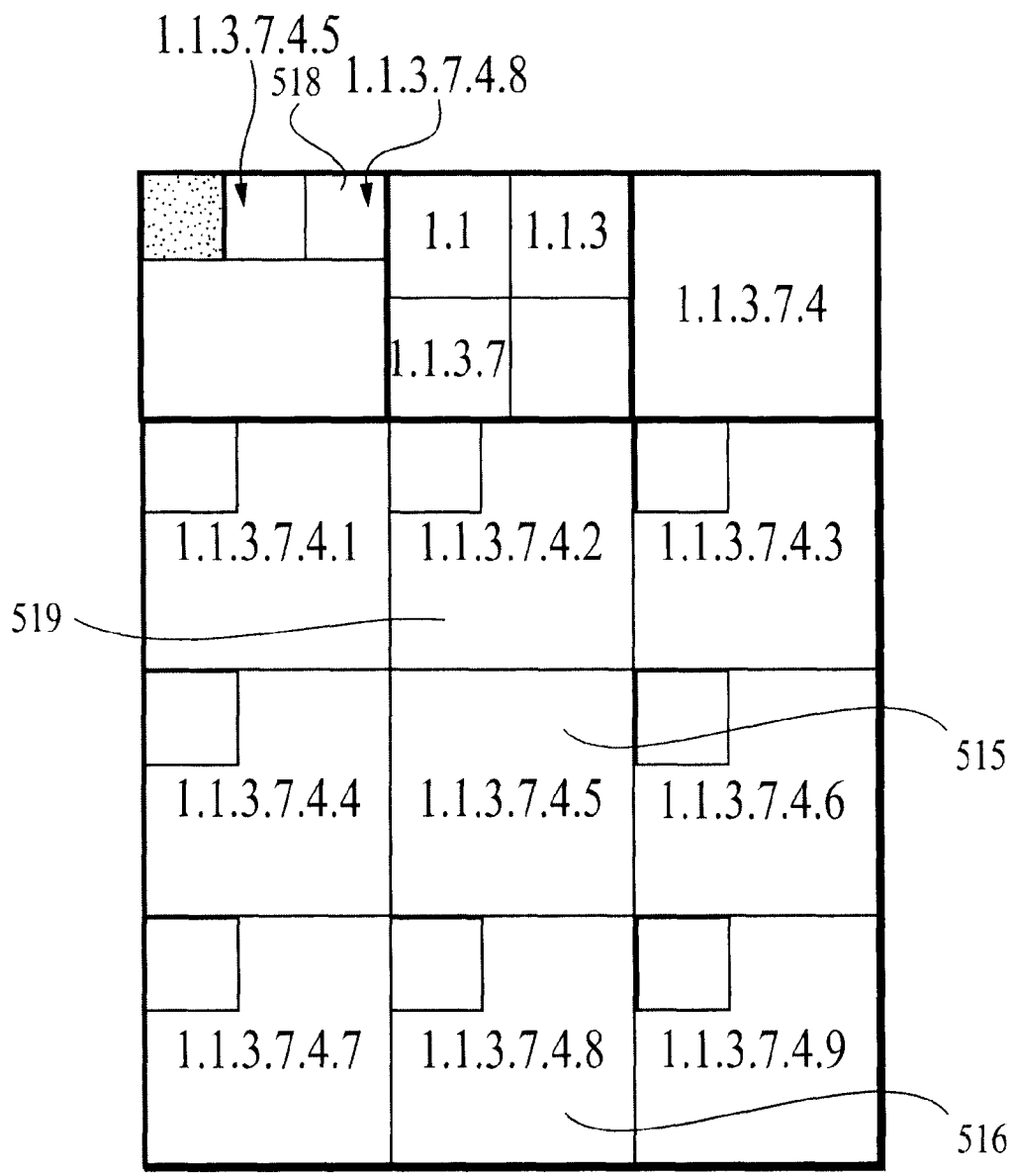

Continuing with the example, the user memorizes items "1.1.3.7.4.5" 515 as shown in FIG. 5F and then "1.1.3.7.4.8" 516 as shown in FIG. 5G by selecting the respective memorization corners in the squares where these items of information are represented. In FIG. 5F the representation of unit of information "1.1.3.7.4.5" now appears in two places on the grid: it remains in the content portion of the grid at 515, but it also appears in reduced form 517 in the desire portion of the grid. Similarly, in FIG. 5G unit of information "1.1.3.7.4.8" remains in the content portion of the grid at 516, and also appears in reduced form 518 in the desire portion of the grid. Note that the memorization corner has disappeared for "1.1.3.7.4.5", indicating that the item 515 can no longer be memorized, whereas the memorization corner of "1.1.3.7.4.8" remains, indicating that the item 516 can be memorized more than once. These differences are a function of the structure of the information hierarchy. The invention is adaptable to any of these differences.

Figure 5H:
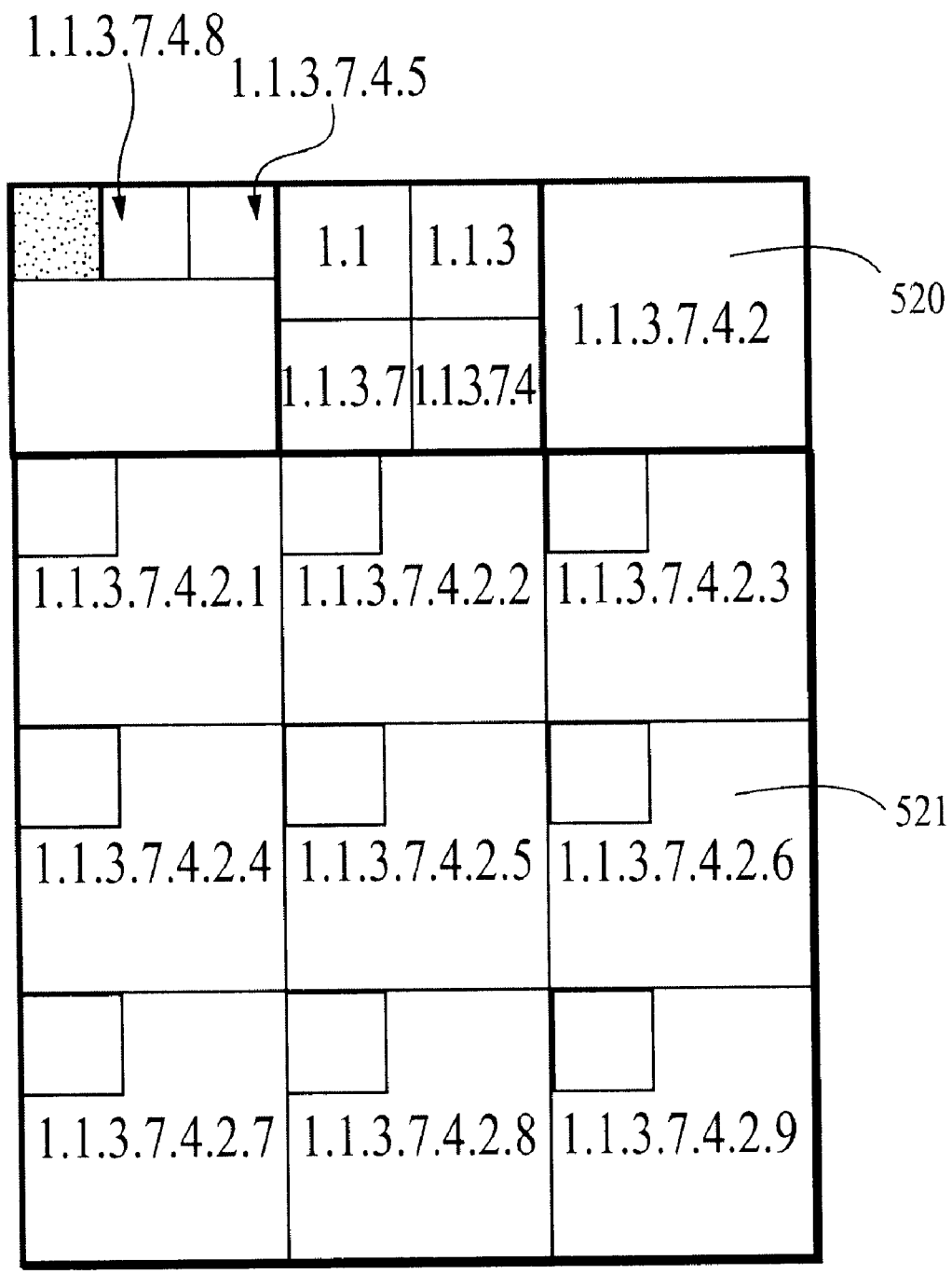
Figure 5J:
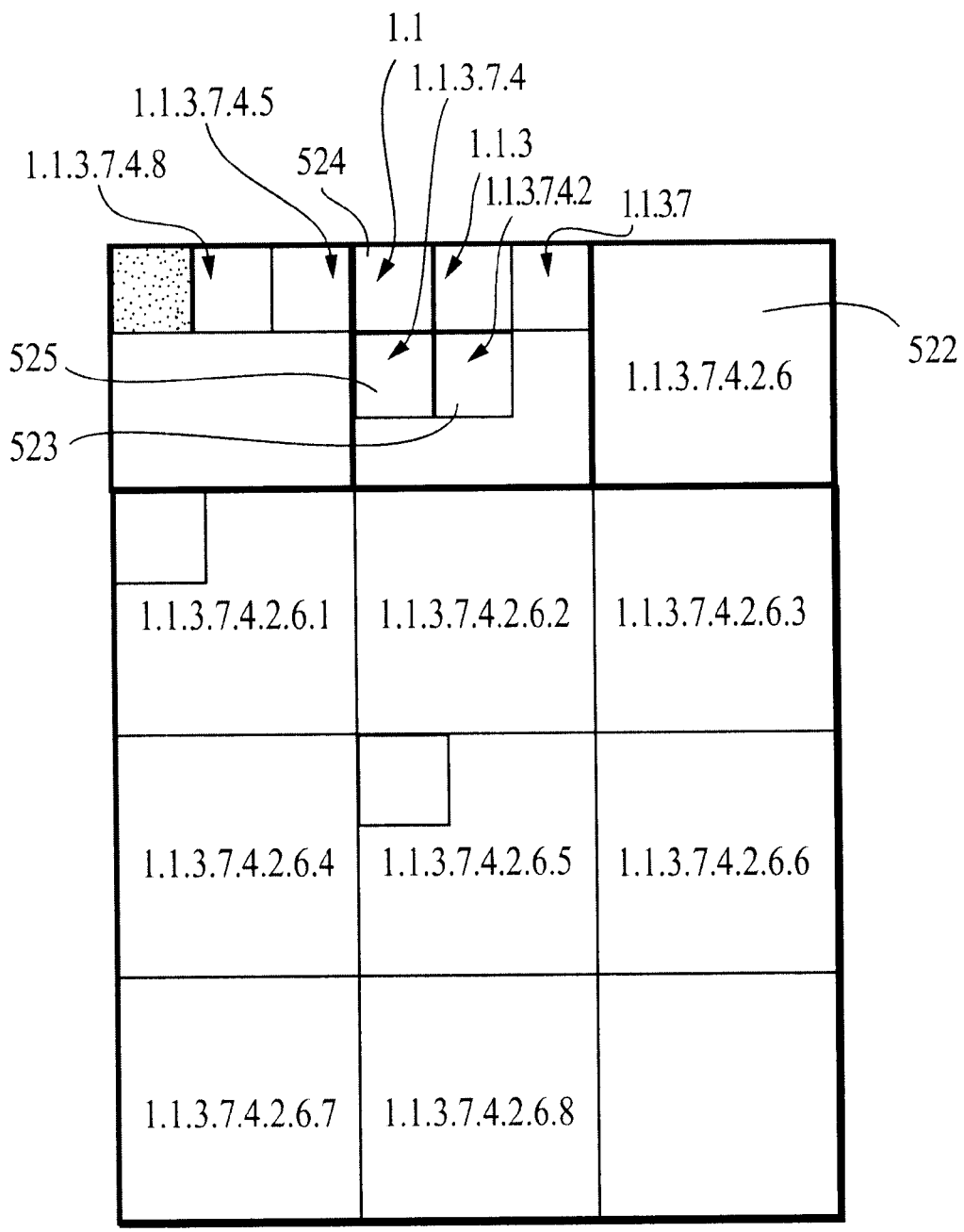
Figure 6A:
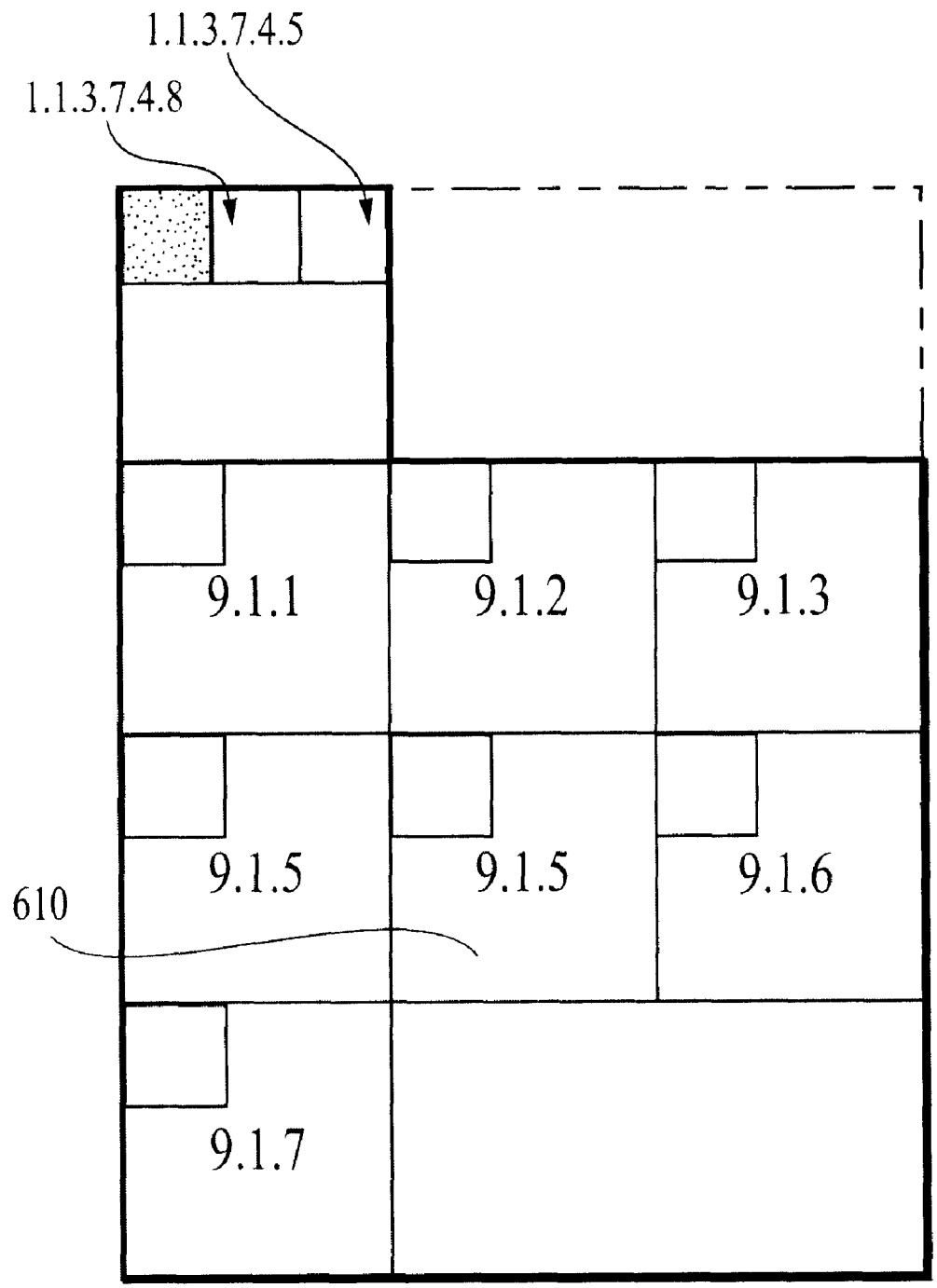
FIGS. 6A through 6D is a series of representations of displays on the information appliance, demonstrating overlays for the desire area.
Figure 6B:
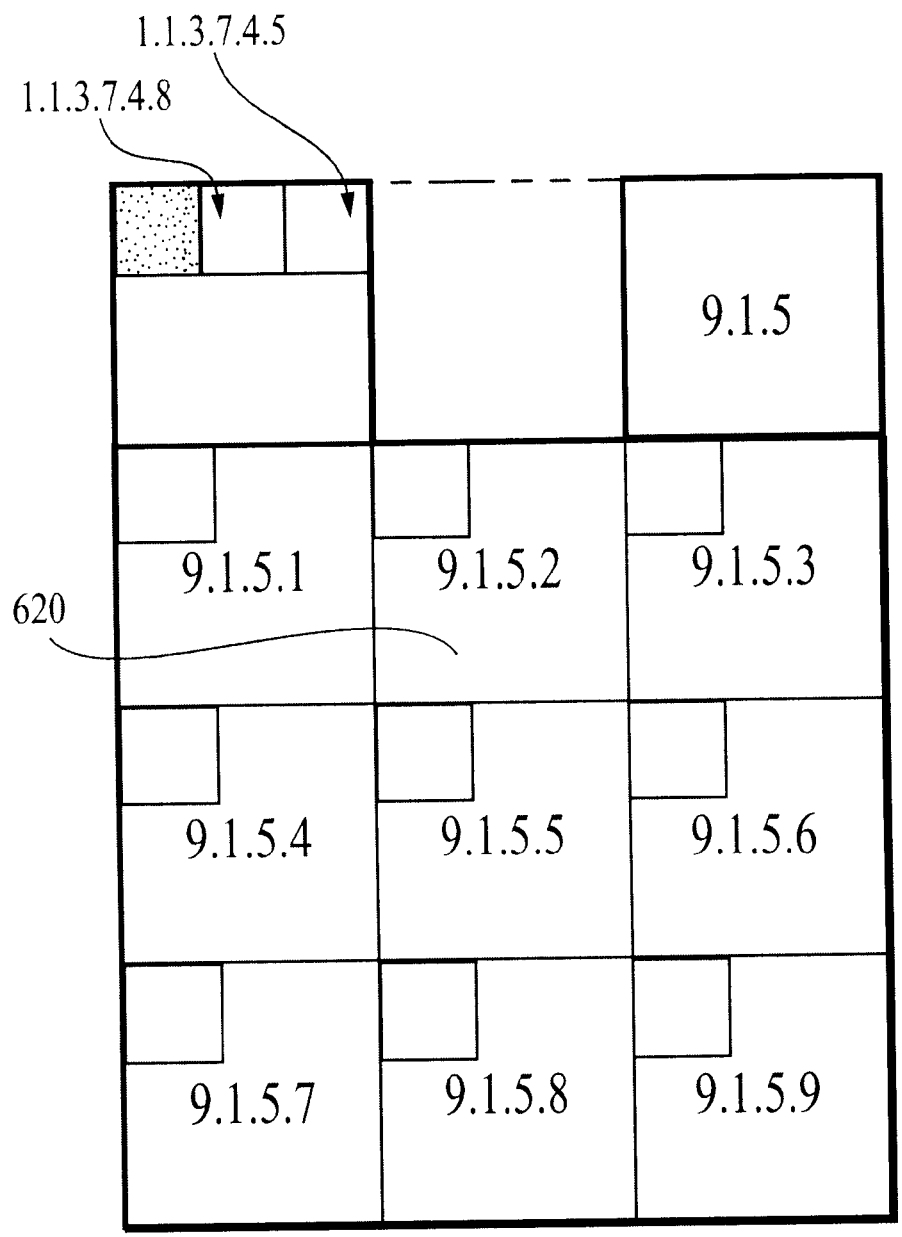
Figure 6C:
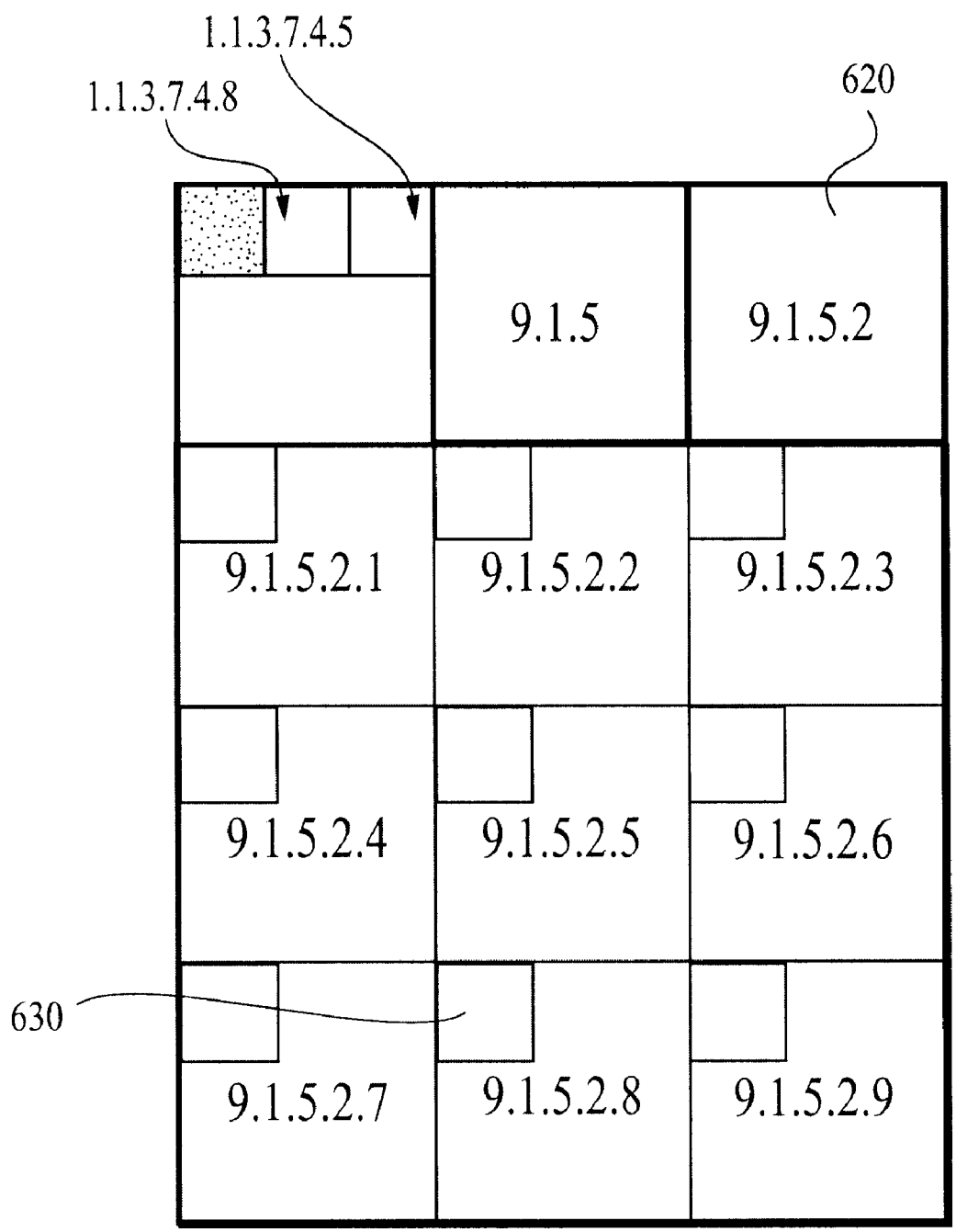
Figure 6D:
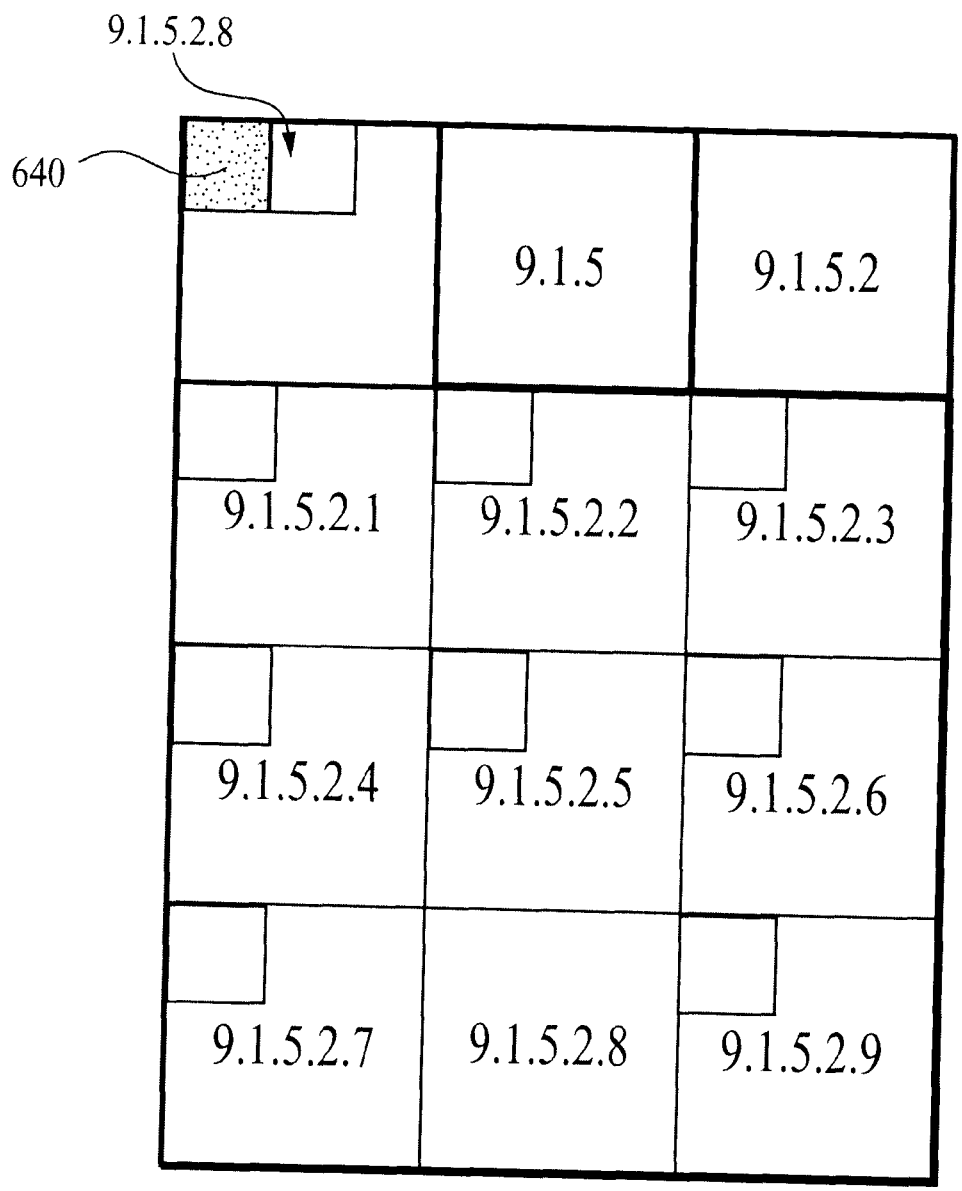
Figure 7A:
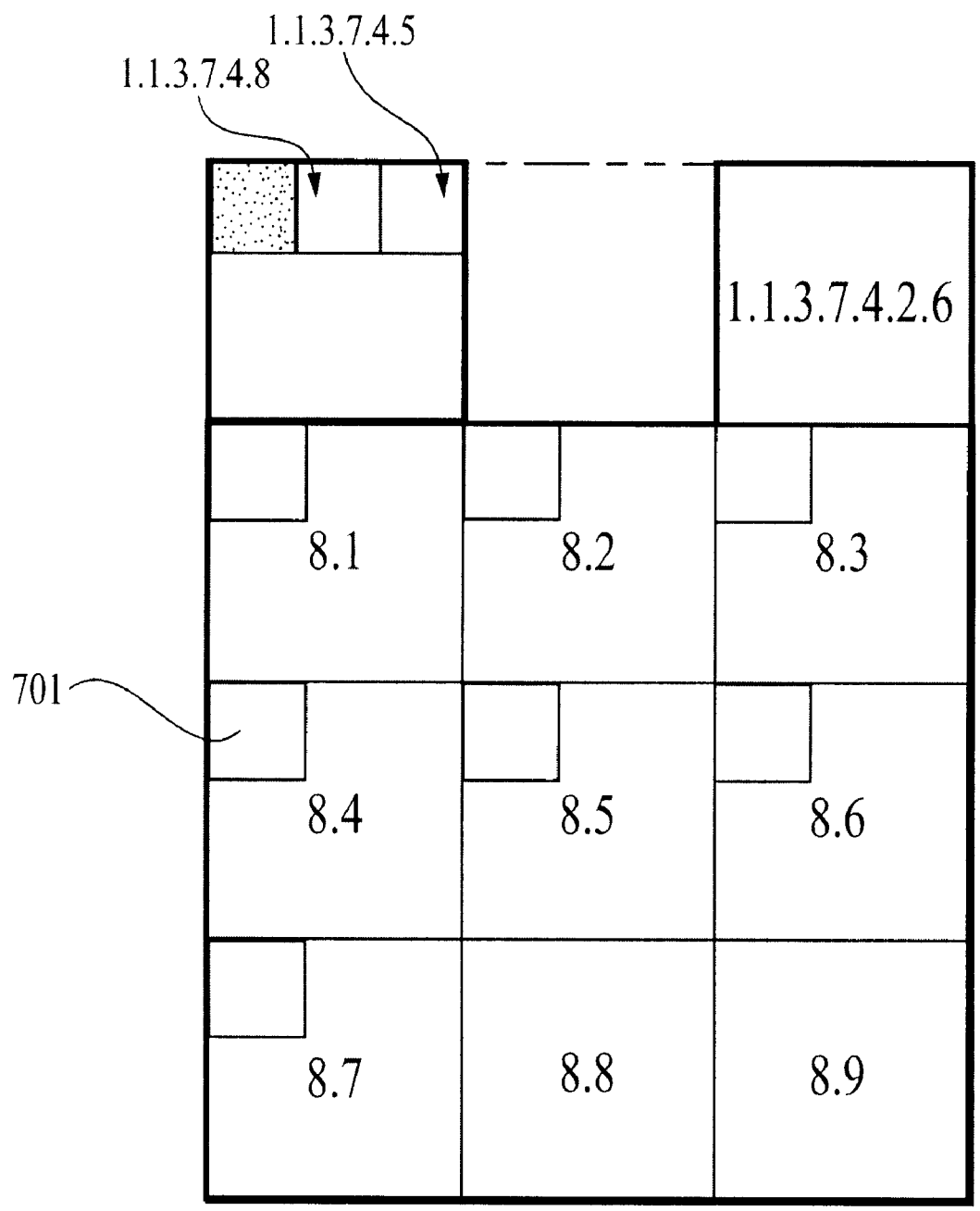
FIGS. 7A through 7F is a series of representations of displays on the information appliance, demonstrating overlays for the context area.
Figure 7B:
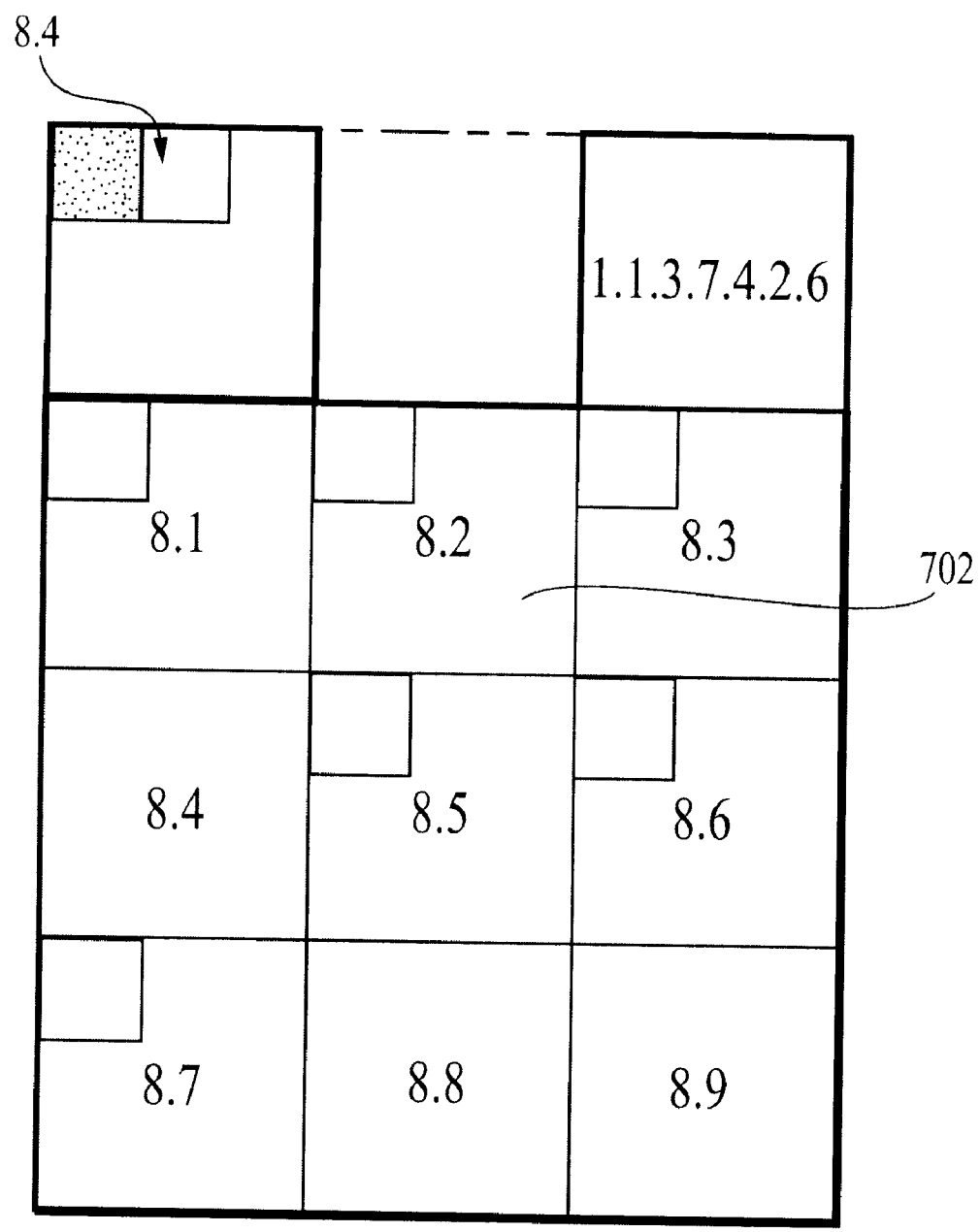
Figure 7C:
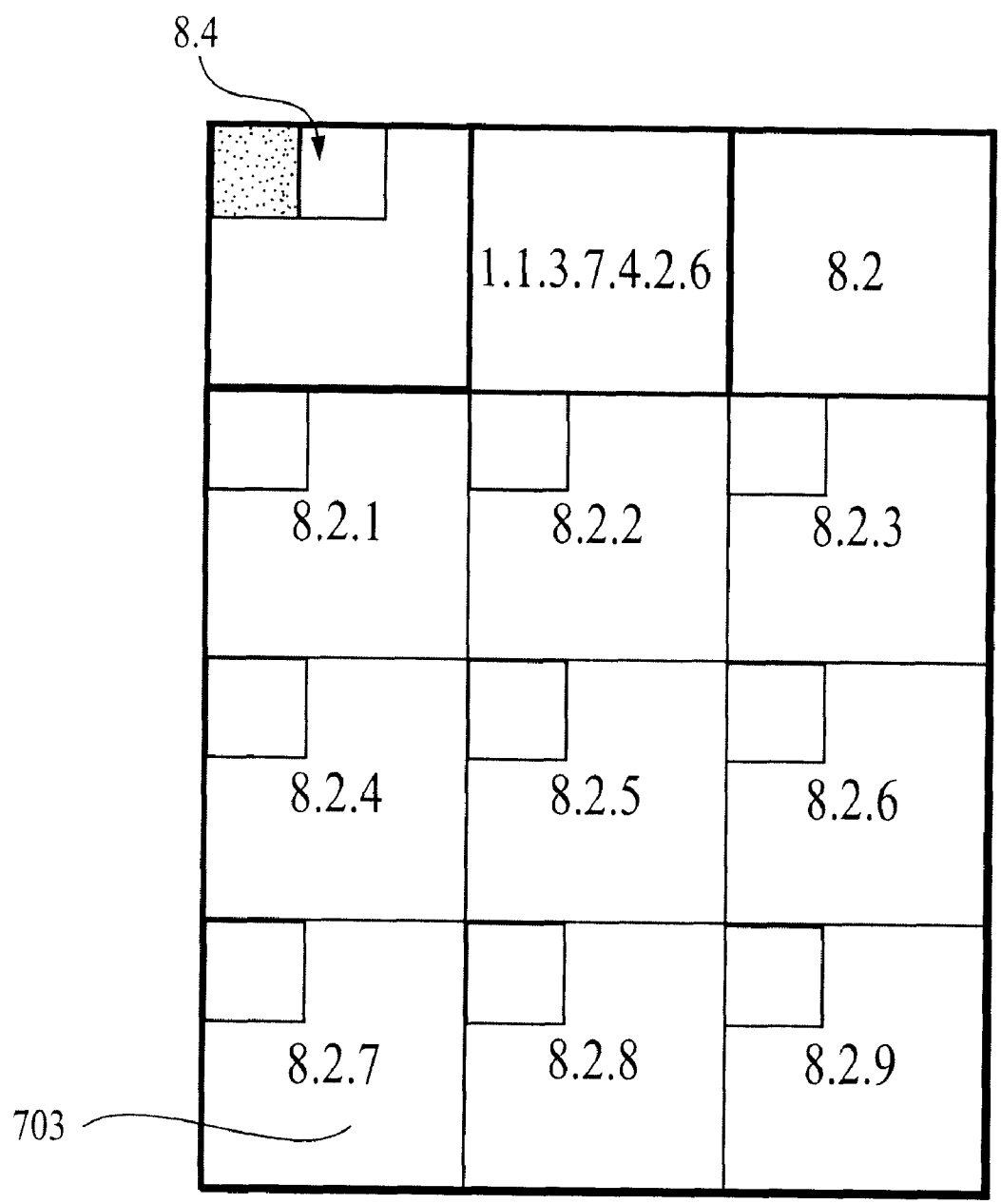
Figure 7D:
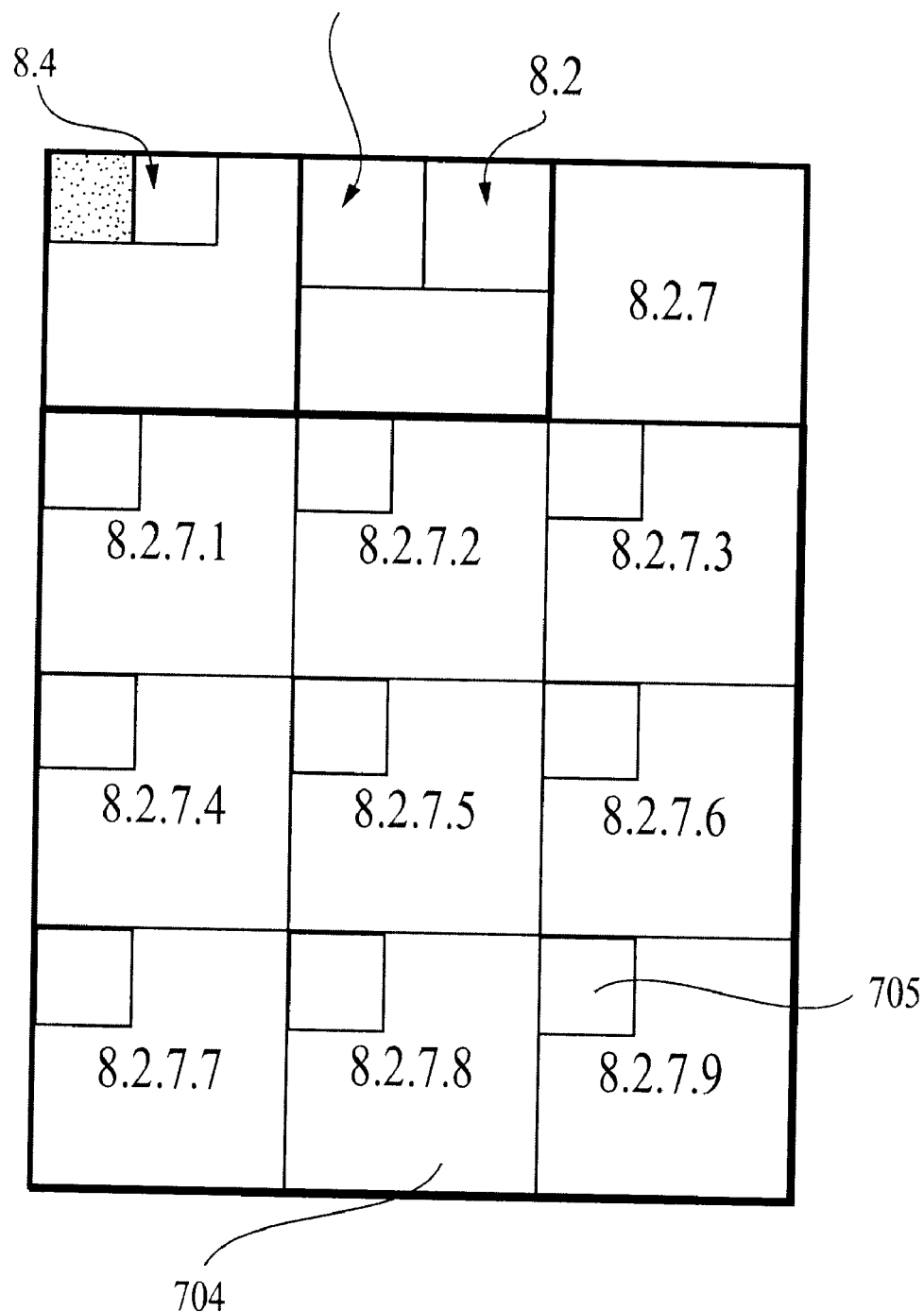
Figure 7E:
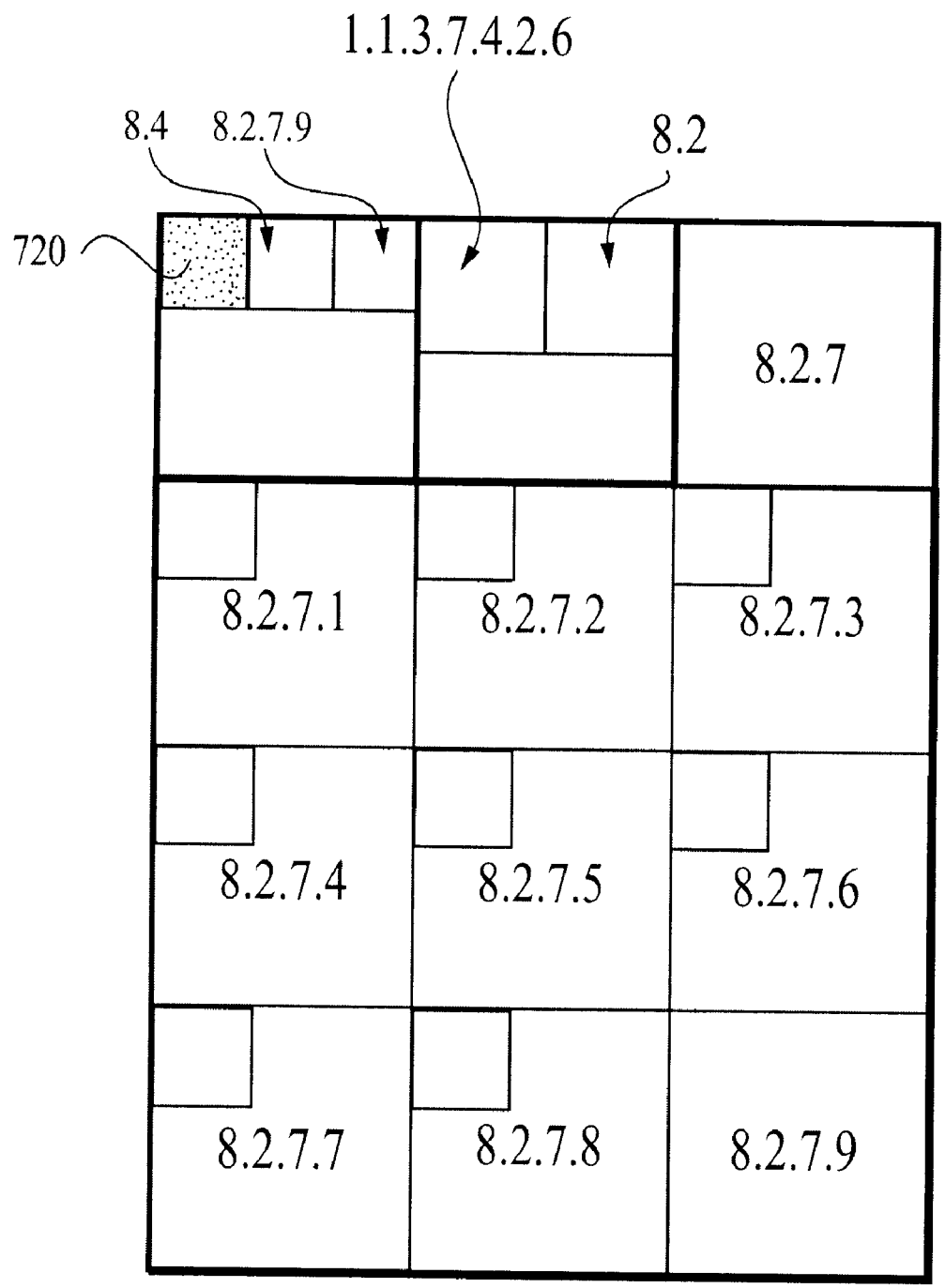
Figure 7F:
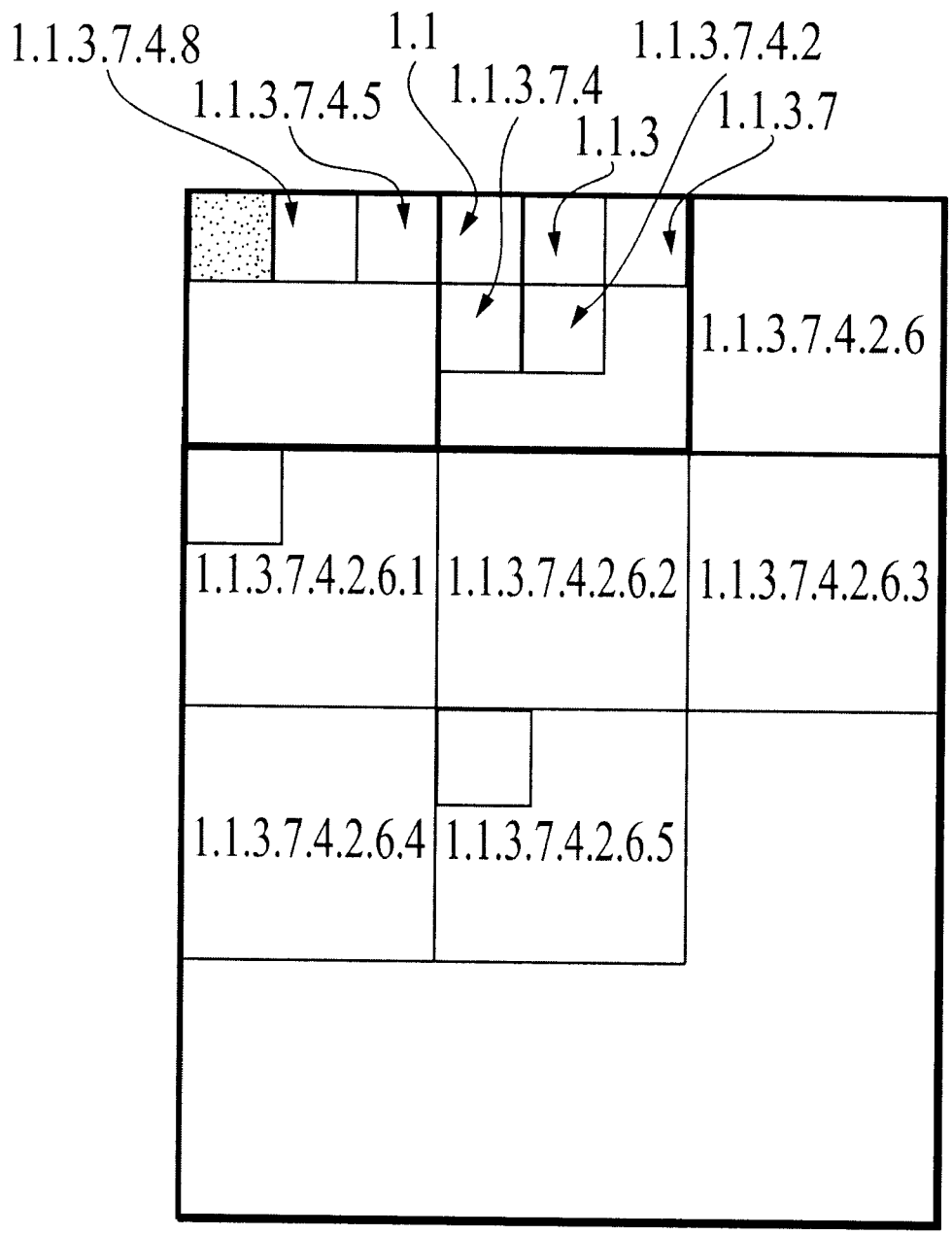

Continuing now with FIG. 5G, the user seeks further clarification of item "1.1.3.7.4.2" 519 and selects it. The results of this selection are shown in FIG. 5H. In the same manner as demonstrated above, the selected unit represented as "1.1.3.7.4.2" now appears in the context area 520, with the former contents of that context area (unit "1.1.3.7.4") now being moved to the identity portion of the grid. Now the user selects the item represented as "1.1.3.7.4.2.6" 521 for further clarification, and the results of this selection are shown in FIG. 5J. Note that one sub-area of the content display is blank, indicating that the number of choices at the current display level is less than the nine which can be shown in a three-by-three array. Unit of information "1.1.3.7.4.2.6" now appears in the context area 522, with the former contents of that context area (unit "1.1.3.7.4.2") now being moved to the identity portion of the grid. Note that now there are five units of information represented in the identity portion of the grid, unit "1.1", unit "1.1.3", unit "1.1.3.7", unit "1.1.3.7.4", and the newly added unit "1.1.3.7.4.2" 523. As before, the contents of the identity portion of the grid provide a means for the user to navigate back to higher levels in the information hierarchy. For example, in the preferred embodiment, if the user selects anywhere in the IDENTITY area two changes will be made in the display: first, newly added unit "1.1.3.7.4.2" 523 will be removed from the IDENTITY area and will become the contents of the CONTEXT area 522, replacing unit "1.1.3.7.4.2.6"; second, the units of information under unit "1.1.3.7.4.2" (i.e. the various units "1.1.3.7.4.2.x" where "x" is an integer between 1 and 9) are displayed in the CONTENT area. It will be observed that these changes return the display to that shown in FIG. 5H. Similarly, a further selection in the IDENTITY area will return the display to that shown in FIG. 5G.

Note that the size of the representations of the units of information shown in the identity portion of the grid has been reduced again (compare the change in size of unit "1.1" in the IDENTITY areas of FIG. 5C, FIG. 5D and FIG. 5J) in order to accommodate the number of units shown. Note also that it would be feasible, where a limited number of information units are displayed in the IDENTITY area, to enable the user to select individual units in the IDENTITY area. In such an implementation, for example, the user could return from the display shown in FIG. 5J directly to the display shown in FIG. 5H by selecting unit "1.1.3.7.4" 525 in the IDENTITY area, instead of selecting twice in the IDENTITY area using the LIFO queue methodology. However, even in such an implementation, at some threshold level there may be too many information units displayed in the IDENTITY area to be readily distinguished and selectable by the user, and therefore beyond that level it is appropriate to revert to the LIFO queue methodology.

Turning now to FIG. 6 we will illustrate the operation of the DESIRE overlay feature. As with FIG. 5J, two units of information have been collected in the DESIRE area, "1.1.3.7.4.5" and "1.1.3.7.4.8." If the human user desires to act upon these collected units he selects REPLICATE in the DESIRE area and will be shown alternative choices for action, which are now shown in the content area of FIG. 6A. These choice alternatives may reflect a hierarchy of information as demonstrated above, resulting in successive selection of "9.1.5" 610, which is moved to CONTEXT in FIG. 6B, and "9.1.5.2" 620, which is moved to CONTEXT in FIG. 6C. Then, in FIG. 6D, item "9.1.5.2.8" is memorized by selecting the MEMORIZATION indicator 630, and the memorized item then replaces the former contents of the DESIRE area. If the darkened corner REPLICATE 640 of the DESIRE area is then selected, the action is complete and the display will return to the content area displayed in FIG. 5J. Note that in FIGS. 6A through 6D any areas containing being used for the desire overlay are outlined in gray. Such highlighting provides a convenient reminder to the user that an overlay is in operation.

Turning now to FIG. 7, there is shown a similar overlay pattern for the CONTEXT area. However, the context sensitive overlays for CONTEXT are typically (but not always) properties. These choices may similarly be navigated through as shown in FIGS. 7A through 7F with selections being made, and then returning to the prior display (similar to FIG. 5J) when the replicate button is selected. Beginning with the display shown in 5J, selection of the CONTEXT area results in the display shown in FIG. 7A, where the CONTENT area has been replaced with units "8.1" through "8.9". Note that units "8.1" through "8.7" have MEMORIZATION indicators and may be memorized. The MEMORIZATION indicator 701 is selected and unit "8.4" then replaces the contents of the DESIRE area, as shown in FIG. 7B. Then unit "8.2" 702 is selected and moved to the CONTEXT area as shown in FIG. 7C. Similarly unit "8.2.7" 703 is selected and moved to the CONTEXT area as shown in FIG. 7D. Note the movement of the information units from CONTEXT area to IDENTITY area, as described earlier, and the opening up of further levels of the information hierarchy each time a unit in the CONTENT area is selected. Note also, however, that if there were no further levels in the hierarchy, in a preferred embodiment the selected item after being moved to the CONTEXT area would be shown in enlarged form in the CONTENT area. However, in other embodiments, as shown in connection with the discussion of FIG. 7D, nothing would happen when the unit was selected, signaling to the user that the item, in accordance with the structure of the information hierarchy, could not be further CLARIFIED. This is shown by the selection of item "8.2.7.8" 704 in FIG. 7D, which results in no change in the display. Then item "8.2.7.9" is MEMORIZED by selecting the memorization indicator 705, with the result shown by the addition of item "8.2.7.9" to the DESIRE area in FIG. 7E. Note that in FIGS. 7A through 7E any areas containing being used for the context overlay are outlined in gray. Such highlighting provides a convenient reminder to the user that an overlay is in operation. At this point the REPLICATE button 720 is selected in the desire area, completing the CONTEXT overlay first shown in FIG. 7A, resulting in a return (displayed in FIG. 7F) to a version of the FIG. 5J display modified by the properties represented by the MEMORIZED items "8.4" and "8.2.7.9". Note in FIG. 7F that only those choices of the FIG. 5J display remain which satisfy the properties selected through this overlay process. In particular, items "1.1.3.7.4.2.6.6", "1.1.3.7.4.2.6.7" and "1.1.3.7.4.2.6.8" from FIG. 5J did not satisfy the selected properties and no longer appear, as shown in FIG. 7F.

The foregoing characteristics of the invention will now be demonstrated by an example, with reference to FIG. 9, which shows a complete sequence of display screens in accordance with the invention, where the information content is organized as it might be in a telephone yellow pages, and where the invention is used to place an order for food at a restaurant over the Internet. In each of the figures in the sequence, FIGS. 9A through 9Y, there is shown a grid layout in conformity with FIG. 1B, with information in the various areas of CONTEXT 101, IDENTITY 102, DESIRE 103 and CONTENT 110 (which may be broken up into a 3x3 array of CONTENT 104 areas, where each such CONTENT 104 area may have an area 106 for indicating the memorization function). The manner of progression in the sequence is also indicated: on each figure is a black dot with a line extending therefrom, which indicates (by the location of the black dot) the area which is touched, thereby activating the system in accordance with the invention as described above and.producing a new display, conforming to the grid layout of FIG. 1B and having the content shown in the next figure in sequence.

Figure 9A:
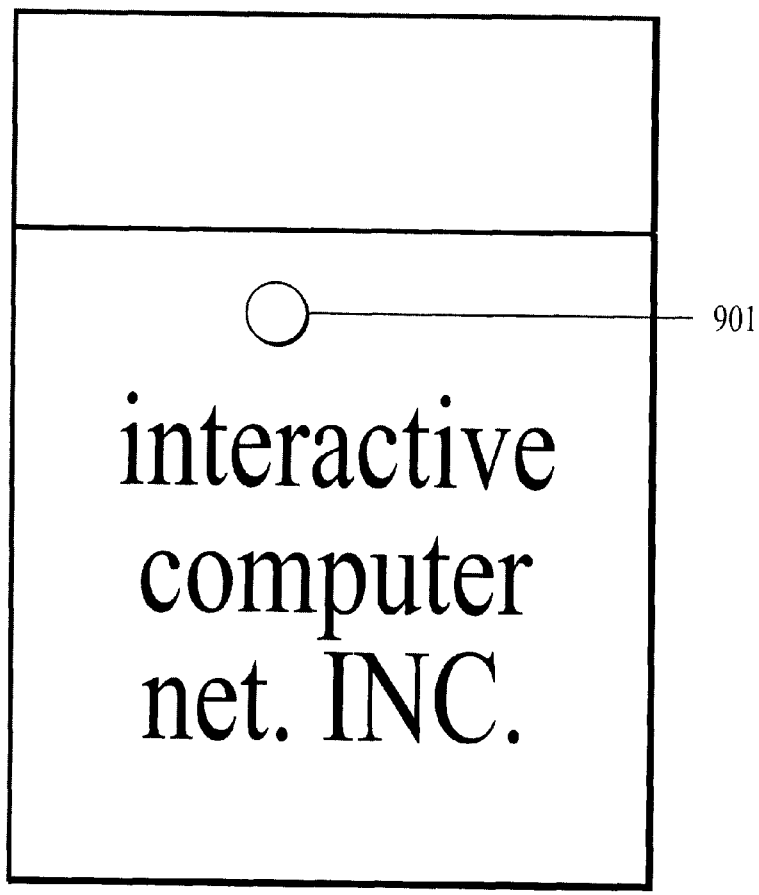
FIGS. 9A through 9Y is a series of representations of displays on the information appliance, demonstrating operation of the invention as it might be implemented to emulate a yellow pages directory.
Figure 9B:
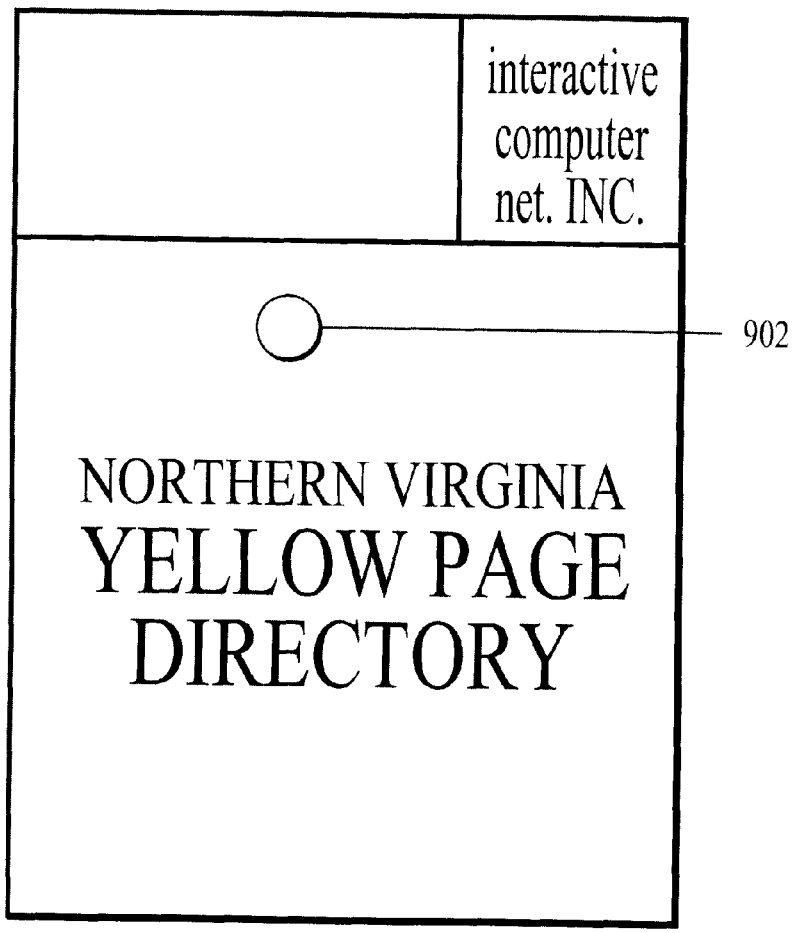
Figure 9B:
Figure 9C:
Figure 9C:
Figure 9D:
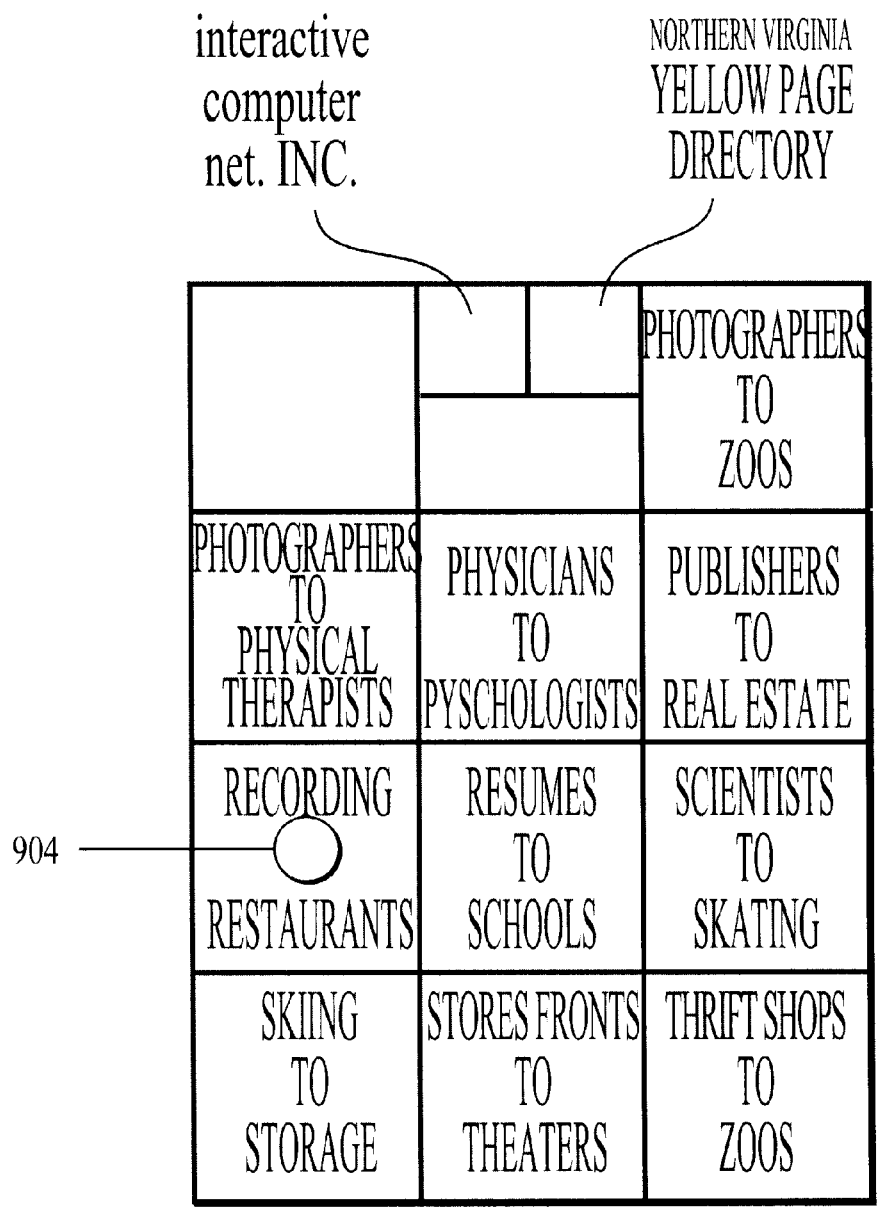
Figure 9E:
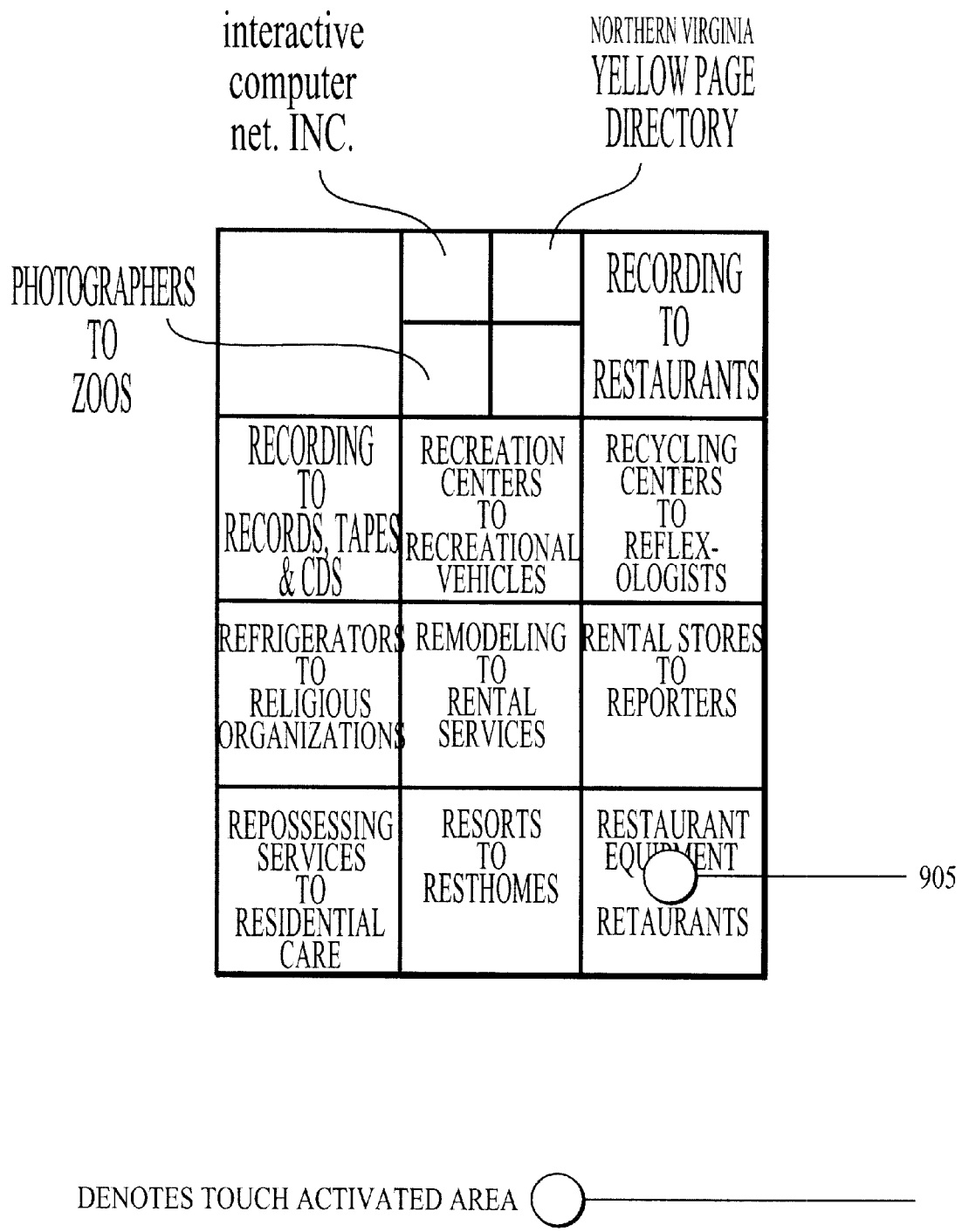
Figure 9F:
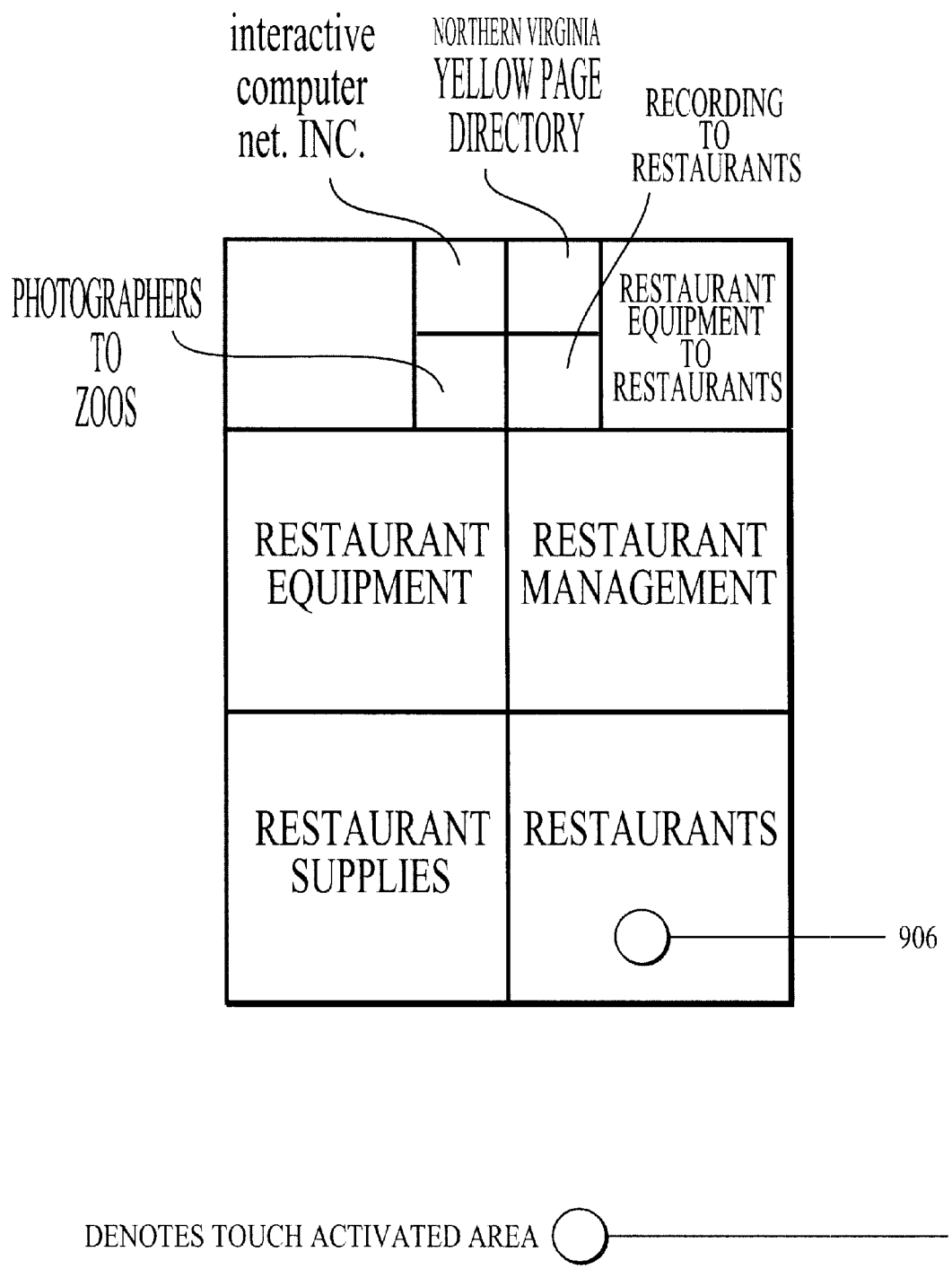

FIG. 9A begins the sequence with a display of "Interactive Computer Net, Inc.", which may be an Internet Service whose selection 901 provides access to the Yellow Pages in Northern Virginia, as shown in FIG. 9B. Selection of the Yellow Pages item 902 produces an alphabetical range presentation shown in FIG. 9C. If the user is seeking "restaurants", that would be found in the selection 903, "Photographers to Zoos". CLARIFICATION continues in FIG. 9D with the selection 904 of "Recording to Restaurants" and in FIG. 9E with the selection 905 of "Restaurant Equipment to Restaurants." Note that in FIG. 9F there are only four options shown within the "Restaurant Equipment to Restaurants" range. Upon selection 906 of "Restaurants" another alphabetical list—this time of restaurant names—appears as shown on FIG. 9G.

Figure 9G:
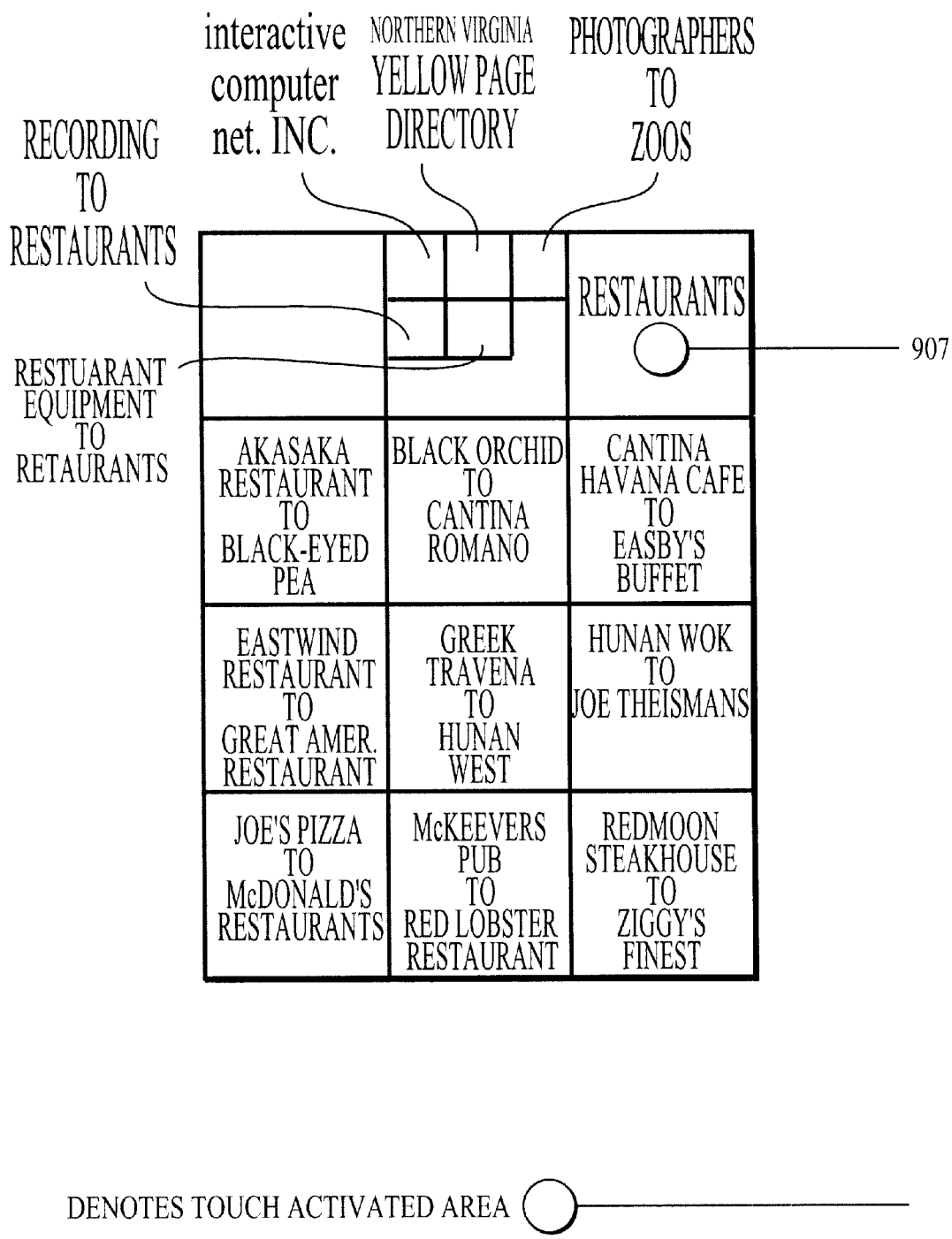
Figure 9H:
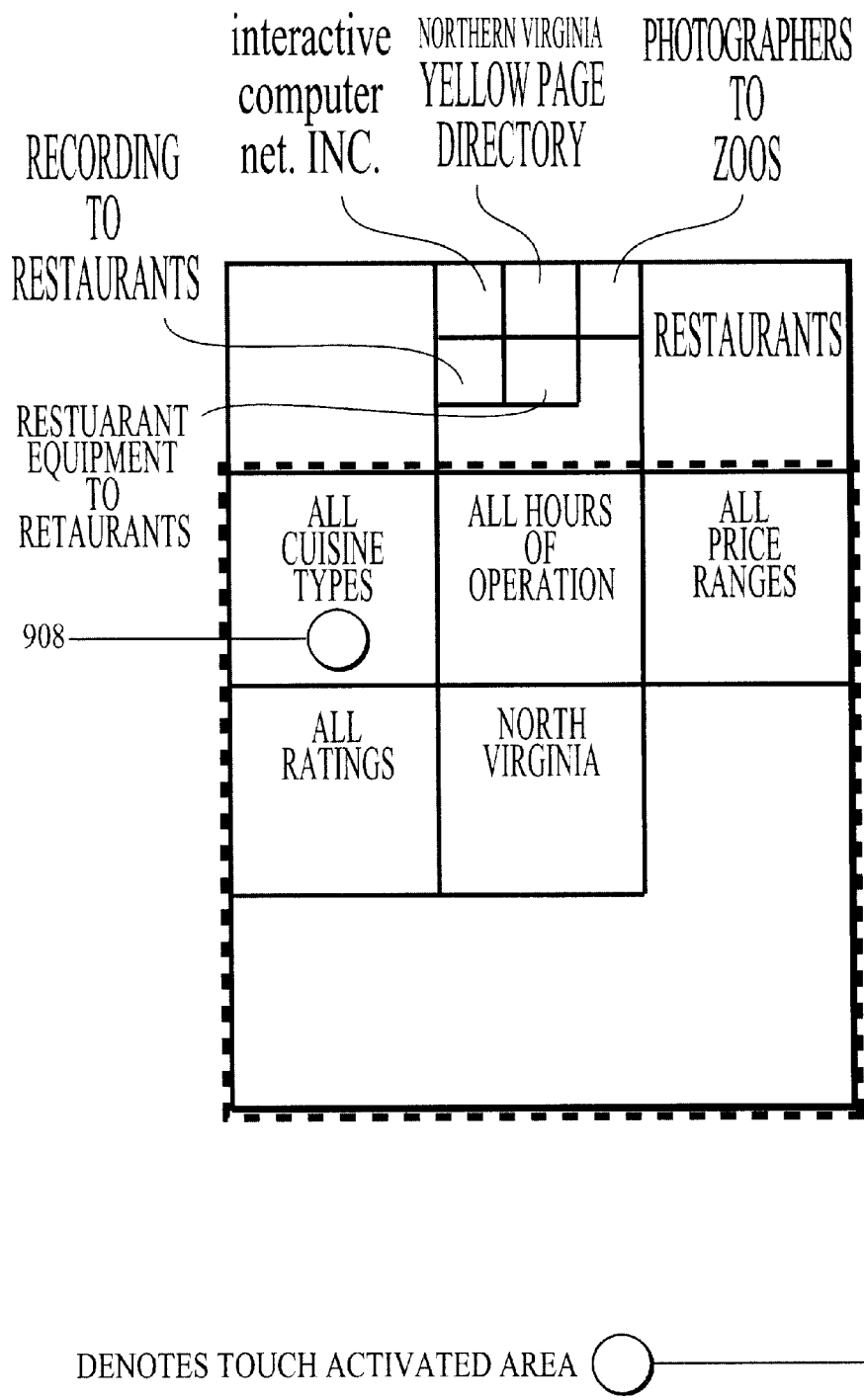
Figure 9J:
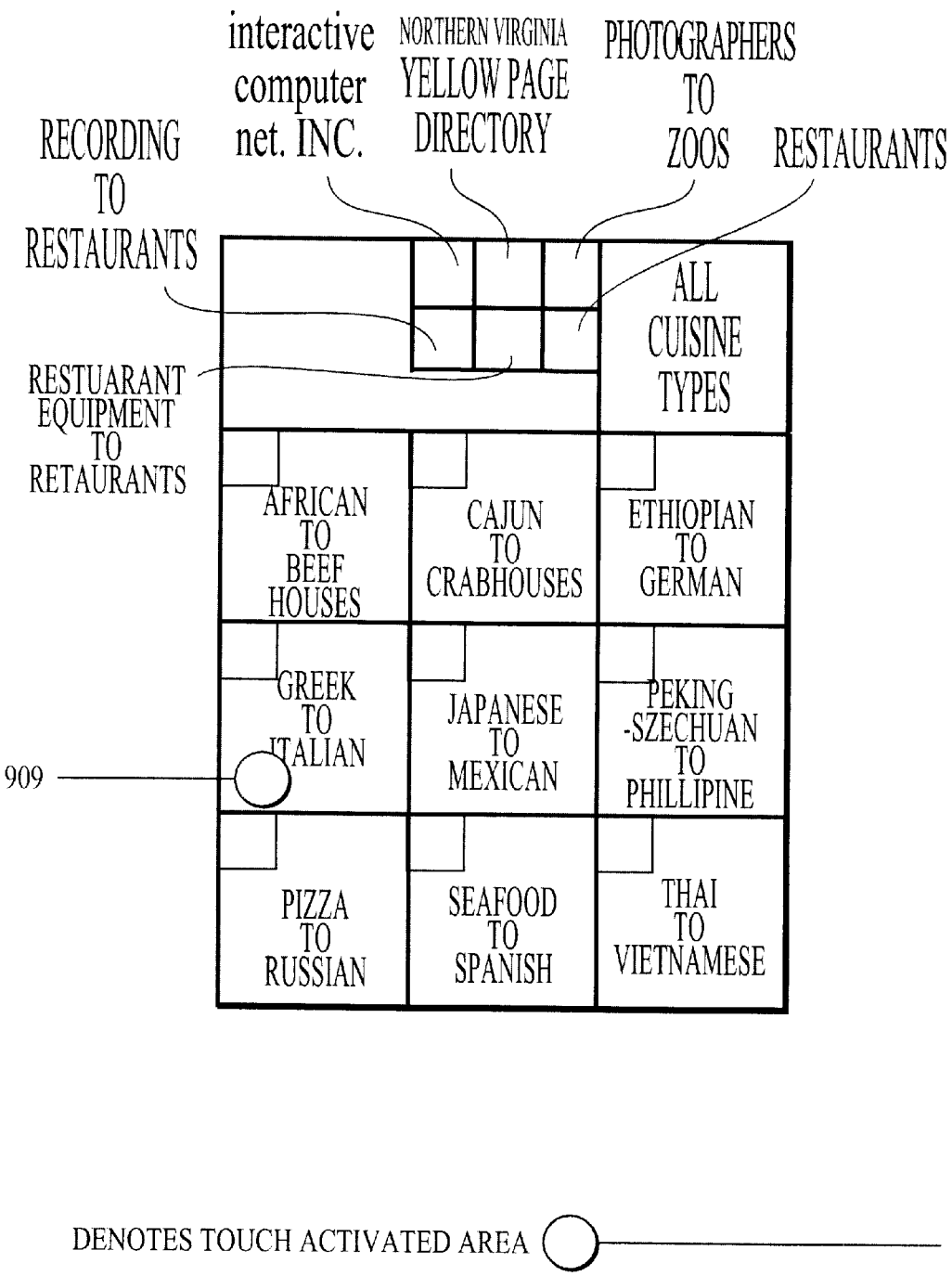
Figure 9K:
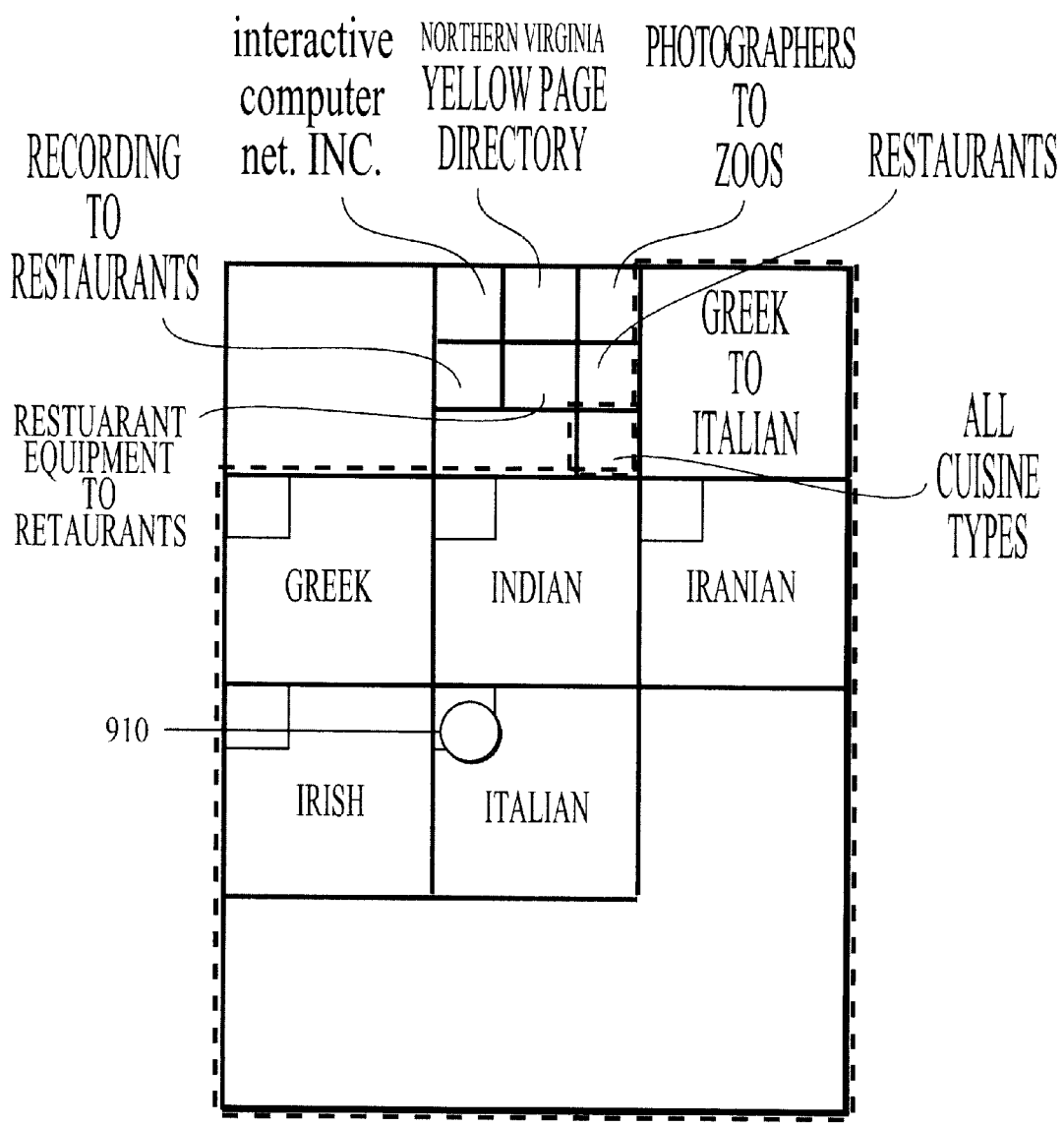
Figure 9L:
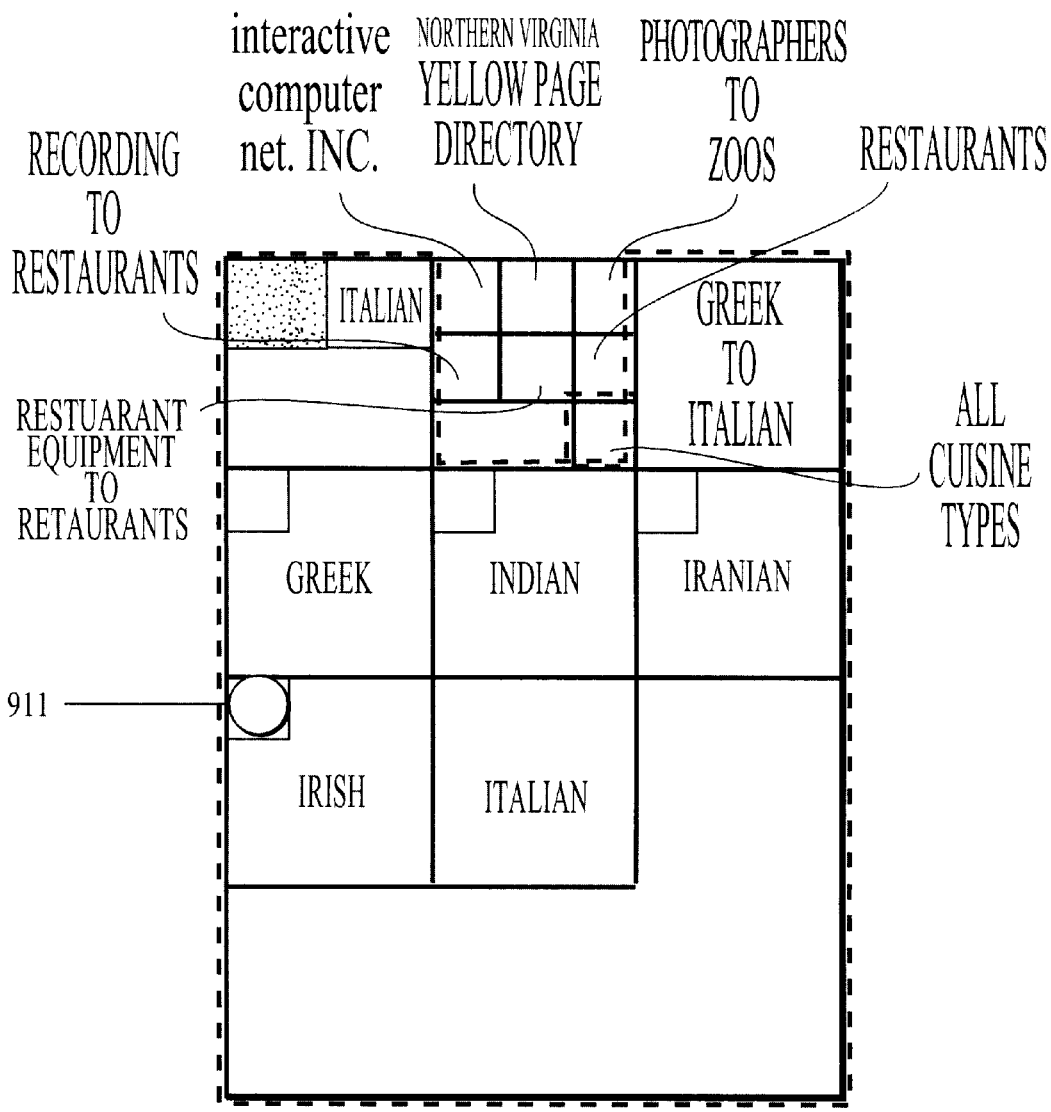
Figure 9M:
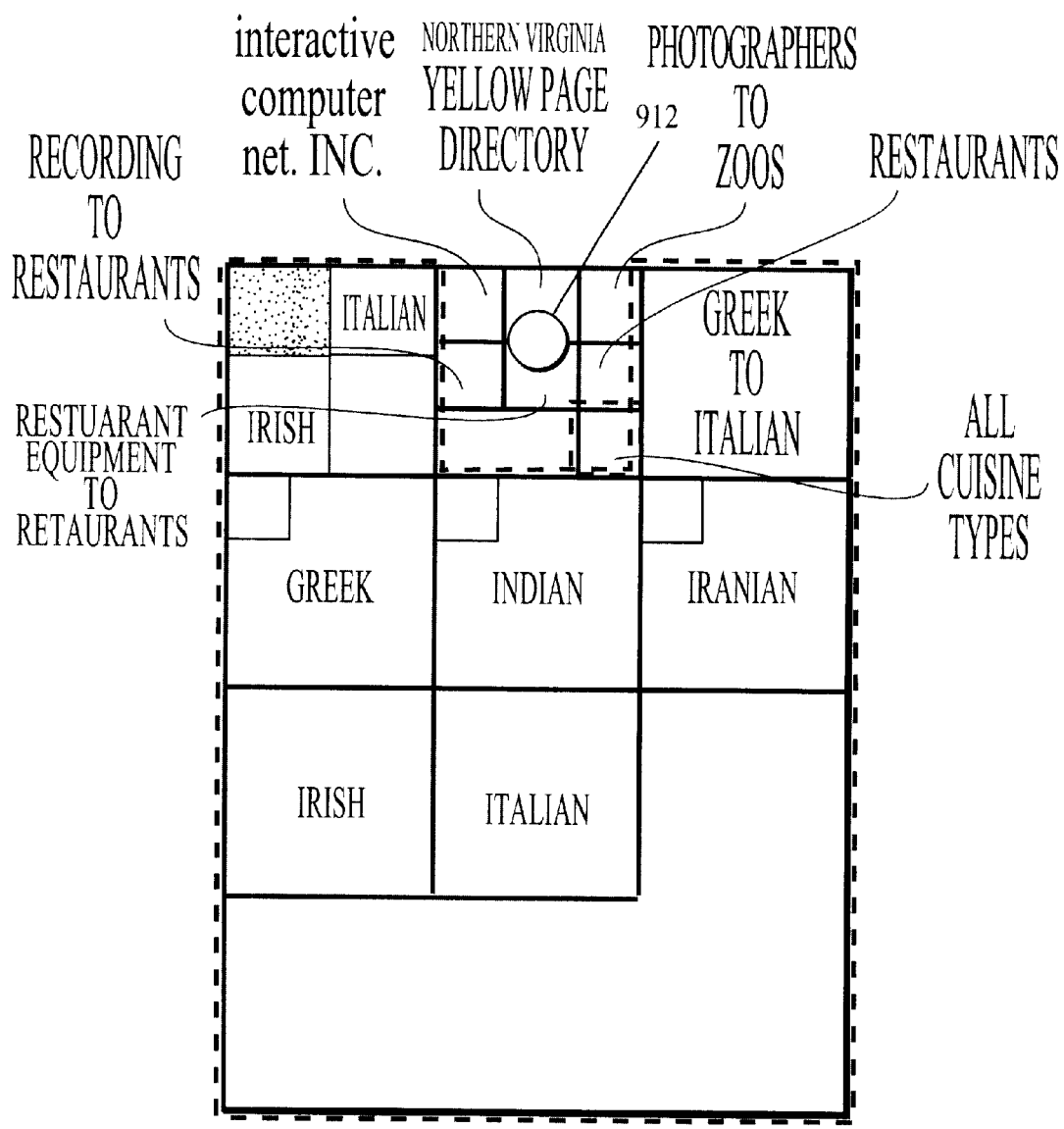
Figure 9M:
Figure 9N:
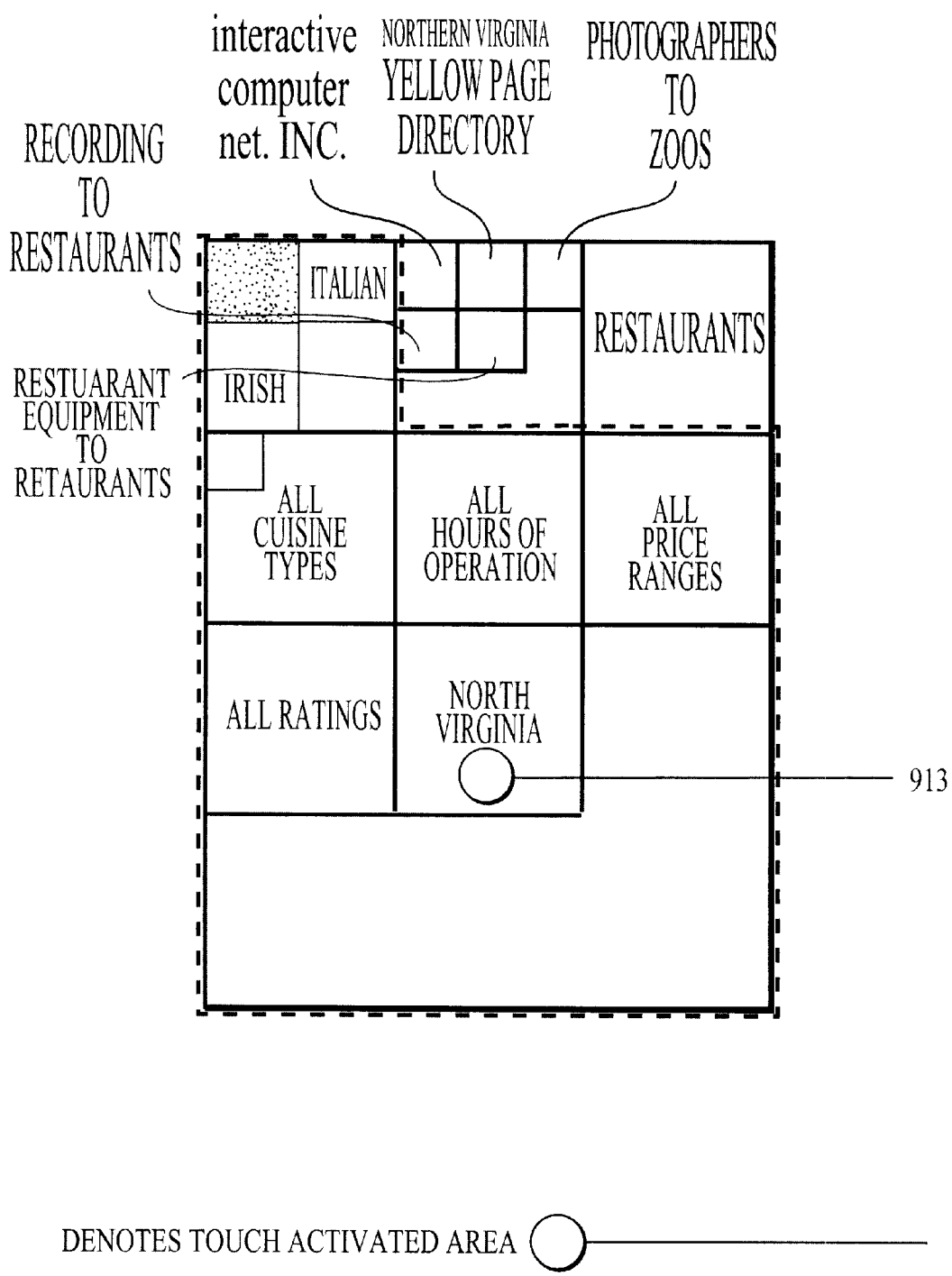

At this point the user decides to take another approach to finding the desired restaurant. An alphabetical listing is not the only ordering principle that may be used by "Interactive Computer Net, Inc." in structuring the Yellow Pages information base. These alternatives may be found, as they apply to "Restaurants", by selecting the CONTEXT area 907 to obtain an overlay of properties as shown in FIG. 9H. Five categories of properties are shown. Note that none of them may be applied to the "Restaurant" category, since no MEMORIZATION indicator is shown. Further CLARIFICATION is needed, and "All Cuisine Types" 908 is selected, with the results shown in FIG. 9J. CLARIFICATION is continued through another alphabetical range display by selection 909 of "Greek to Italian" and MEMORIZATION of "Italian" 910 as shown in FIG. 9K and also "Irish" 911 as shown in FIG. 9L. Note that these selections appear in the DESIRE area as shown in FIG. 9M. The user, having selected his or her desired types of cuisine then navigates back to the alternative categories by selecting 912 the IDENTITY area twice, first to return to the alphabetical range display of "All Cuisine Types" (see FIG. 9J) and then to the alternative categories shown in FIG. 9N. Note in FIG. 9N that "All Cuisine Types" now has a MEMORIZATION indicator of a possible action that may be elicited. For example, the user might think better of limiting choices to "Irish" and "Italian" and remove one or both of those limitations by selecting the MEMORIZATION indicator for "All Cuisine Types". Depending on how the Yellow Pages information hierarchy was structured, the elicited action might be to "clear" all choices of cuisine shown in the DESIRE area, or it might be to clear individual choices in a LIFO sequence. If more than one action may be chosen, a DESIRE OVERLAY may be employed, as described earlier in connection with FIGS. 6A–6D.

Figure 9P:
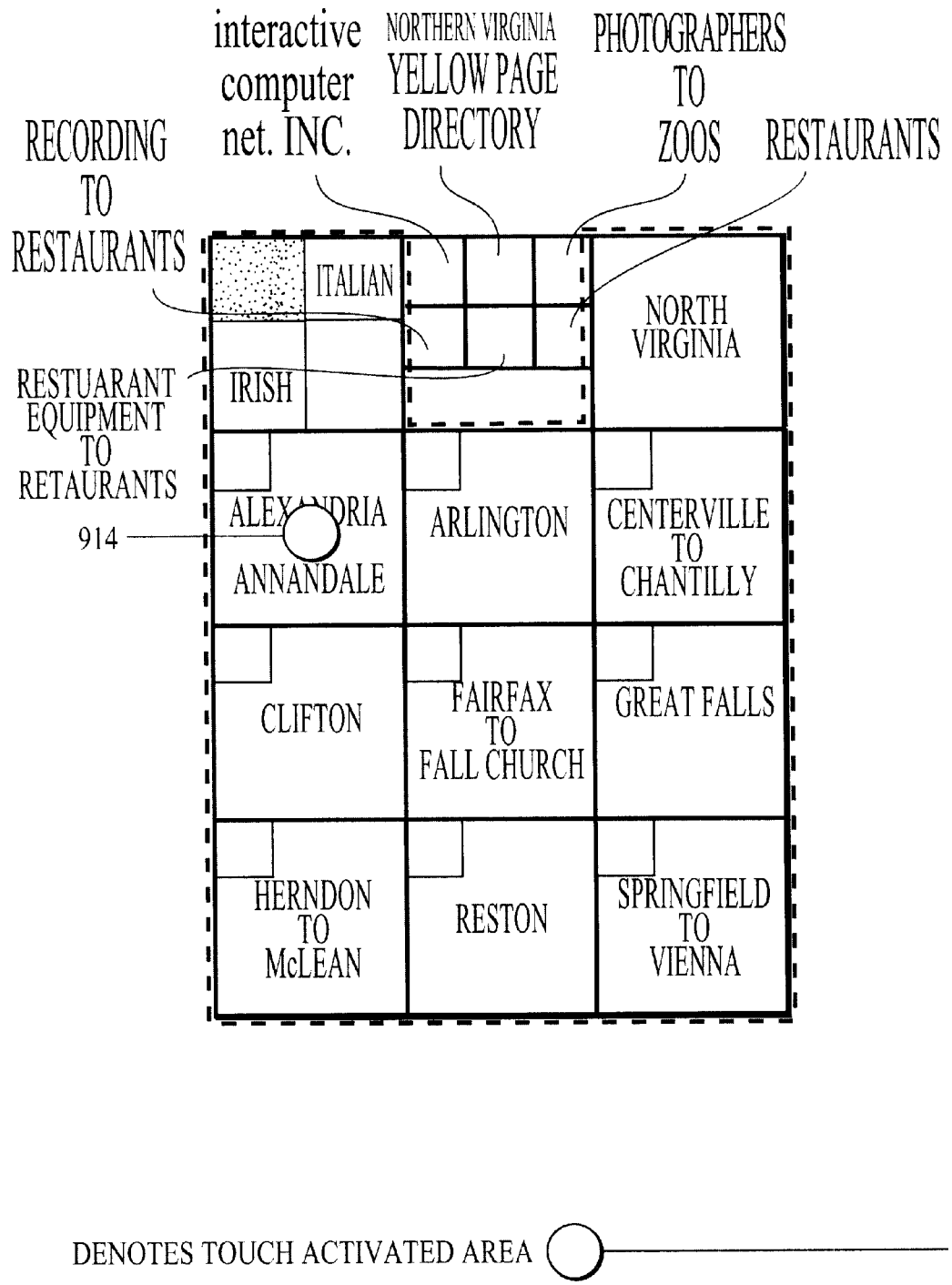
Figure 9Q:
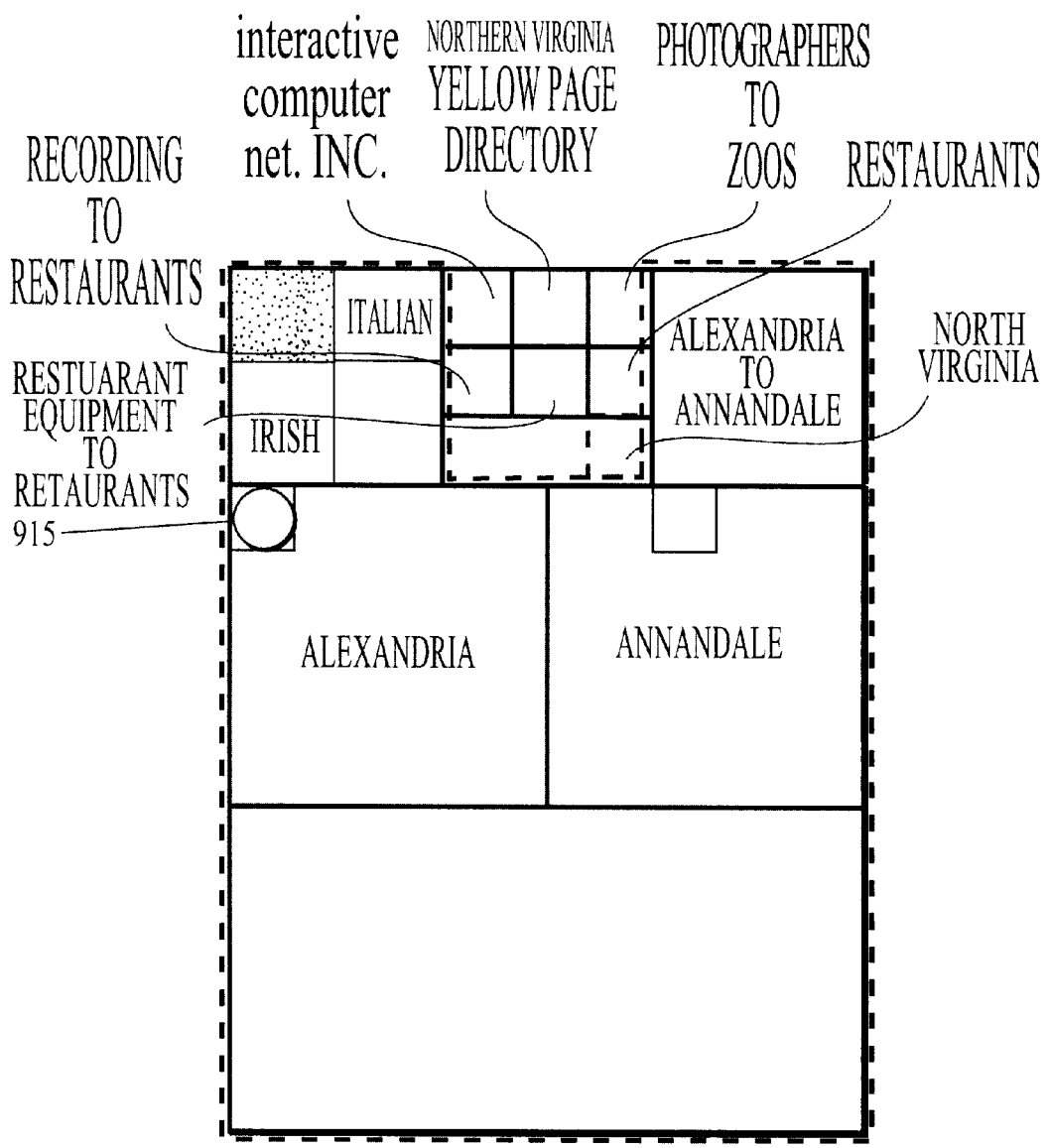
Figure 9R:
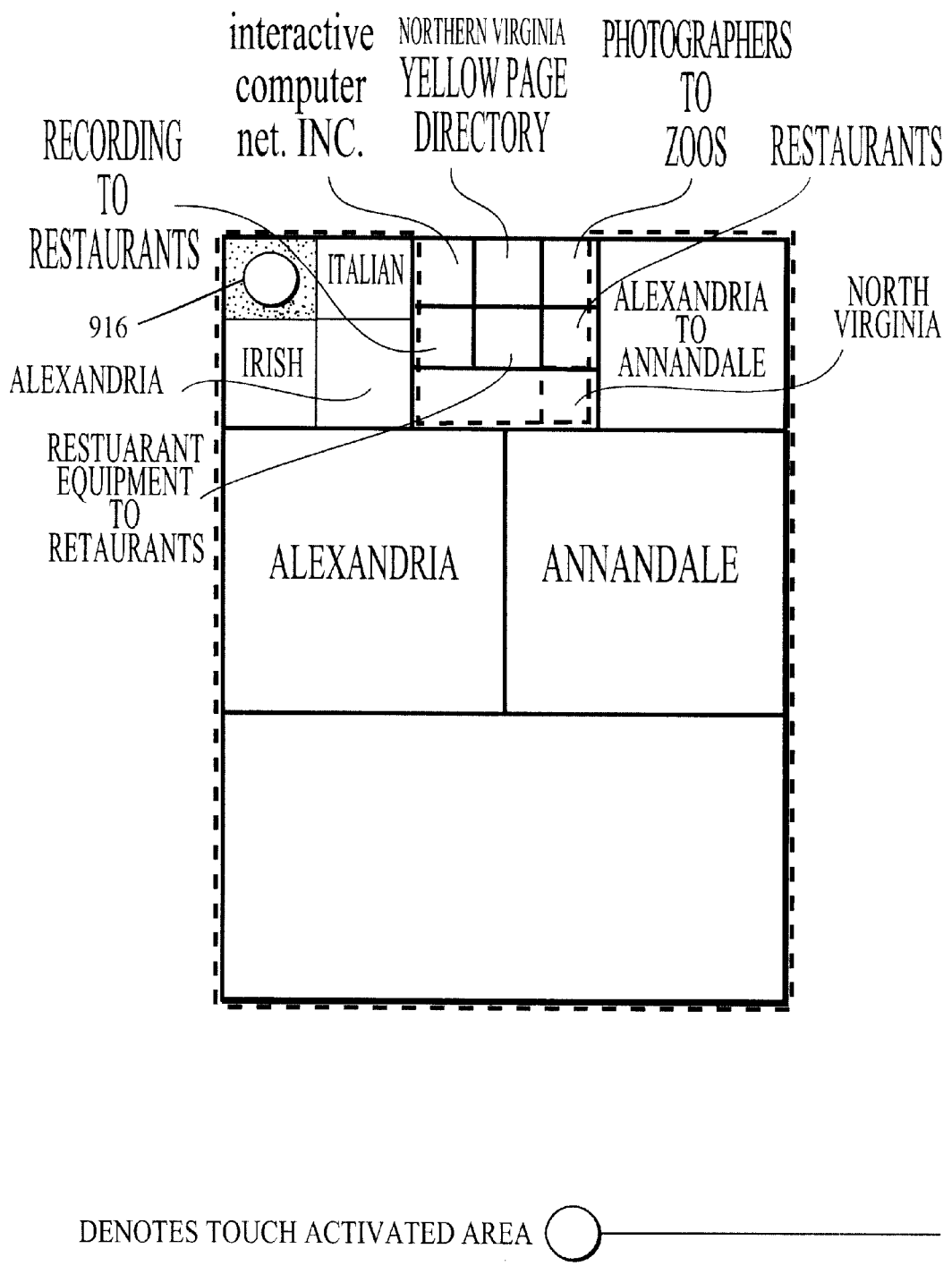

Instead, however, the user is satisfied with choices of cuisine and elects to further CLARIFY restaurant location properties by selecting 913 "North Virginia", which results in the display shown in FIG. 9P. Further CLARIFICATION leads the user to select 914 the range "Alexandria to Annandale." The resulting display is shown in FIG. 9Q, where the user selects 915 "Alexandria" by touching the MEMORIZATION indicator, which is then added to the DESIRE area as shown in FIG. 9R.

Figure 9S:
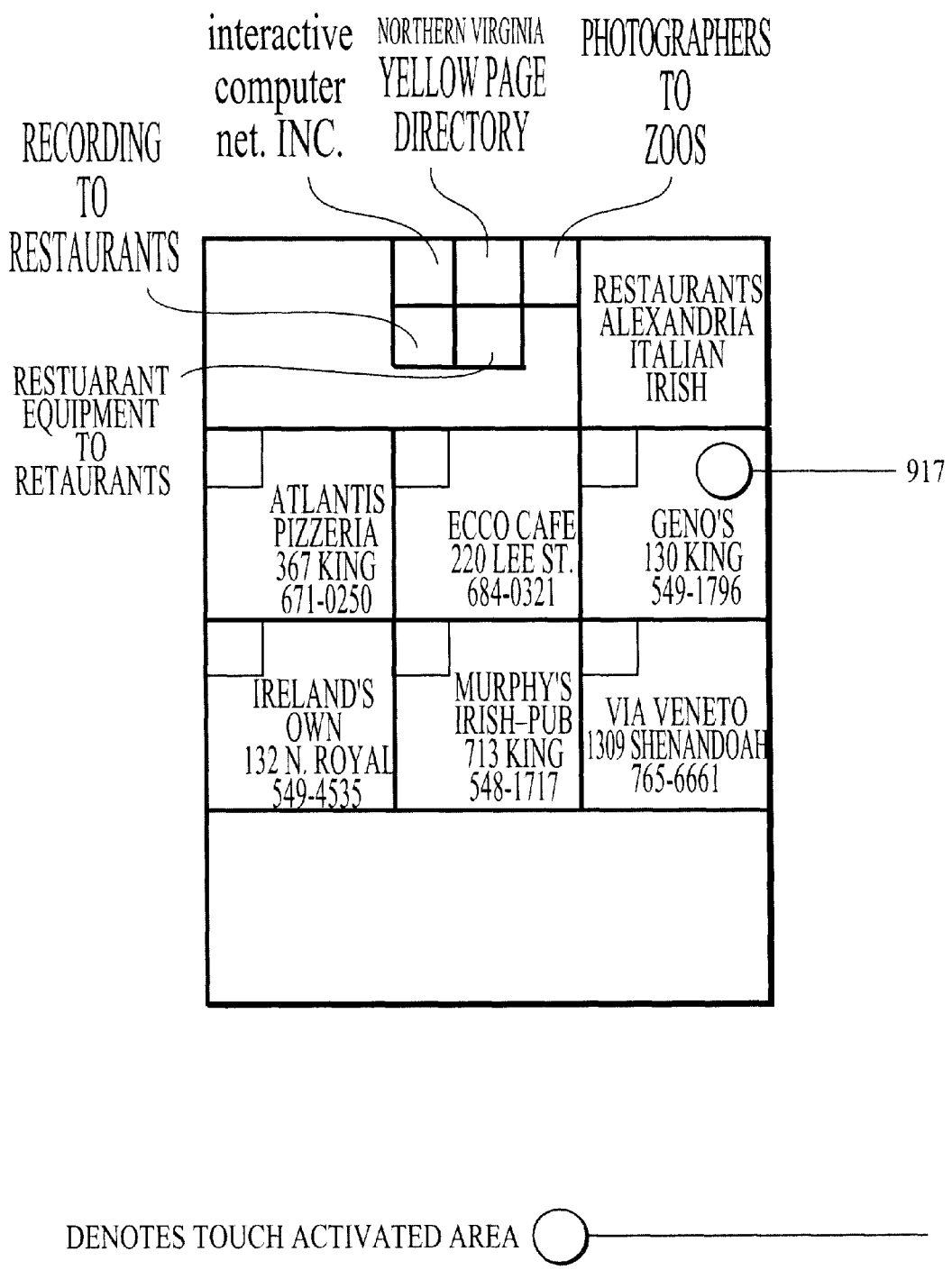

At this point the user chooses to limit his or her restaurant search to Irish or Italian restaurants located in Alexandria by selecting 916 the REPLICATE button in the DESIRE area. This action completes the CONTEXT overlay and returns the display to what it had been in FIG. 9J, but modified by the action just taken so that the display in FIG. 9S only includes restaurants that have the selected attributes. Note that the selection criteria no longer appear in the DESIRE area (since the desired action has been completed) but the "Restaurant" item in the CONTEXT area has been modified to show the selection criteria. This modification is a new information unit which is temporary and not a permanent part of the Restaurant data base, but which is constructed in order to provide the user with a visual record of selections made while in the CONTEXT overlay sequence beginning as shown in FIG. 9G. Note that this temporary information unit, displayed in the CONTEXT area, provides continuity of information display in the transition at the point of REPLICATION between FIGS. 9R and 9S: the units "Italian", "Irish" and "Alexandria" from the DESIRE area and the unit "North Virginia" from the IDENTITY area in FIG. 9R are removed upon REPLICATION, but the three units from the DESIRE area—which constitute selection criteria against the data base resulting in the CONTENT area as shown in FIG. 9S are retained in the temporary information unit displayed in the CONTEXT area in FIG. 9S.

Note also that the information units displayed in the IDENTITY area after FIG. 9G (namely "All Cuisine Types" in FIG. 9K and "North Virginia" in FIG. 9Q) are highlighted (shown by means of a heavy dashed line around them) to indicate their origin in the CONTEXT overlay sequence. Similarly, when the CONTENT area contains information units from the CONTEXT overlay, a highlighting (shown by means of a heavy dashed line around them in FIGS. 9H through 9R) is applied to all such information units displayed in the CONTENT, DESIRE and CONTEXT areas.

Figure 9T:
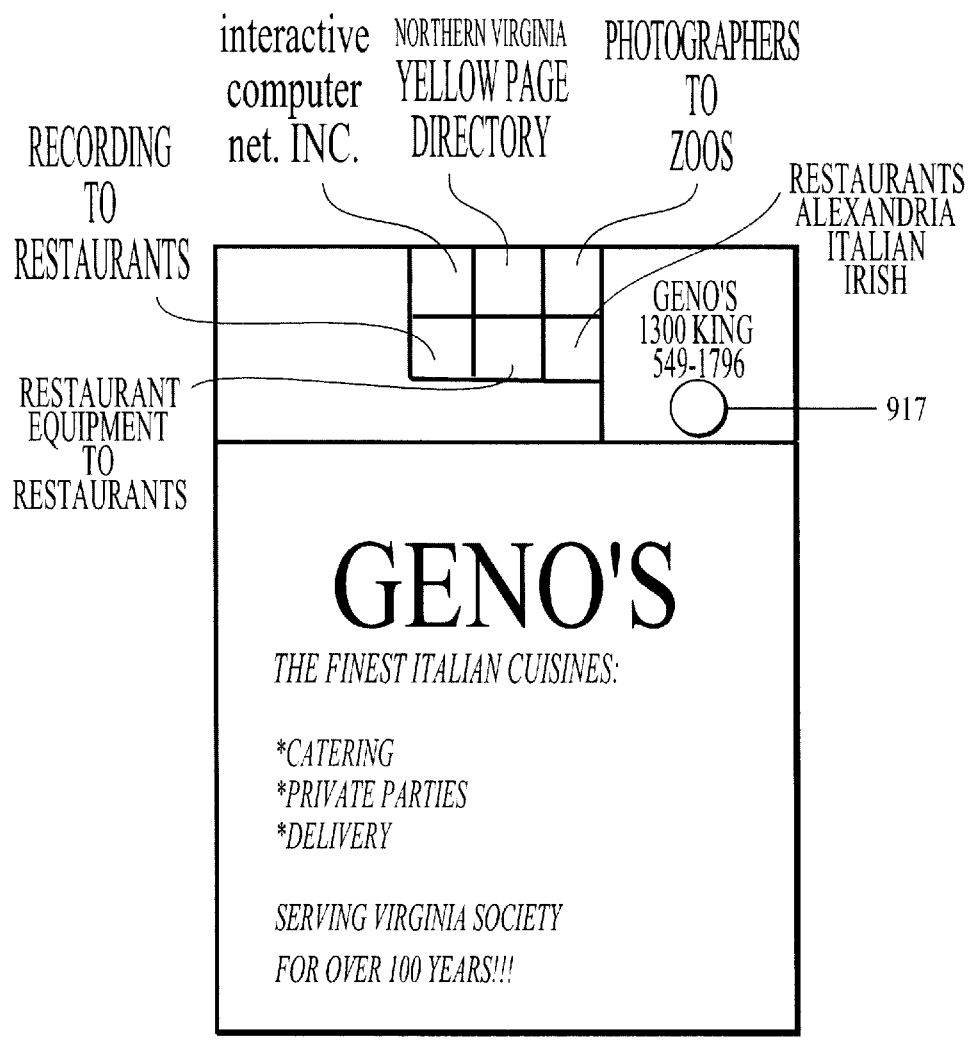
Figure 9U:
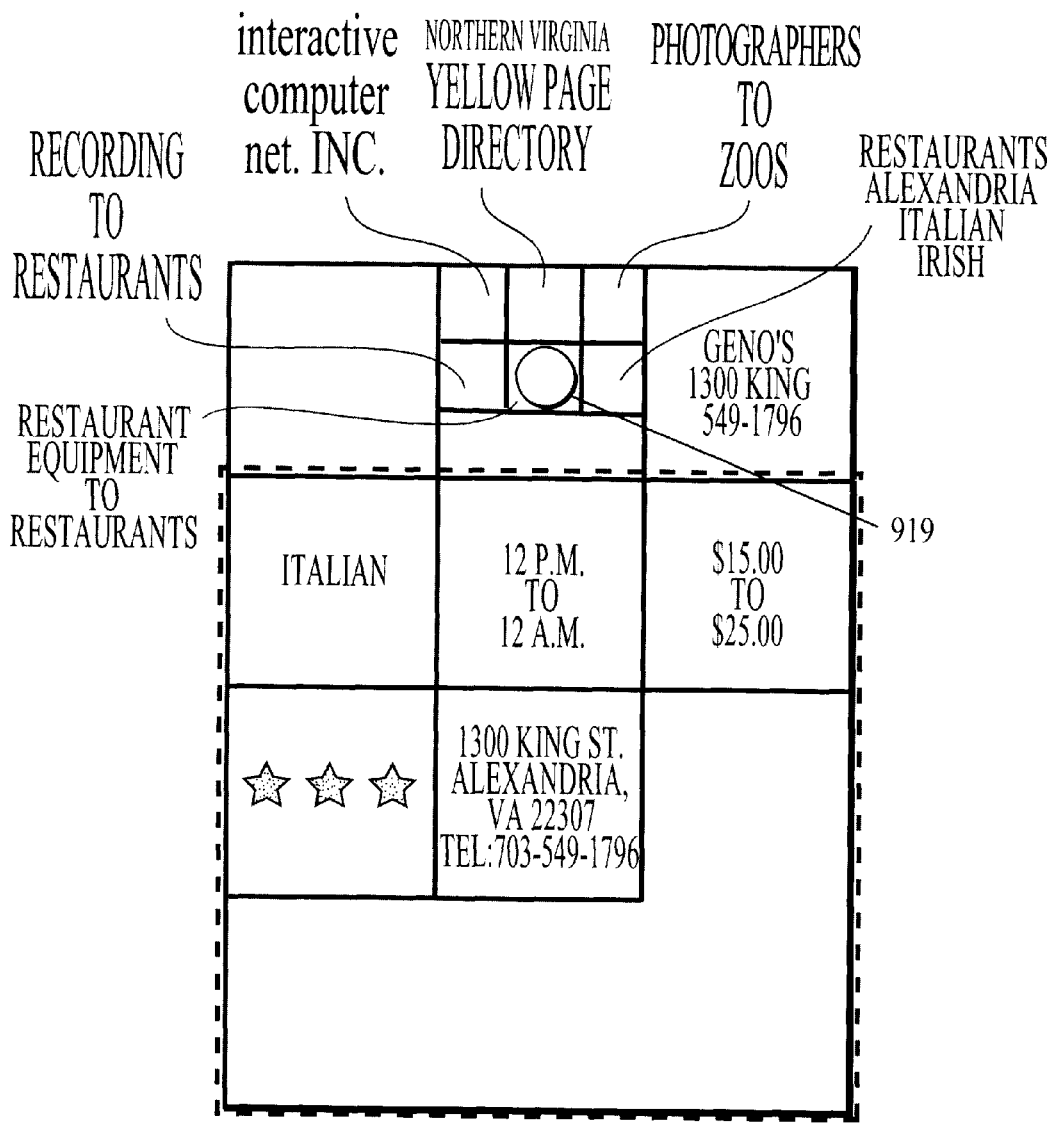
Figure 9V:
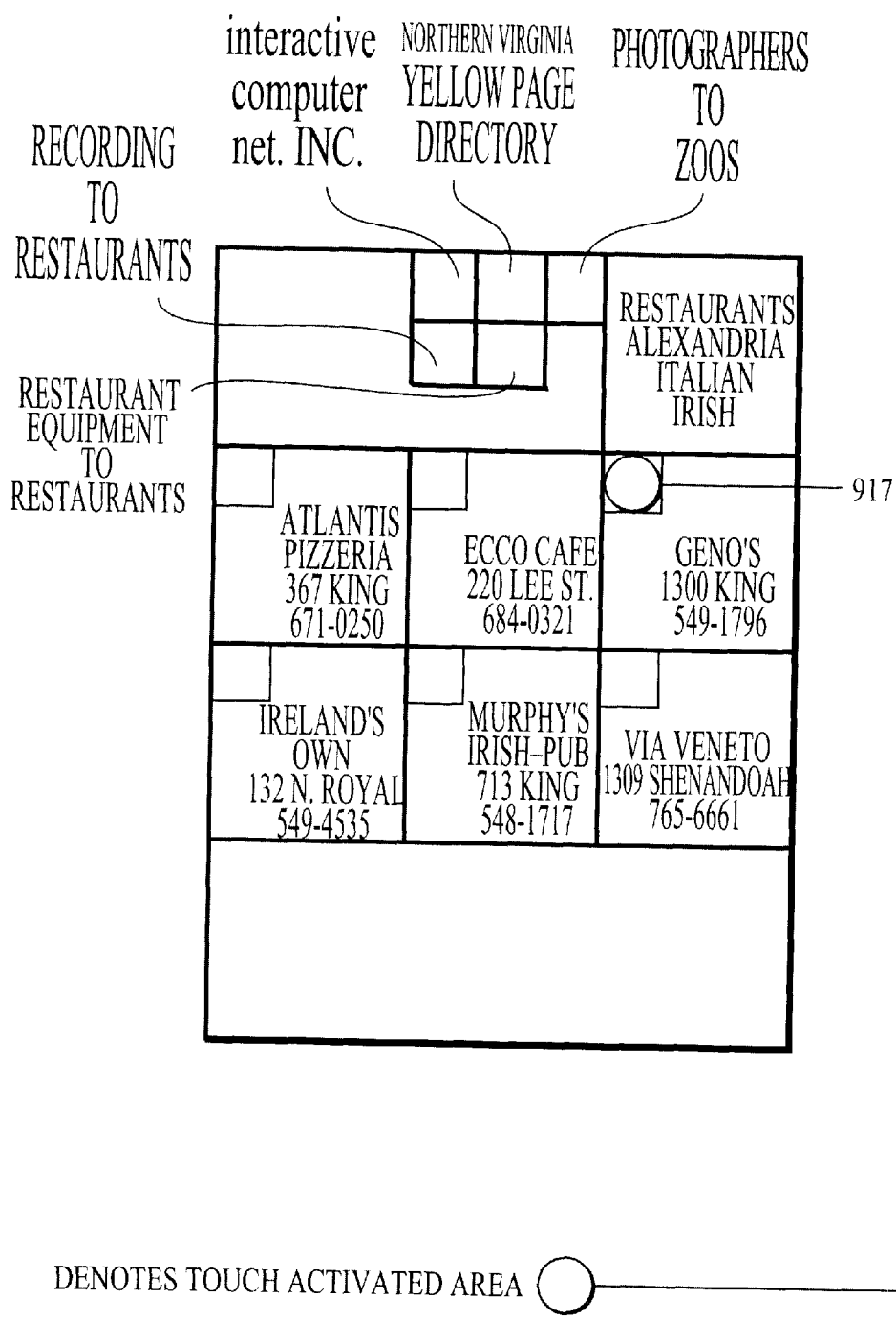

The user now elects to find more about one of the choices, "Gino's" by selecting 917. However, as shown in FIG. 9T, this level of the hierarchy provides only an advertisement framed within one unit of information. Another alternative for further information about Gino's is a CONTEXT overlay, which the user now selects 918. The results of that selection are displayed in FIG. 9U, giving several additional pieces of information about the restaurant, including hours of operation, price range, rating, address and phone number. The user then selects 919 the IDENTITY area in order to navigate back up the hierarchy to display showing Irish and Italian restaurants in Alexandria, as shown in FIG. 9V. Alternatively (but not shown), the user could have again selected the IDENTITY area, which would have returned the user to the prior FIG. 9T.

Figure 9W:
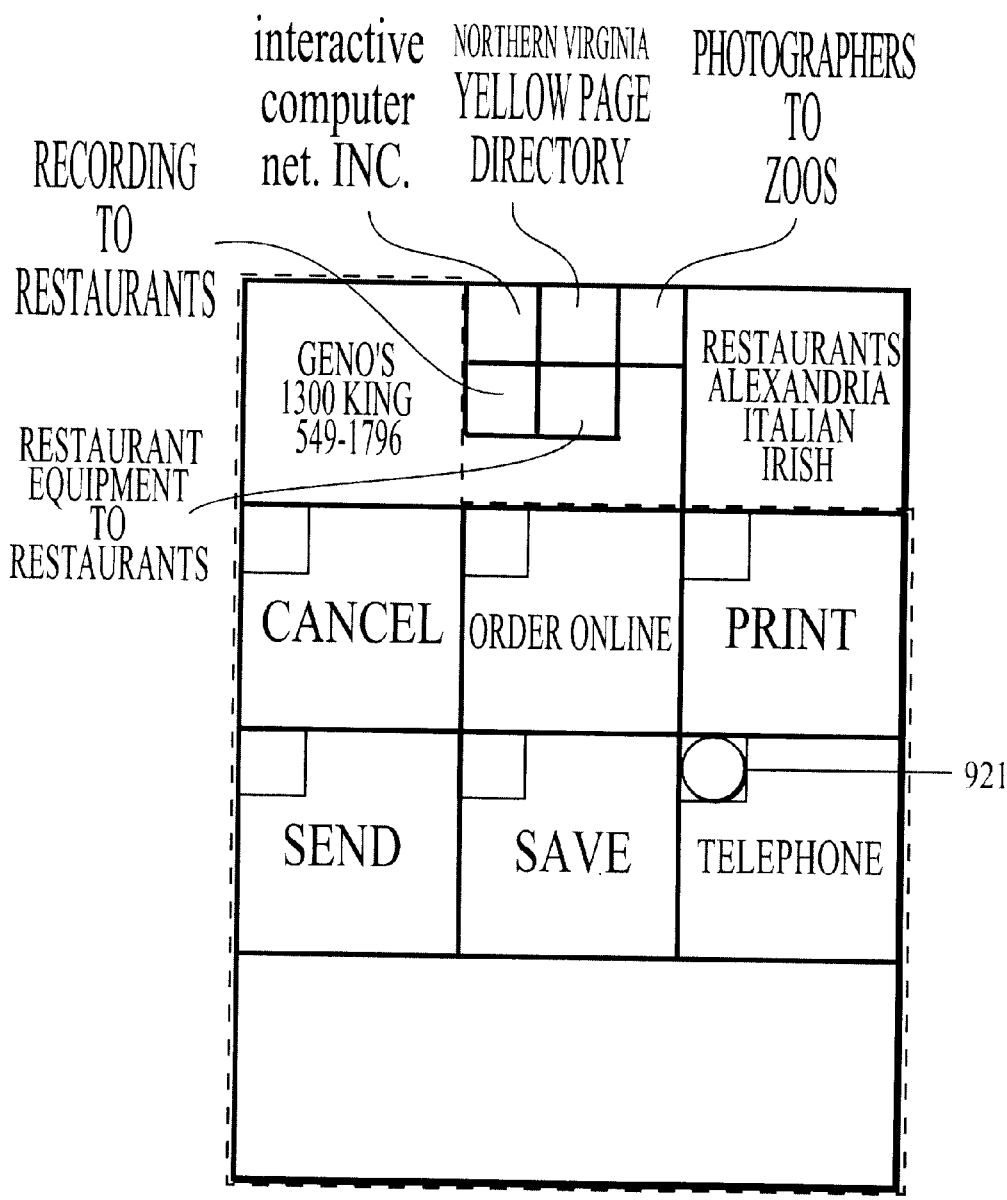
Figure 9X:
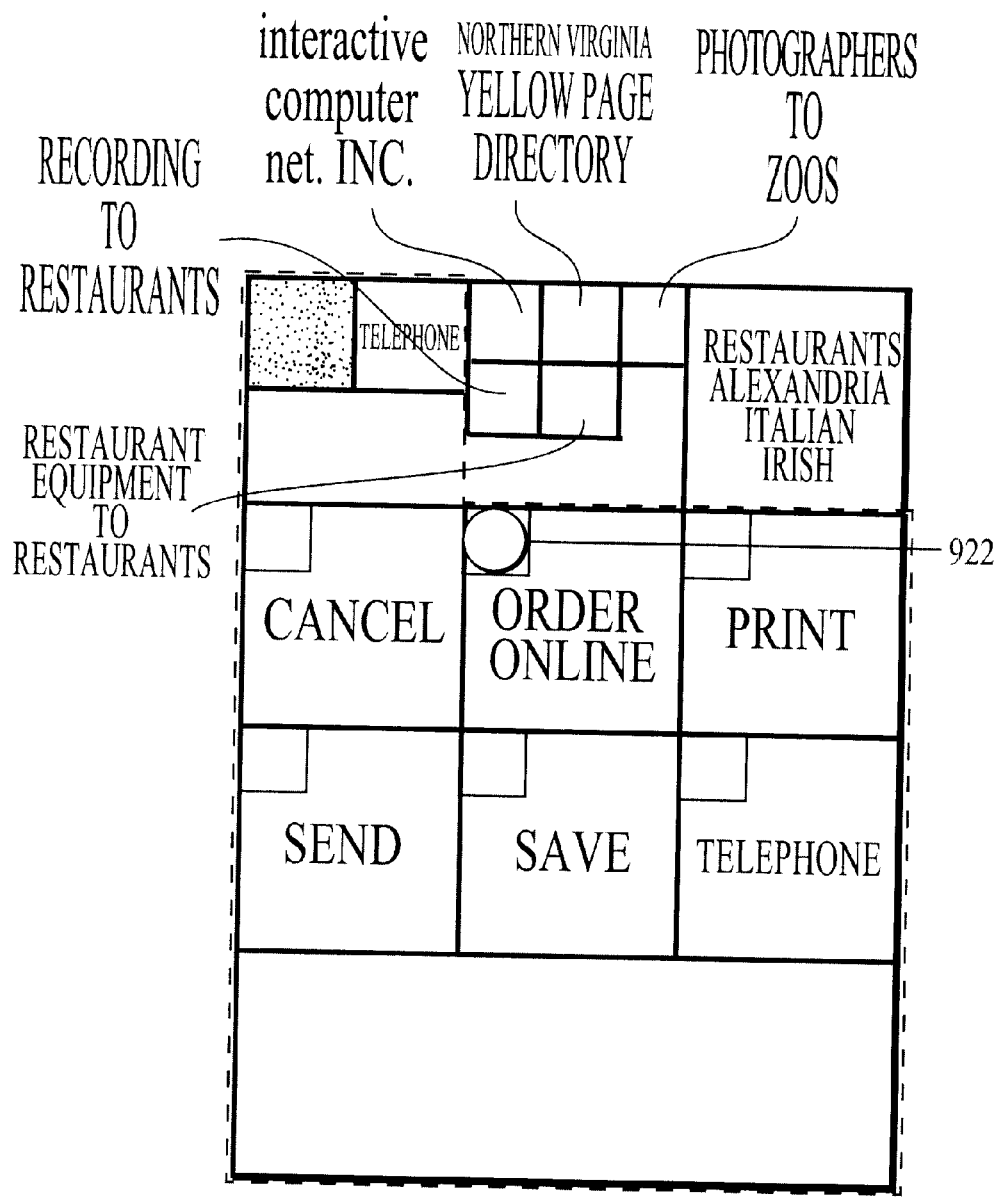
Figure 9Y:
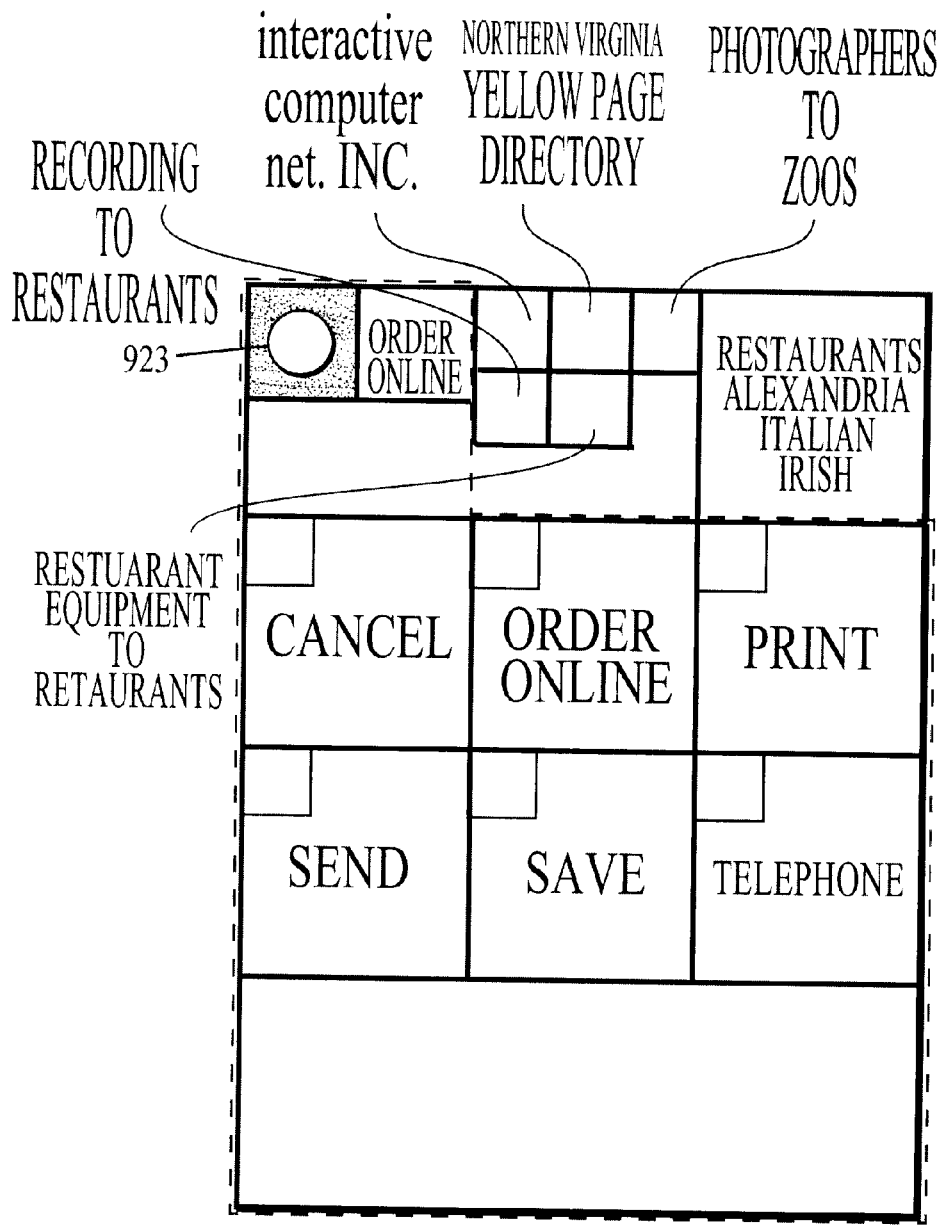

From FIG. 9V, the user is then ready to take action and selects 920 the MEMORIZATION indicator for Gino's Restaurant. Several choices are presented, as shown in FIG. 9W, and the user selects 921 to act by telephone. As shown in FIG. 9X, the telephone selection has been moved to the DESIRE area. The user then decides to MEMORIZE 922 "Order On Line" instead. The effect of this selection is shown in FIG. 9Y. Note that "Order on Line" supplanted "Telephone" in the DESIRE area, reflecting a decision a) to structure these choices as mutually exclusive and b) to allow the user to verify or change an initial choice by using the DESIRE area. The user then elicits an "Order on Line" by selecting 923 the REPLICATE box in the DESIRE area. As noted earlier, if the information base were structured without the (b) characteristic, it might be feasible to implement the structure using the invention without the DESIRE area, e.g. MEMORIZATION of the "Telephone" alternative shown in FIG. 9W would have initiated a telephone order.

Operation of the invention has thus far been described in detail with reference to the preferred three-by-three grid embodiment and from the perspective of the user for whom the invention provides improved access to information. The description has been provided using generic information items from this user perspective in connection with the discussion of FIGS. 5A–5J, FIGS. 6A–6D, and FIGS. 7A–7G. A detailed example using a specific and practical hierarchy of information items has been provided from this user perspective in connection with the discussion of FIGS. 9A–9Y. These generic and specific examples provide an extensive list of descriptive details which enable a further consolidation and summary of the invention.

Figure 12A:
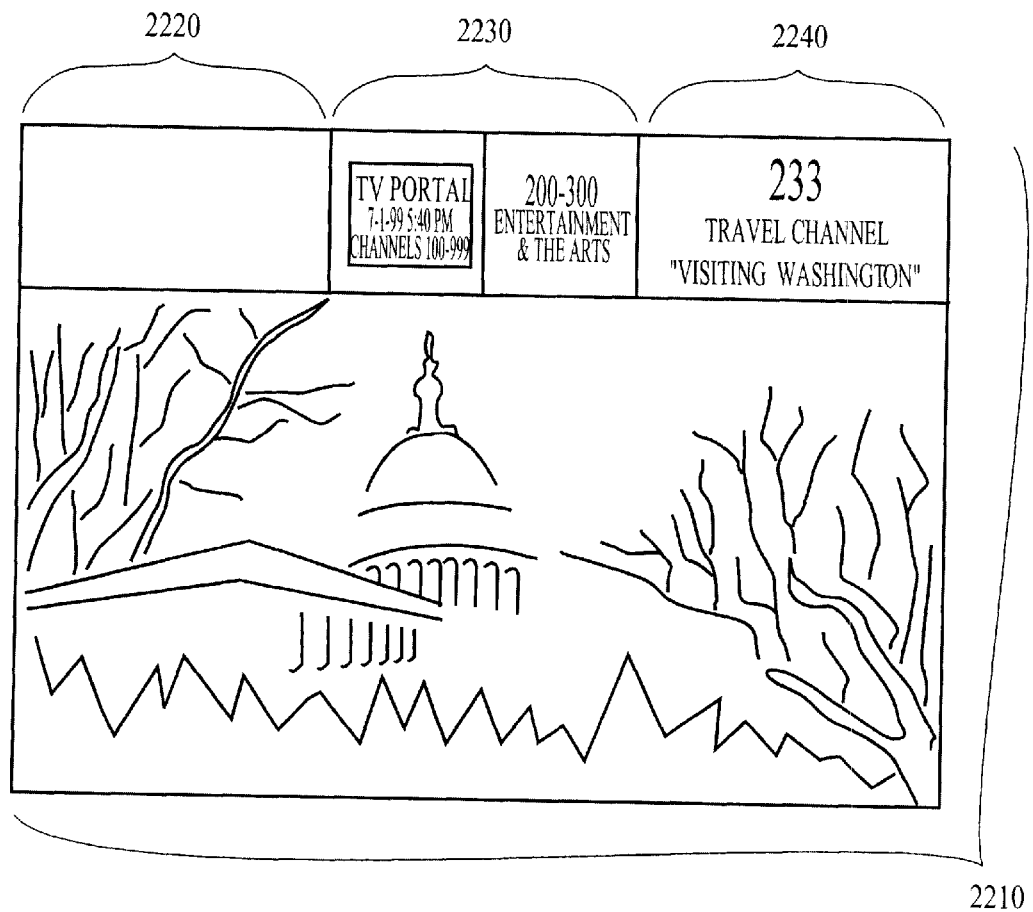
FIGS. 12A through 12H is a series of representations showing operation of the invention on a television portal.
Figure 12B:
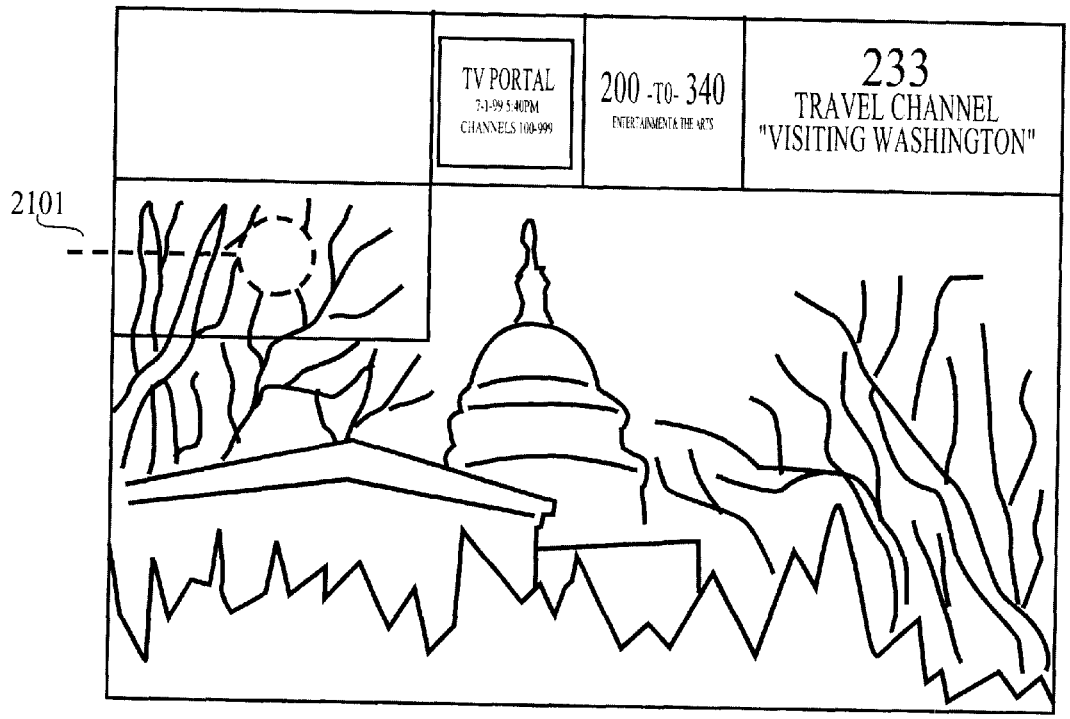
Figure 12C:
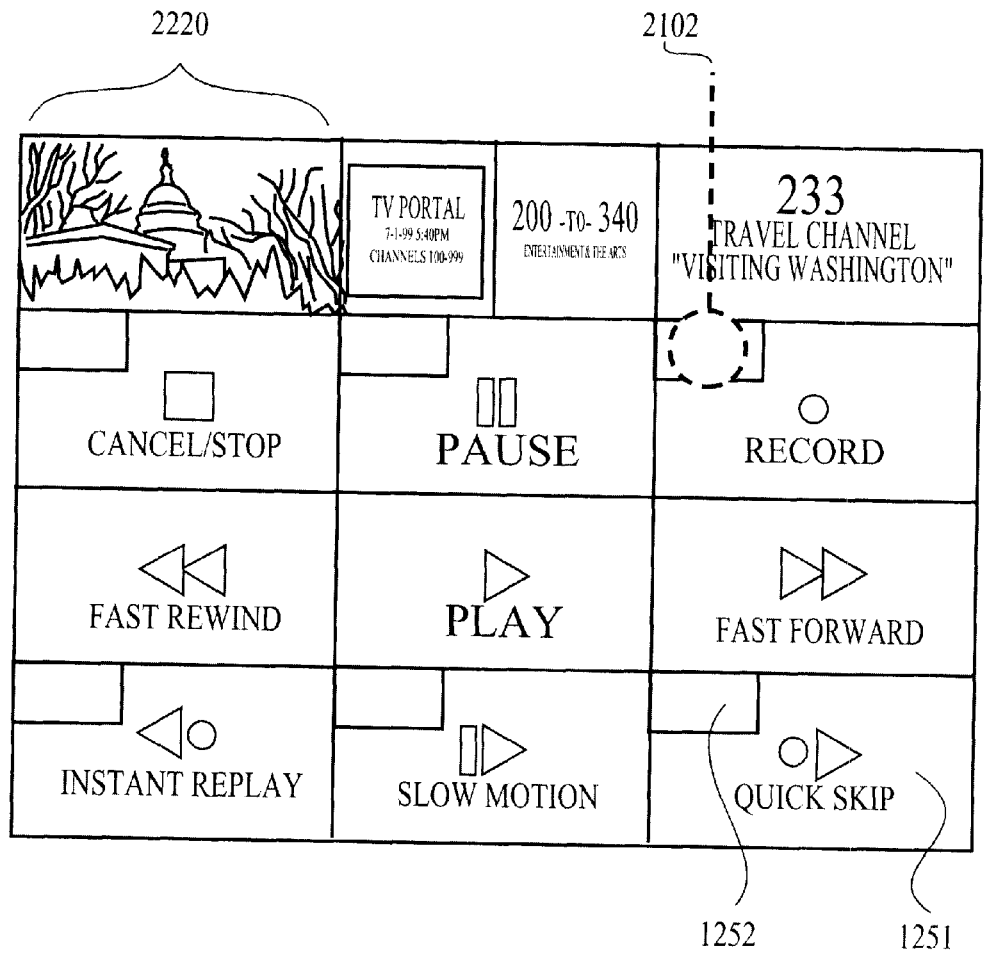
Figure 12D:
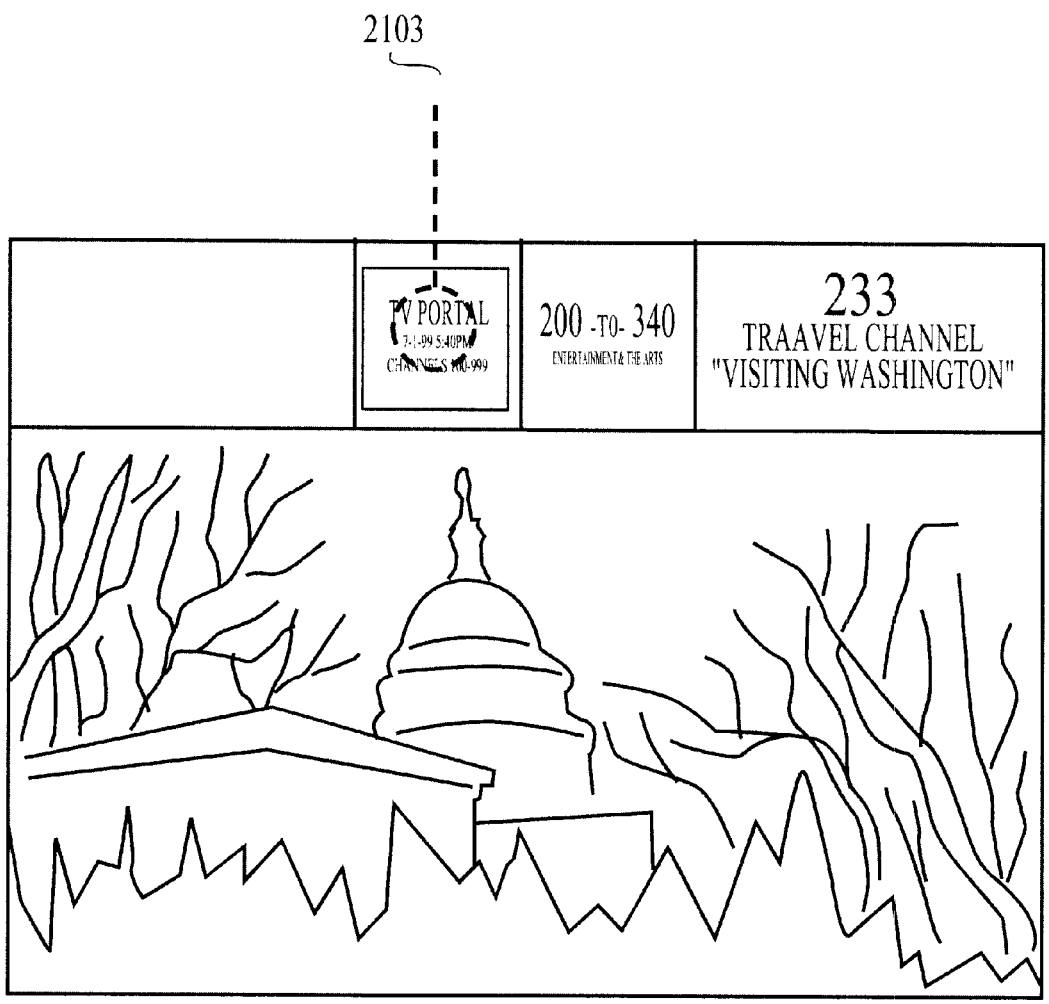
Figure 12E:
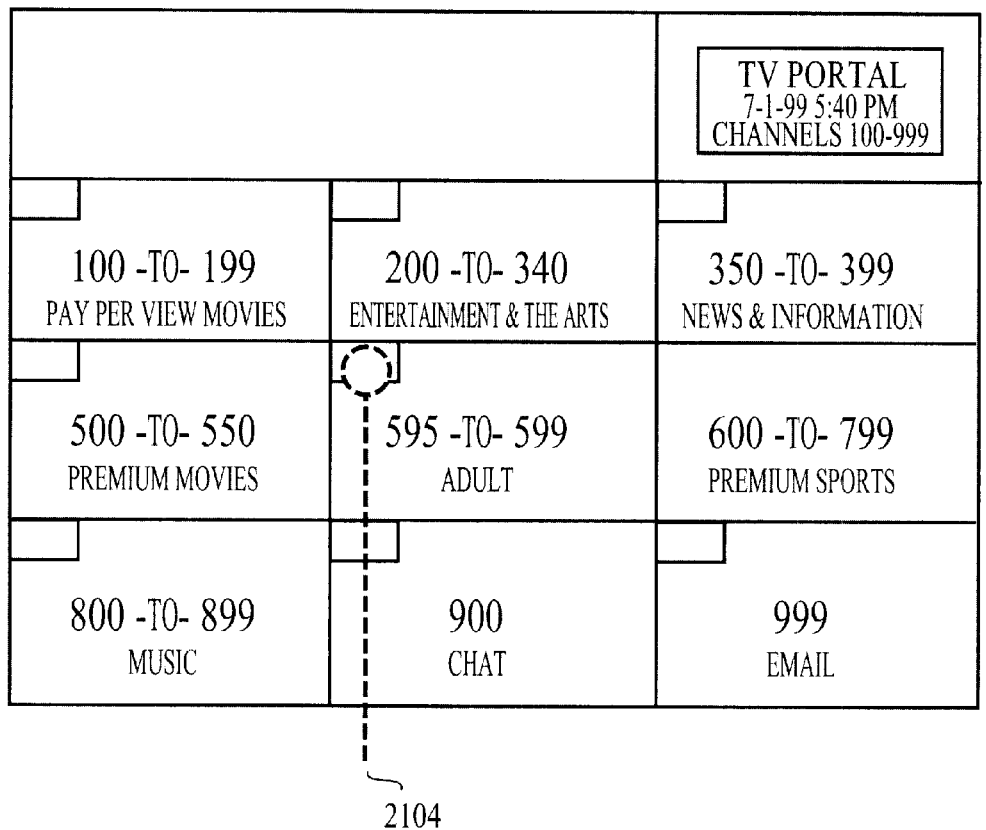
Figure 12F:
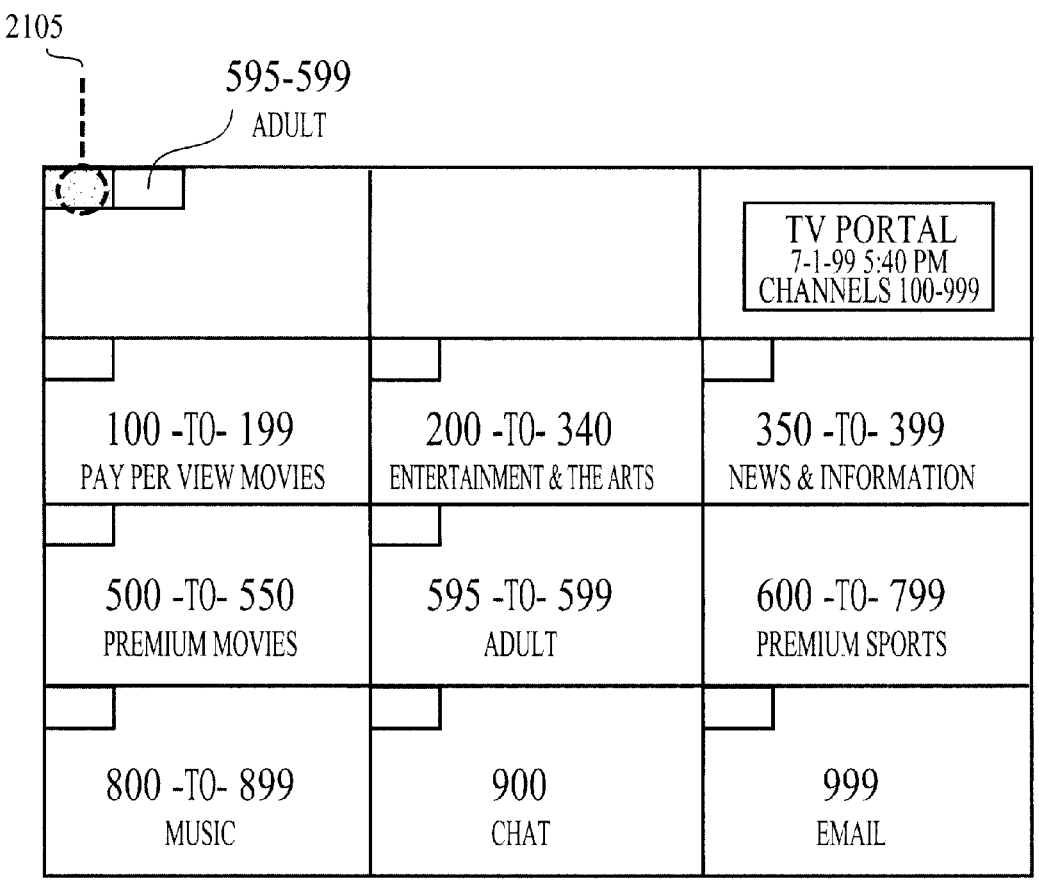
Figure 12G:
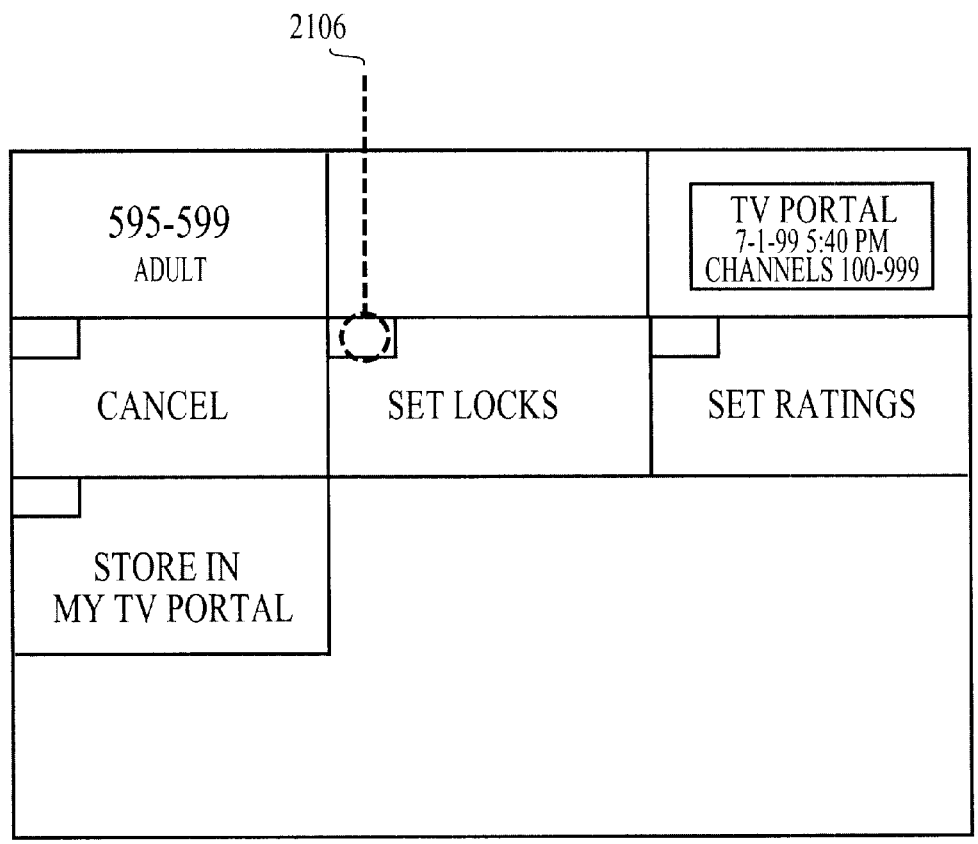
Figure 12H:
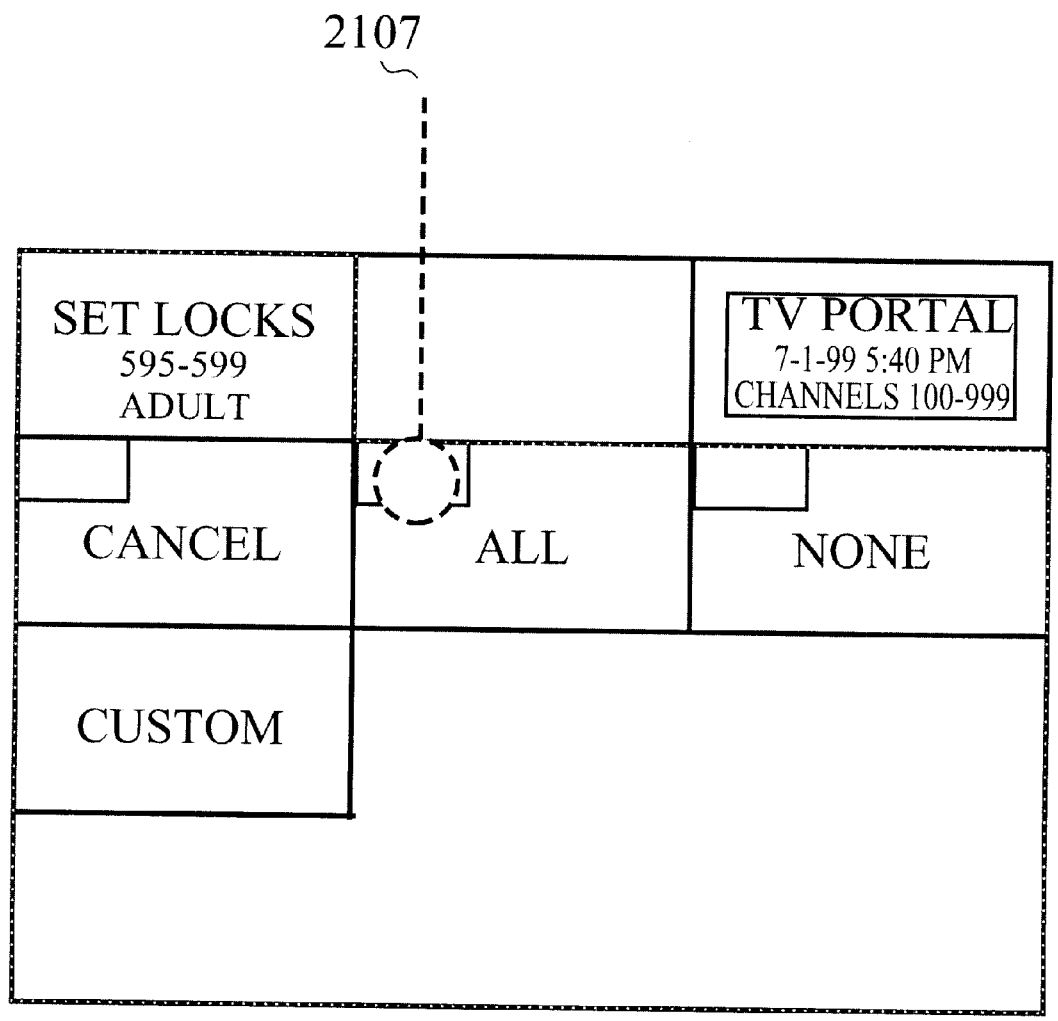
Figure 12J:
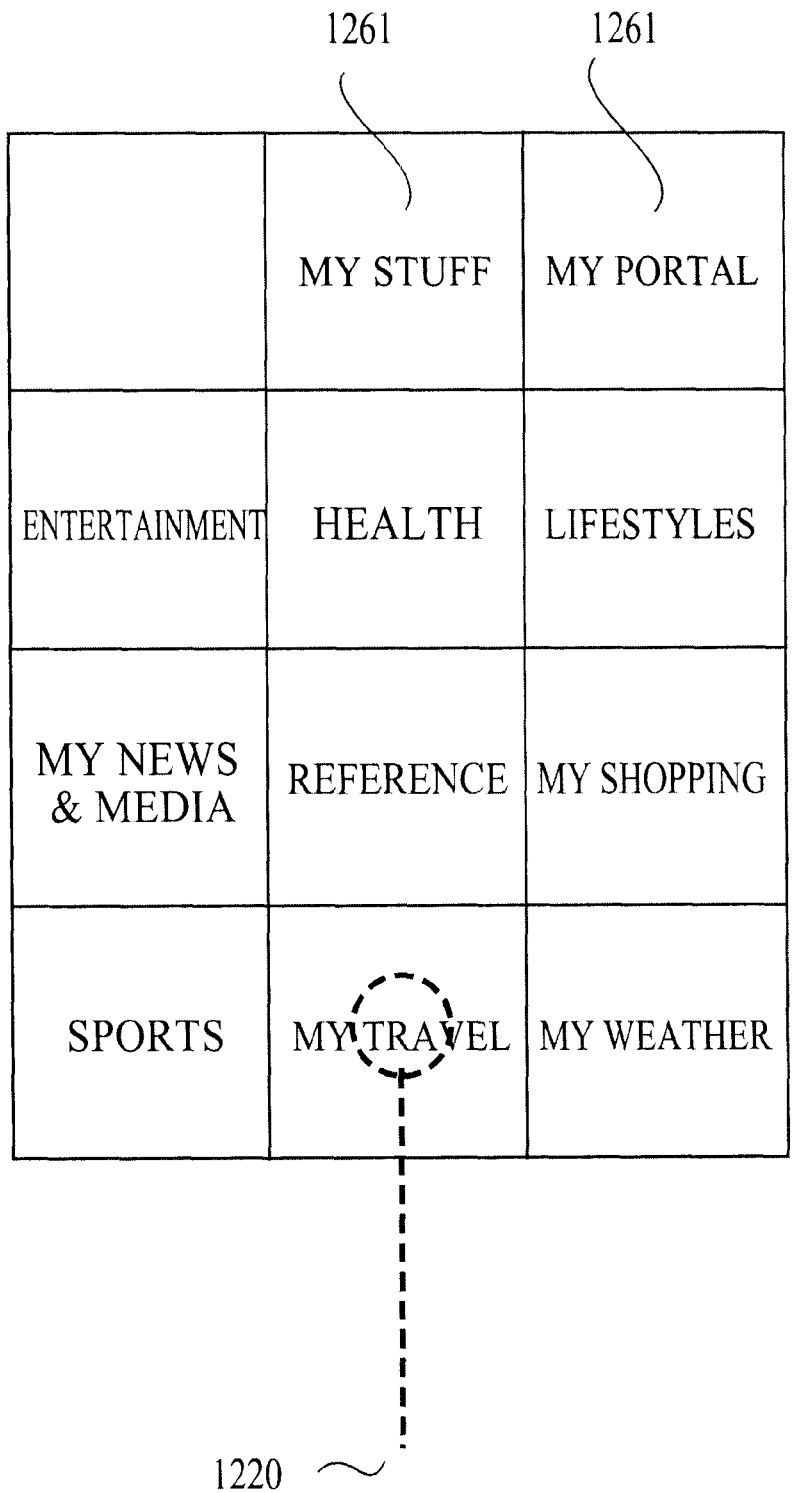
FIGS. 12J through 12K is a series of representations showing operation of the invention on an Internet portal.
Figure 12K:
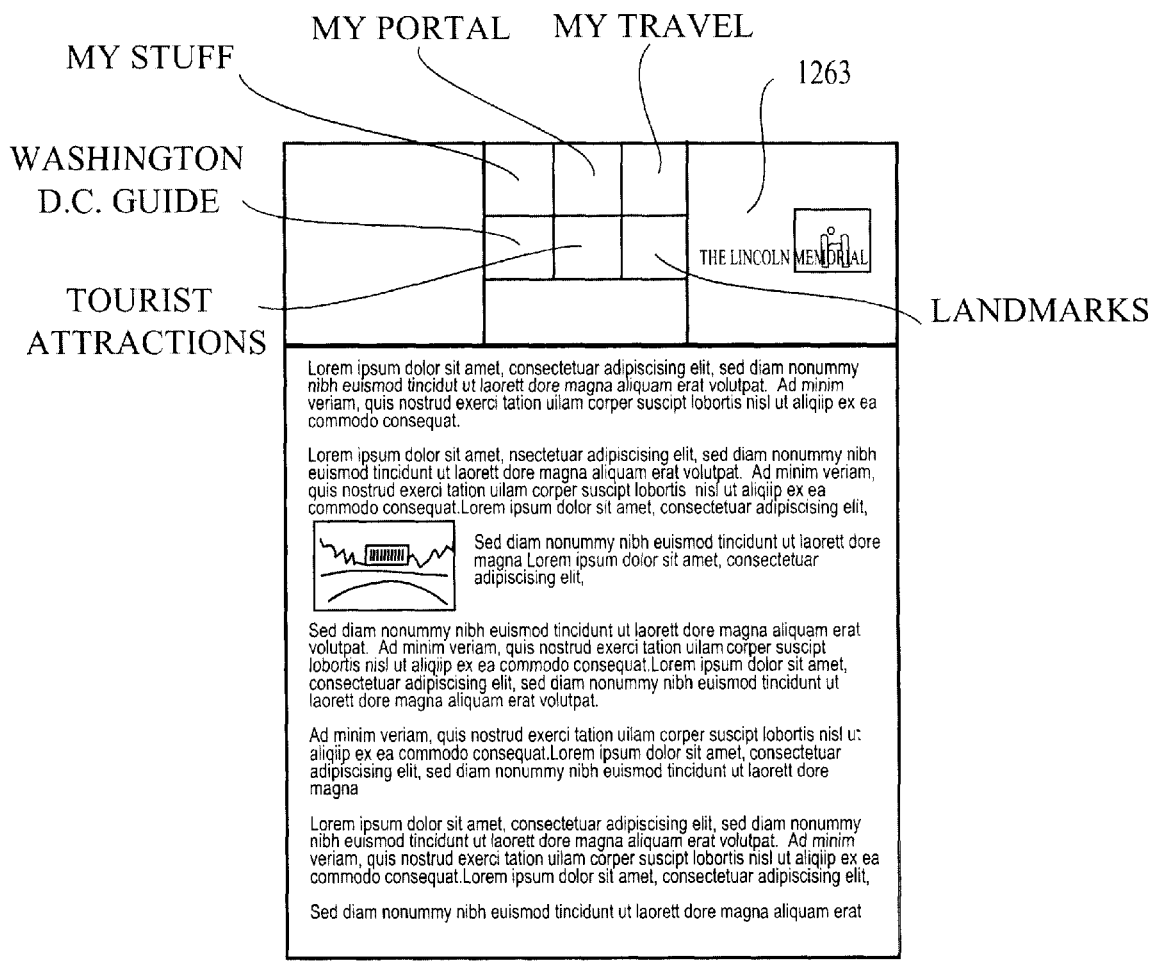
Figure 12L:
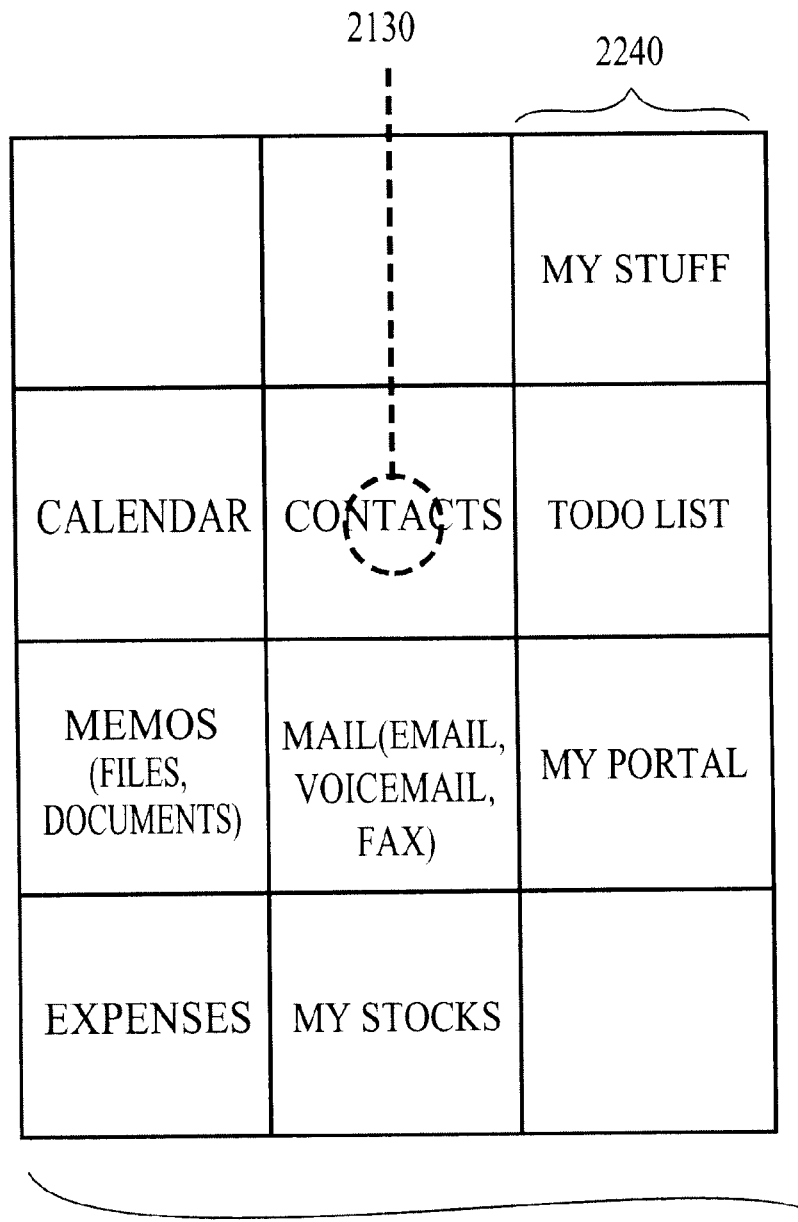
Figure 12M:
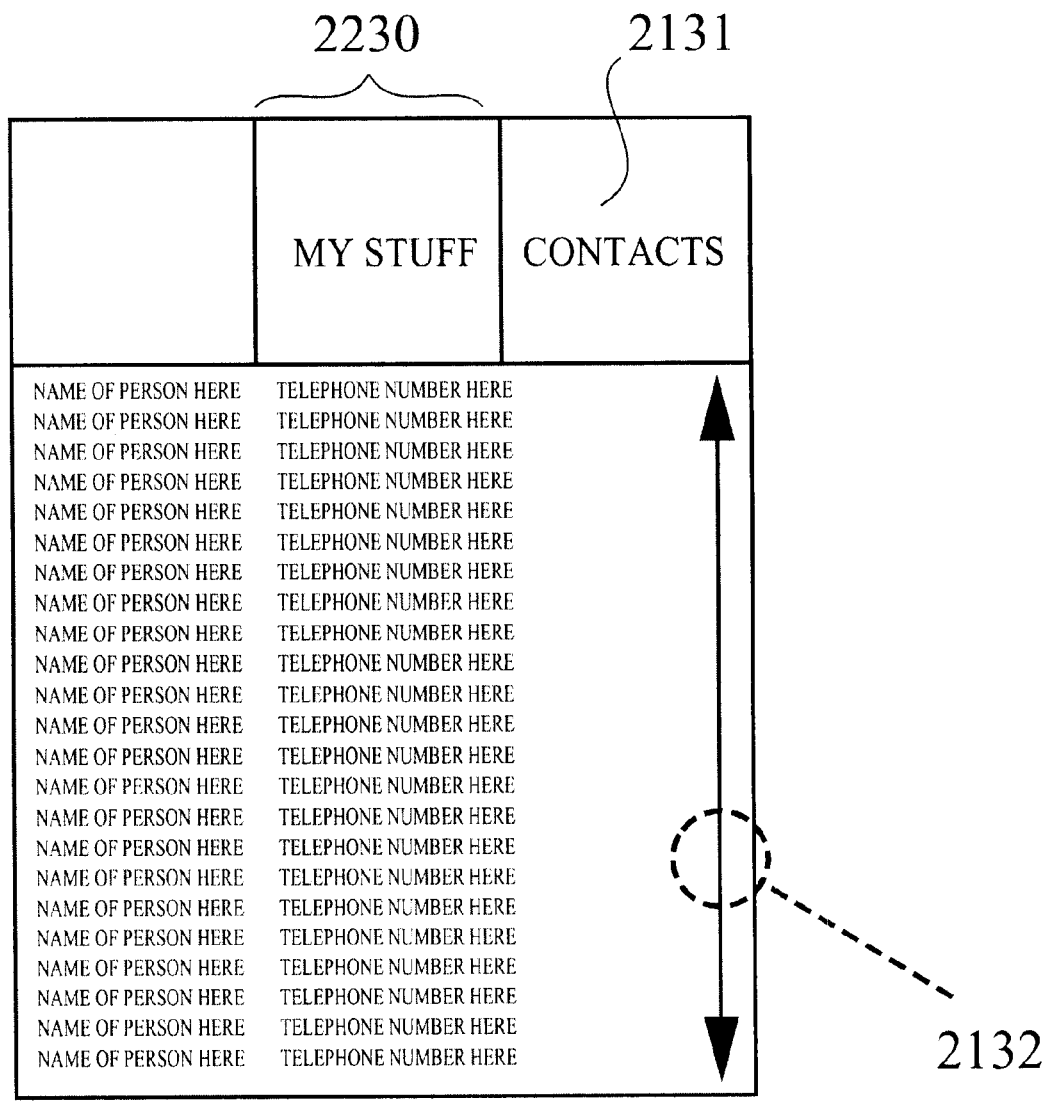
Figure 12N:
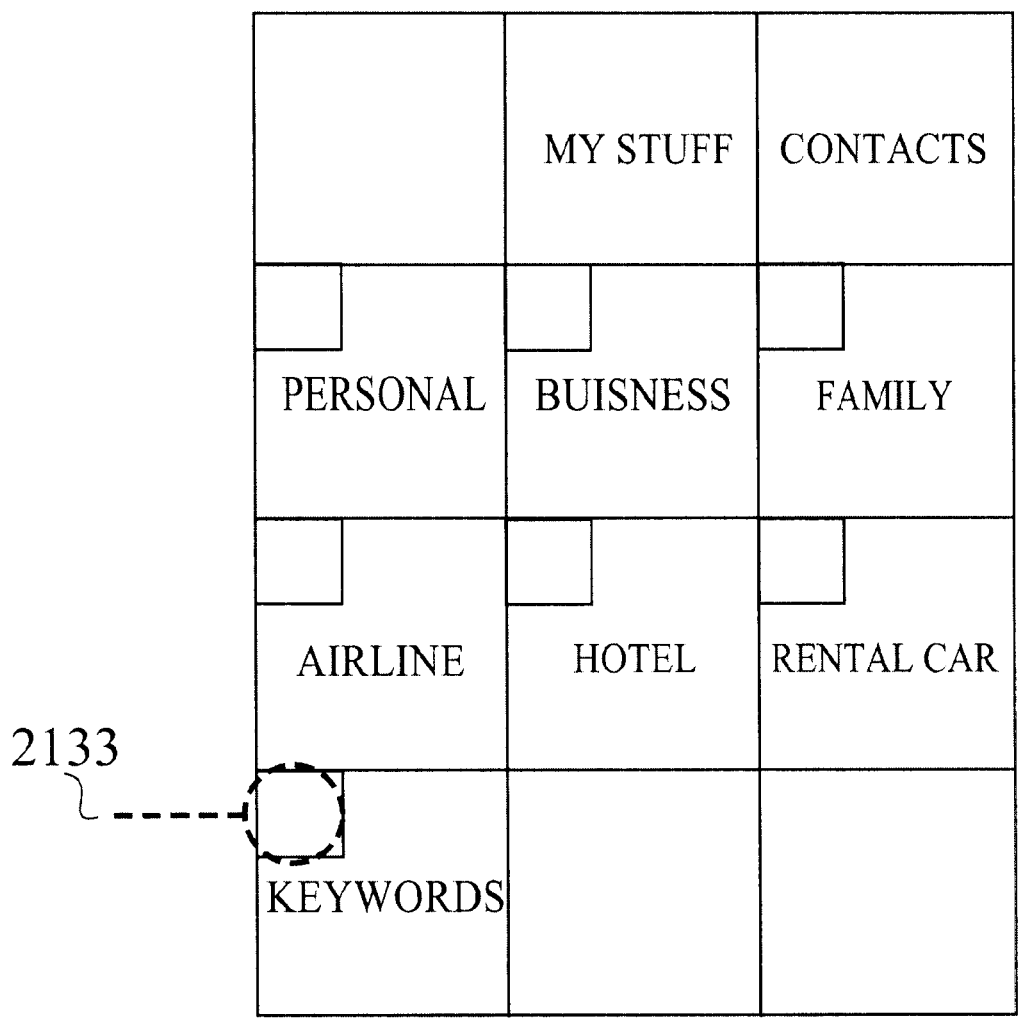
Figure 12P:
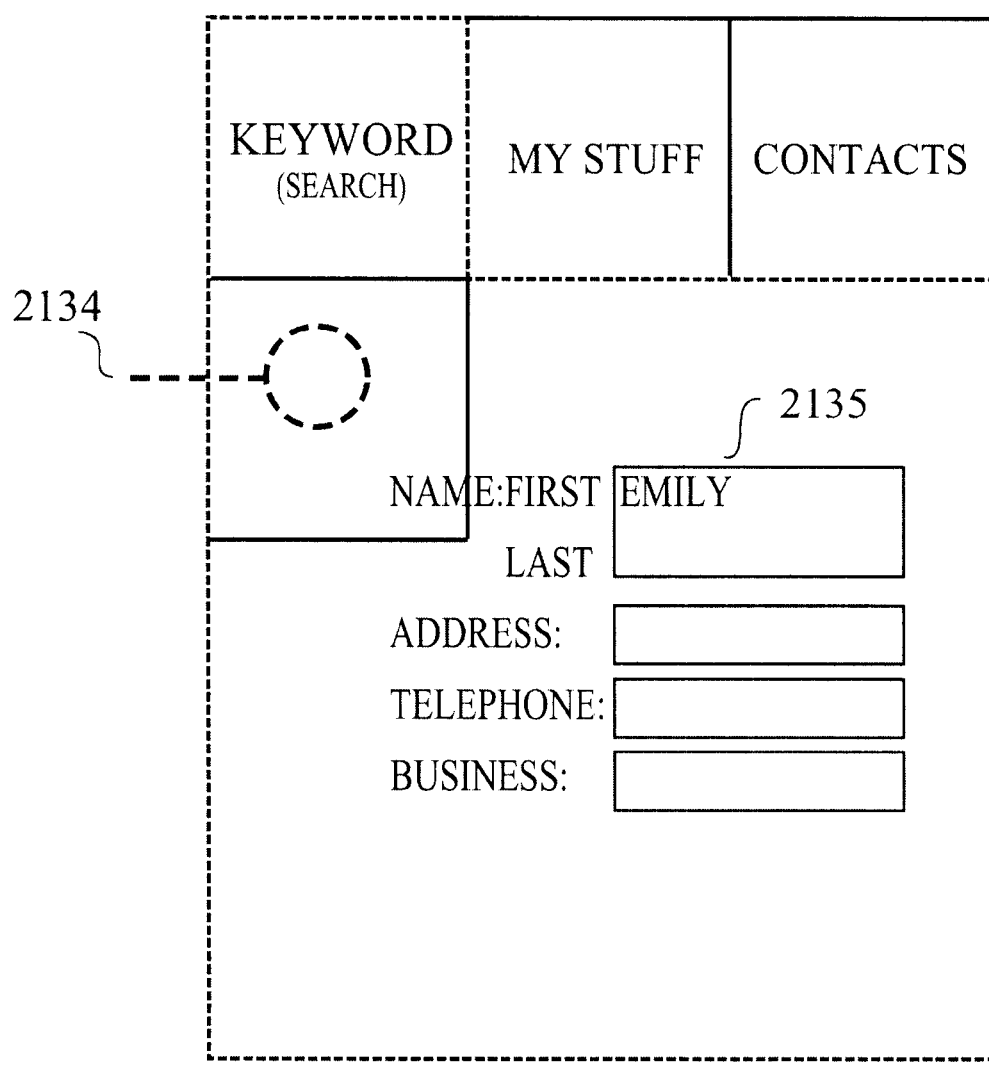
Figure 12Q:
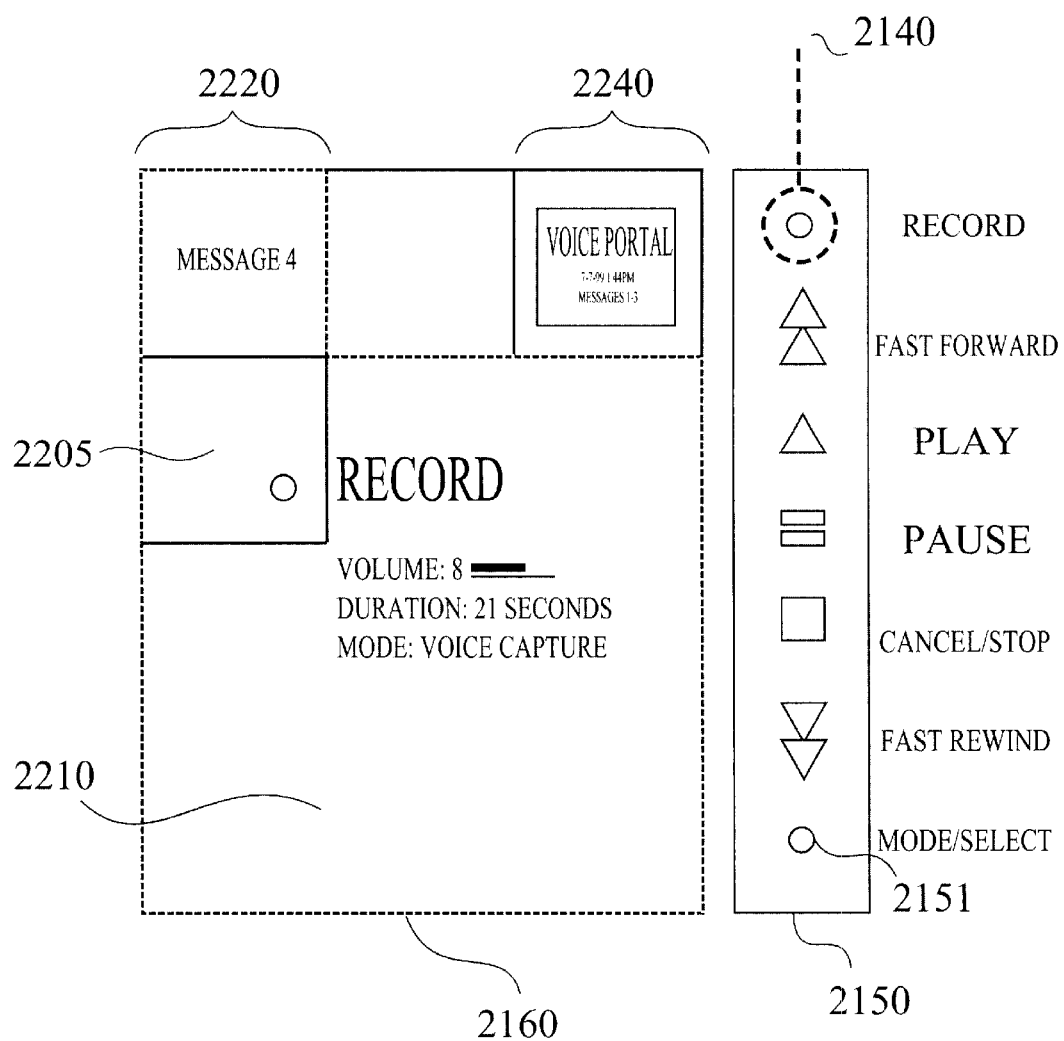
FIGS. 12Q through 12T is a series of representations showing operation of the invention on a digital voice recorder.
Figure 12R:
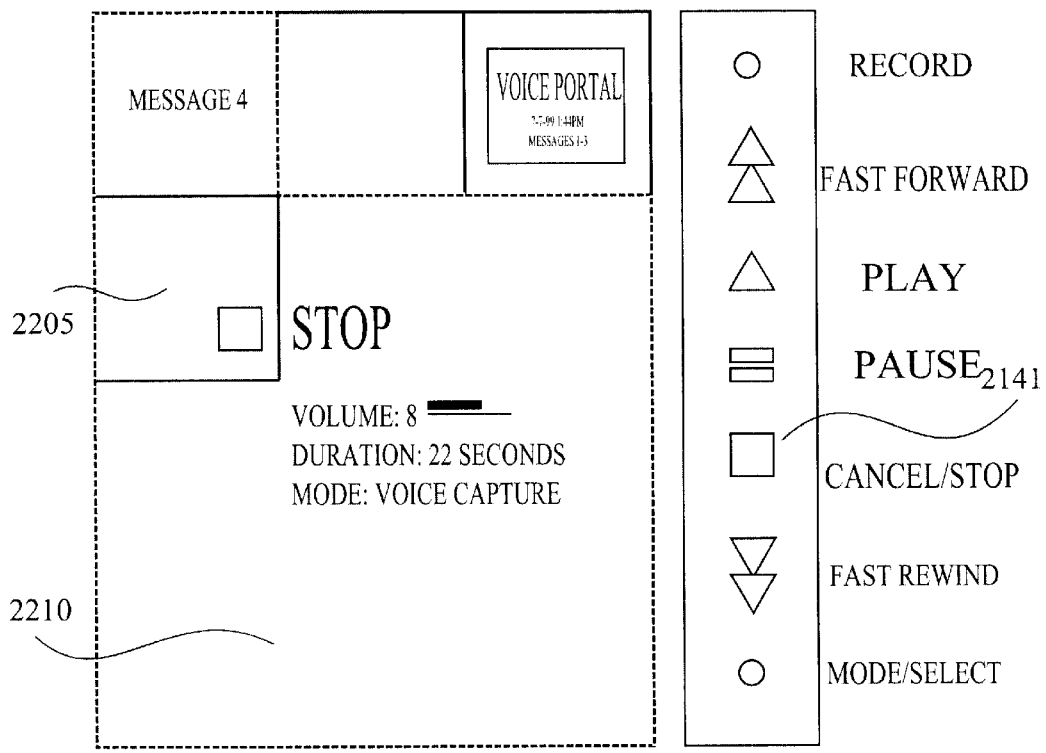
Figure 12S:
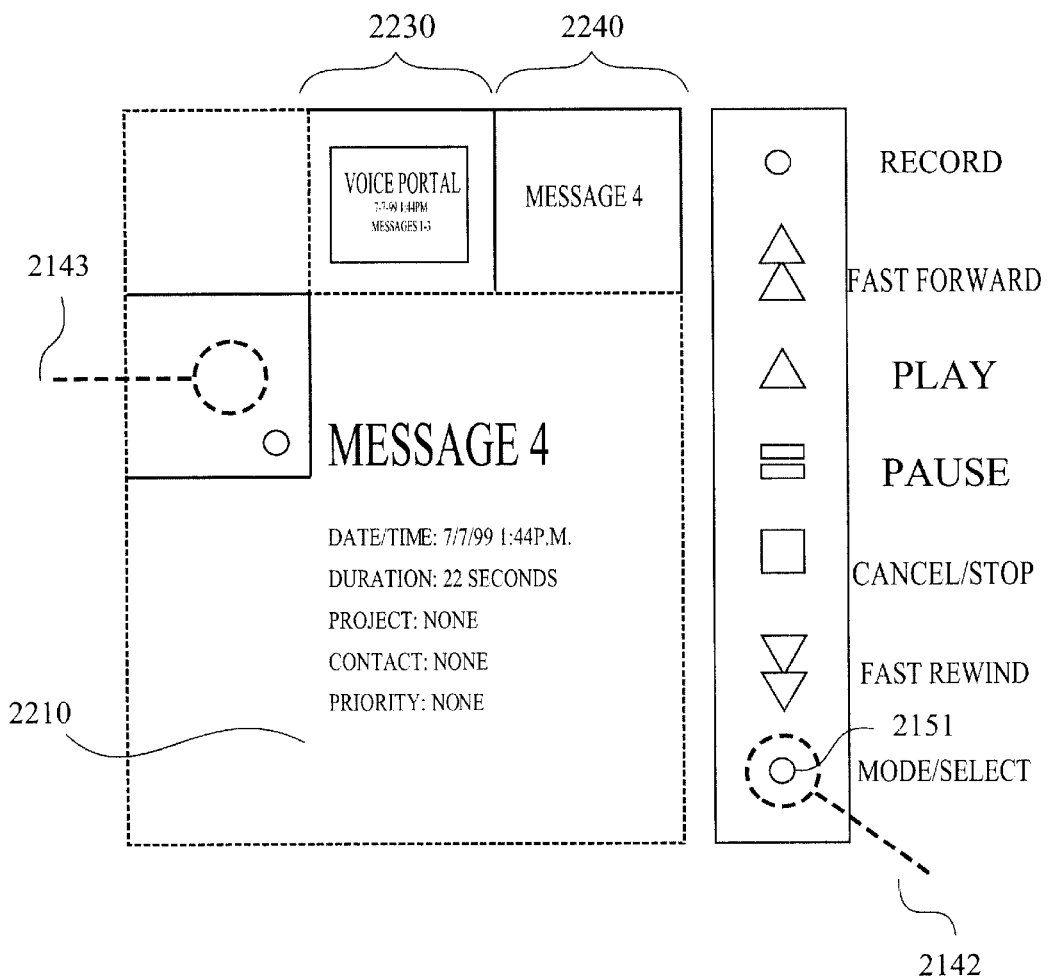
Figure 12T:
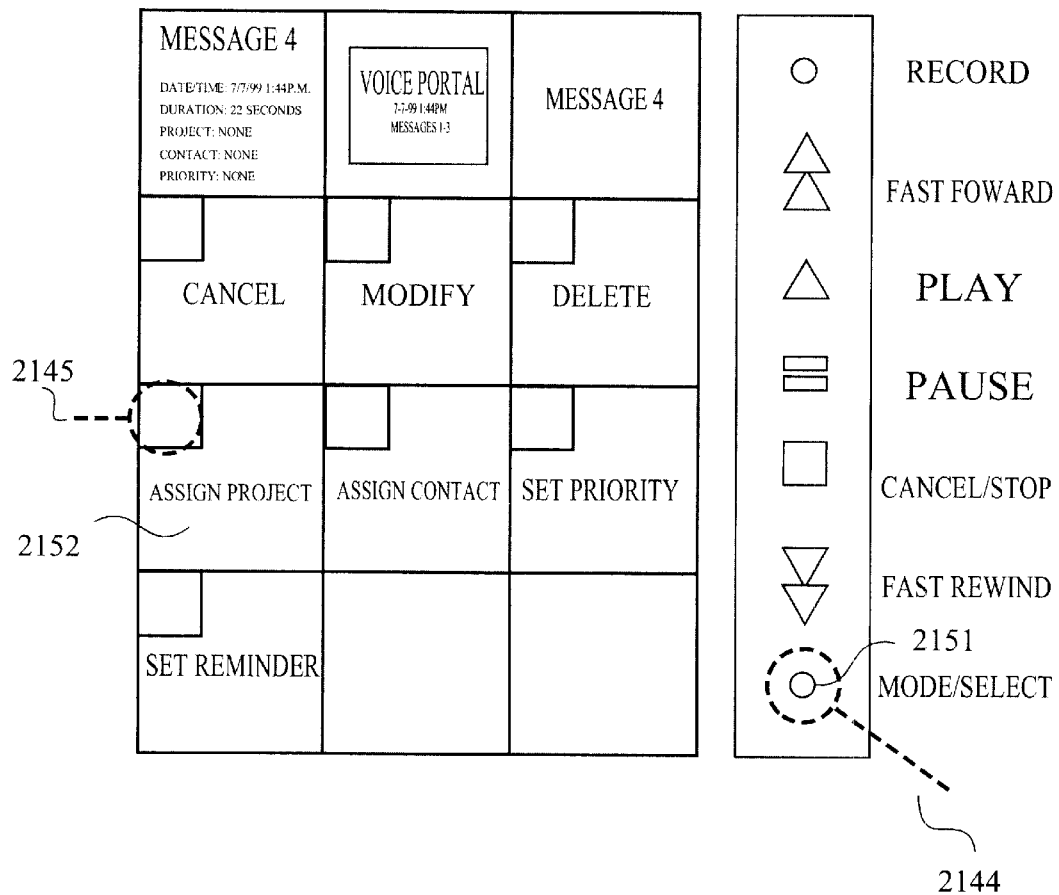

Turning now to a final set of figures, FIGS. 12A through 12T, we will demonstrate use of the invention to accommodate a variety of devices and information programming commonly available to consumers: a television, a video-cassette-recorder (VCR; perhaps integrated with the television), and a keypad (on a remote control for the television, or on a telephone linked to the television over a wideband network). The invention provides a unifying interface enabling the user to both browse and act upon information. FIG. 12A shows a television screen being used for presentation. Presumably, the user may have been watching television (with the video content taking up the entire screen), and then have invoked the invention by touching a suitable control on a remote control device or by giving a voice command to an AUI device. At that point the grid layout (representing the best mode but not the only implementation of the invention) appears on the screen as shown in FIG. 12A, showing (by reference to the items in the IDENTITY area 2230 and the CONTEXT area 2240) the relationship of the user's current viewing screen to the hierarchy of information available for presentation. Not only is a television screen being used for presentation, but the television also serves as a content entry point for information accessible through television programming sources. Appropriately, this entry point is labeled "TV Portal" in reference to the preset classification system developed by the television services provider and adopted for use in this implementation of the invention.

IDENTITY area 2230 shows the user's position within a hierarchy of information, and indicates that "TV Portal" is at the top of that hierarchy, representing hundreds of channels, with the next level down in the hierarchy being channel groupings such as channel group "200–340", as shown in IDENTITY area 2230. The user could have begun at "TV Portal" and then moved (by successively invoking the clarify down function) to channel group "200–340" and then (as shown in CONTEXT area 2240) to "Travel Channel 233". Nothing is contained in DESIRE area 2220, indicating that no memorized units of information are pending action. Note that because of the aspect ratio on the television screen, and because the DESIRE, IDENTITY and CONTEXT areas are being displayed across the top, these three areas are rectangular, being about twice as wide as they are high. Similarly, CONTENT area 2210 is also rectangular. While this rectangular layout may be pleasing to a user, it reflects a design choice that does not touch upon the invention.

The contents of CONTENT area 2210 is a video "Visiting Washington" being shown on the travel channel 233 (as shown in CONTEXT area 2240). Thus, consistent with the invention, the CONTENT sub-areas may be understood as a temporal sequence of video frames. If the user is interested in doing something with the "Visiting Washington" video, he may invoke the memorize operation of the invention if a memorize option is available in accordance with the structure of the information, for example, as shown by the marked rectangle in the upper left of the CONTENT area in FIG. 12B. This operation may be implemented using a MEMORIZE button (as shown in FIG. 8F) on a remote control device or by giving a verbal command (e.g. "Memorize!") to an AUI device. One or the other of these implementations may be a suitable design choice, but only the function itself touches upon the invention. However invoked, selection of the memorize operation is represented in FIG. 12B by selection paddle 2101.

The result of the memorize operation is shown in FIG. 12C. The video "Visiting Washington" is now playing in DESIRE area 2220 and the CONTENT area has been filled (overlayed) with a series of action choices, in the form of a VCR control panel. Note that the CONTENT area and the DESIRE area are highlighted with a dotted line, conveniently indicating to the user that an overlay is active. Note also that those control panel functions which are available for selection are shown in black and those functions unavailable are grayed out. This is in accordance with accepted conventions.

The user might choose to further clarify one of the available action options. For example, the user could select "Quick Skip" 1251 and, in accordance with the invention, the "Quick Skip" information item would move to the CONTEXT area, where it could be selected again to display a context overlay of properties, such as the length of time set for skipping. If acting to change this setting were an option, a memorize indicator would be present for selection if the user wished to change this setting, bringing up a desire overlay for determining whether activation of the "Quick Skip" button should skip 30 seconds of video or 15 seconds or 45 seconds. Alternatively, those who structure the hierarchy of information and desire and context overlays of the information in accordance with the invention could provide for the same user choice by a different route. For example, in response to user selection of the memorize indicator 1252 in FIG. 12C, there could be provided to the user a desire overly of further options allowing the user to select whether the memorized "Quick Skip" should skip 30 seconds of video or 15 seconds or 45 seconds. This approach would require the user to select a skip time for each election of the "Quick Skip" action option, and some might find this disadvantageous. However, these various alternatives for structuring of the information hierarchy and desire and context overlays are matters of design choice and do not touch upon the invention.

However, as shown in FIG. 12C, the user chooses to record (replicate) the video clip to his VCR, as indicated by the selection paddle 2102. Upon this action, the memorization process is complete and the display returns to its prior position (FIG. 12B) as shown in FIG. 12D. At this point the user decides to move back up the information hierarchy by selecting the "TV Portal" icon in the IDENTITY area, as shown by selection paddle 2103 in FIG. 12D. In this implementation of the invention, visually distinguishable information units in the IDENTITY area's LIFO queue are individually selectable, permitting the user to move more quickly back up the hierarchy.

The result of selecting the "TV Portal" icon in the IDENTITY area is movement of that icon to the CONTEXT area and display of channel ranges in the CONTENT area, as shown in FIG. 12E. The user sees channel group "595–599 Adult" and wants to censor all adult movies from the service provider's preset offerings so children in the house cannot view them. In order to accomplish this action, the user executes the memorize function as indicated by selection paddle 2104 in FIG. 12E. This results in moving the "595–599 Adult" icon into the DESIRE area as shown in FIG. 12F. Note that the memorize indicator (the upper left corner rectangle in the CONTENT sub-area) for the "595–599 Adult" information item is no longer present. The user then acts by invoking the replicate function, indicated in FIG. 12F by the selection paddle 2105 inside the REPLICATE area within the DESIRE area. This brings up an overlay of action options, shown in FIG. 12G. The user chooses to memorize the "Set Locks" option, as indicated by the selection paddle 2106 in FIG. 12G. This moves the "Set Locks" information item into the DESIRE area along with the "595–599 Adult" information item, as shown in FIG. 12H. The user then chooses to memorize "All" 2107 which then locks all the adult channels from further viewing.

In this implementation of the invention, the "Set Locks" and "595–599 Adult" information items are shown in the DESIRE area as a combined item rather than as separate information items. This is a design choice which does not touch upon the invention. Note that in FIGS. 12G and 12H the CONTENT and DESIRE areas are circumscribed by a dotted line, indicating that an overlay is active. This highlighting approach is a convenient reminder to the user, but is also a design choice not required to implement the invention.

Turning now to FIGS. 12J and 12K, there is shown how the invention may be applied to a personalized Internet portal, within a broader category of personalized information. FIG. 12J shows "My Stuff" in IDENTITY area 1261 and "My Portal" in CONTEXT area 1262, reflecting a sequence of clarify down operations upon "My Stuff" and then "My Portal". The user executes another clarify down operation upon "My Travel" as shown by the selection paddle 2120. Note that in a typical Internet environment the user will have available standard graphical user interface (GUI) features which may conveniently be mapped to the presentation elements and control structures of the invention. The circumstances of a particular implementation may also allow use of a touch based display screen or an Audio User Interface (AUI) in this mapping.

FIG. 12K shows (by the addition of items to the IDENTITY area) the result of a further sequence of clarify down operations by the user upon the information units "Washington DC", "Tourist Attractions", "Landmarks" and, finally, "Lincoln Memorial". The CONTENT area of FIG. 12K shows text and a small photograph, as might be displayed on an Internet WEB page. If the text in the information item did not fit on one page, a scroll bar could be provided. Scrolling features available with WEB technology may provide attractive design choices for display of the content of information items in a hierarchy, and may be selectable from a property overlay as an alternative display methodology. But these alternatives are mere design choices which do not limit application of the invention.

The user, by selecting CONTEXT area 1263, could bring up a context overlay showing directions to the Lincoln Memorial, address, parking facilities, operating hours, accessibility and other "properties" of the Memorial. Similarly, a desire overlay could be provided to telephone for information to an agency handling the site, in order to buy tickets for an exhibit or a tour package, or to link to a restaurant to accommodations. These aspects are particular to the content and structure of the information, as that content and structure may be developed by service providers or others (including the user if provided with appropriate tools).

Turning now to FIGS. 12L–12P there is shown how the invention may be implemented on a small handheld organizer. FIG. 12L shows within a CONTENT area 2210 a first layer. of information categories below the information unit "My Stuff" shown in CONTEXT area 2240. The user executes a clarify down operation on the "Contacts" information item, as indicated by selection paddle 2130. This causes the "Contacts" item to move into the CONTEXT area, replacing the "My Stuff" item which is moved to the IDENTITY area LIFO queue and shown in the IDENTITY area 2230. As displayed in the CONTENT area of FIG. 12M, the layer of information units which are children to the "Contacts" parent are names and phone numbers. These are displayed in a list form, rather than in an array. Furthermore, the list may be scrolled by activating a scroll bar as indicated by selection paddle 2132. This feature is a design choice, but could be selectable by the user from an overlay.

We will now show how a keyword search could be invoked in conformity with the invention. The user invokes a context overlay by selecting the "Contacts" item 2131 in the CONTEXT area. The context overlay is shown in FIG. 12N, where the user memorizes "Keywords" as indicated by selection paddle 2133. If a keyword search is the only action available for the "Keywords" unit of information, the search criteria for the "Contacts" list would be displayed immediately in the CONTENT area, as shown in FIG. 12P. If multiple actions are available for "Keywords", these actions would be displayed for user choice and the display shown in FIG. 12P would then follow user selection of a "search" option.

In FIG. 12P, the user enters the name "Emily" 2135, who is a friend. This could be done with a stylus and handwriting conversion software or with an on-screen alphanumeric keyboard (not shown) overlayed in the CONTENT area. The user then executes a memorize operation on this form, as shown by the selection paddle 2134. If "Emily" is on the list, this will conclude the desire overlay and return the display to that shown in FIG. 12M, except that the list of names shown will be only those with a first name of "Emily". It will be readily understood that the form like that shown in the CONTENT area of FIG. 12P could be used as a data entry form, accessible from an "enter new contact" action option. For example, such an action option could have been an alternative to the "search" option in a "Keywords" desire overlay as suggested above.

Turning now to FIGS. 12Q–12T there is shown how the invention may be implemented on a digital voice recorder. This example shows how information can be created and assigned properties for later retrieval in accordance with the invention. The digital voice recorder has a set of hardware controls 2150 and a small display screen 2160. However, it does not have a keyboard, touch screen, stylus or voice command capability. The user operates the recorder via the hardware controls 2150. One of those controls—Mode Select 2151—enables the user to select the CONTENT, CONTEXT, IDENTITY and DESIRE areas on the display screen 2160. The Mode Select button 2151 can distinguish a short push and a long push. With each short push, an indicator (e.g. a highlight or flashing of the display) moves sequentially (e.g. top to bottom and right to left) through the various presentation areas on the display screen 2160. A long push selects the area having the indicator. The voice currently holds three messages. Each message is a unit of information. Consequently, there is a very simple single layer structure for this information.

The user desires to record a new message, and pushes the "Record" button on the digital voice recorder's control panel, as shown by selection paddle 2140 in FIG. 12Q. Note that the CONTEXT area 2240 contains the "Voice Portal" unit that is parent to any messages stored in the recorder. The message which the user desires to create is assigned "Message 4", which appears in the DESIRE area.

Note that the display under "Voice Portal" in the CONTEXT area 2240 also indicates that there are currently three messages stored in the recorder. Also note that the "Record" symbol (a red dot) used on the recorder control bar 2150 also appears in the area 2205 designated as the memorization indicator. The CONTENT area shows the progress of the message being recorded, in real time, including a volume indicator and a duration indicator. These features are convenient feedback to the user, but are design choices which do not touch upon the invention.

When finished recording the message the user pushes the "Stop" button on the digital voice recorder's control panel, as shown by the selection paddle in FIG. 12R. Momentarily—long enough to provide feedback to the user confirming that the "Stop" button has been pushed—a symbol for the "Stop" button appears in the CONTENT area. Then, since creation of the new message has been completed, the desire overlay is removed, the new information unit—Message 4—is automatically selected (i.e. the clarify down operation is invoked). This causes "Message 4" to be moved to the CONTEXT area 2240, "Voice Portal" to be moved from the CONTEXT area to the IDENTITY area 2230, and further detail about "Message 4" to be displayed in the CONTENT area 2210, as shown in FIG. 12S.

Note that there is no project name shown for "Message 4" in the details displayed in CONTENT area 2210 in FIG. 12S. The user desires to assign a project name. In order to do this, the user pushes the "Mode Select" button 2151 (as indicated by the selection paddle 2142) with short pushes until the memorize indicator for the CONTENT area containing "Message 4" is highlighted. Then the user makes a long push on "Mode Select" button 2151. This brings into the CONTENT area a desire overlay for the action options available, as shown in FIG. 12T. At this point the user again uses the "Mode Select" button 2151 (as indicated by the selection paddle 2143) to memorize the "Assign Project" action option 2152. This would cause another overlay to be displayed in the CONTENT area, showing the projects 1 through 9 that are programmed into the digital voice recorder. The user would select one of these using the "Mode Select" button in the manner described above, which would complete the desire overlay sequence and return the display to that shown in FIG. 12S, except that the "Project" field would contain the project number selected by the user.

At various points in the foregoing detailed description of the invention reference has been made to alternative embodiments not using the preferred three-by-three grid for display of CONTENT. Turning now to FIG. 10B there is shown an implementation of the invention using a circular display motif. In this implementation the CONTENT area is an outer ring 150, the DESIRE area is an intermediate ring 160, and the CONTEXT and IDENTITY areas are included in an inner circle 170. Within content ring 150 are content sub-areas which are in the form of circles 151. Within each circle 151 is a selection area 152 for CLARIFICATION and a smaller selection area 153 for MEMORIZATION. It will be evident to those skilled in the art that the CONTENT area could equally well have been divided into a number of ring segments rather than circles without materially altering implementation of the invention.

There is shown within the DESIRE intermediate ring 160 a number of smaller circles 161 which represent information items that have been memorized and await action. It also will be evident to those skilled in the art that memorized information units could be represented by ring segments rather than circles. Selection anywhere within the DESIRE ring 160 has the same effect as described earlier with respect to the three-by-three grid for selection of the DESIRE area.

At the center of inner circle 170 is a CONTEXT area circle 171. In the dictionary example shown, note that the range shown for the information item "A–Z" in the CONTEXT circle 171 encompasses the sub-ranges ("A–C", "D–F", "G–I", "J–K", "L–N", "R–T", "U–W", and "X–Z") contained in the content sub-areas in CONTENT outer ring 150. This reflects the relationship described earlier between an information item shown in the CONTEXT area 171 and the information units contained in the next level down in the hierarchy, which are displayed in the CONTENT area 150.

The remaining functionality for the invention is to be able to navigate back up the hierarchical tree and to use an overlay to consider the properties associated with the information item contained in the CONTEXT area 171. These functions are accomplished, in the example shown in FIG. 10B, by selecting the CONTEXT area 171 or the area 172 which is within inner circle 170 but outside CONTEXT area 171. Note that this is the reverse of prior examples, where navigation back up the hierarchical tree was accomplished by selecting an IDENTITY area, and selection of the CONTEXT area triggered presentation of a context overlay in the CONTENT display area. As will be appreciated by those skilled in the art, the invention is characterized by interrelated functions each of which are invoked in accordance with selection rules which are well defined for a particular implementation of the invention, but these selection rules involve design choices which provide functionally equivalent alternatives which do not materially alter operation of the invention.

Figure 11A:
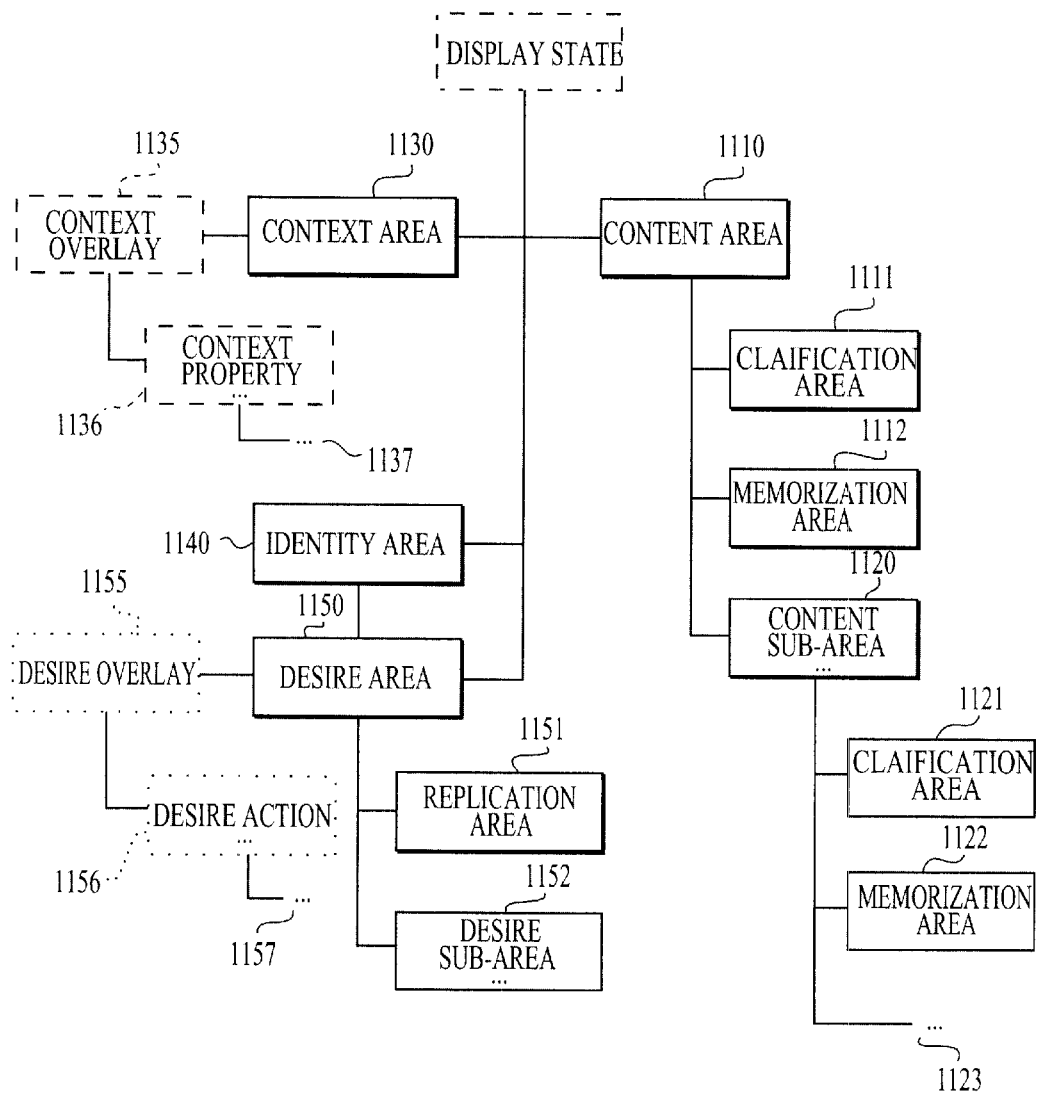
FIGS. 11A through 11E is a series of charts showing the functions of the invention.

This functional equivalence of alternative implementations may be better understood with reference to FIGS. 11A–11E, to which we now turn. FIG. 11A shows the presentation elements and user control elements of the invention, as described above in connection with FIG. 8L but arranged in the form of a chart. On the right side of the chart is shown CONTENT area 1110, within which may be contained one or more CONTENT sub-areas 1120 for display of information units in a level of a hierarchy of information. Each information unit in a displayed level may be parent to a further level 1123 of the information hierarchy. In the best mode of implementation, each CONTENT sub-area is also selectable by the user to activate particular functions of the invention, i.e. each CONTENT sub-area has an area 1121 selectable for a CLARIFICATION process (the clarify down function) and an area 1122 selectable for a MEMORIZATION process (the memorize function). In some implementations (e.g. as shown in FIG. 8F) the user control structures for these functions may be implemented through an area not associated with particular CONTENT sub-areas, as represented on FIG. 11A by clarification area 1111 and memorization area 1112, and as described in FIG. 8F as a CLARIFY button 810 and a MEMORIZE button 820, respectively.

On the left side of FIG. 11A is shown a CONTEXT area 1130, an IDENTITY area 1140 and a DESIRE area 1150. In the best mode of implementation of the invention, these areas represent i) visual space for the display of the unit of information (in the CONTEXT area 1130) which is parent to the level of information displayed in CONTENT sub-areas 1120, ii) the navigation history (in the IDENTITY area 1140) of the CLARIFICATION process, and iii) the units of information collected (in DESIRE sub-areas 1152) by the MEMORIZATION function. There is also shown a context overlay 1135 of one or more context properties 1136, which may be arranged in a hierarchy (as indicated by the dotted formalism 1137). Similarly, there is shown a desire overlay 1155 for choosing between desire actions 1156, which may also be arranged in a hierarchy (as indicated by the dotted formalism 1157). Note that the context overlay boxes 1135 and 1136 are bounded by a dashed line and the desire overlay boxes 1155 and 1156 are bounded by a dotted line, consistent with the formalism used in FIGS. 5, 6, 7 and 9 for displaying overlays. It should also be noted that comparable methods of distinguishing between overlays could be applied where the CONTENT sub-areas used for overlays make use of non-visual protocols (e.g. an auditory and temporal combination as described earlier in connection with FIG. 8L). Finally, there is shown a REPLICATION area 1151 which is selectable by the user.

Figure 11B:
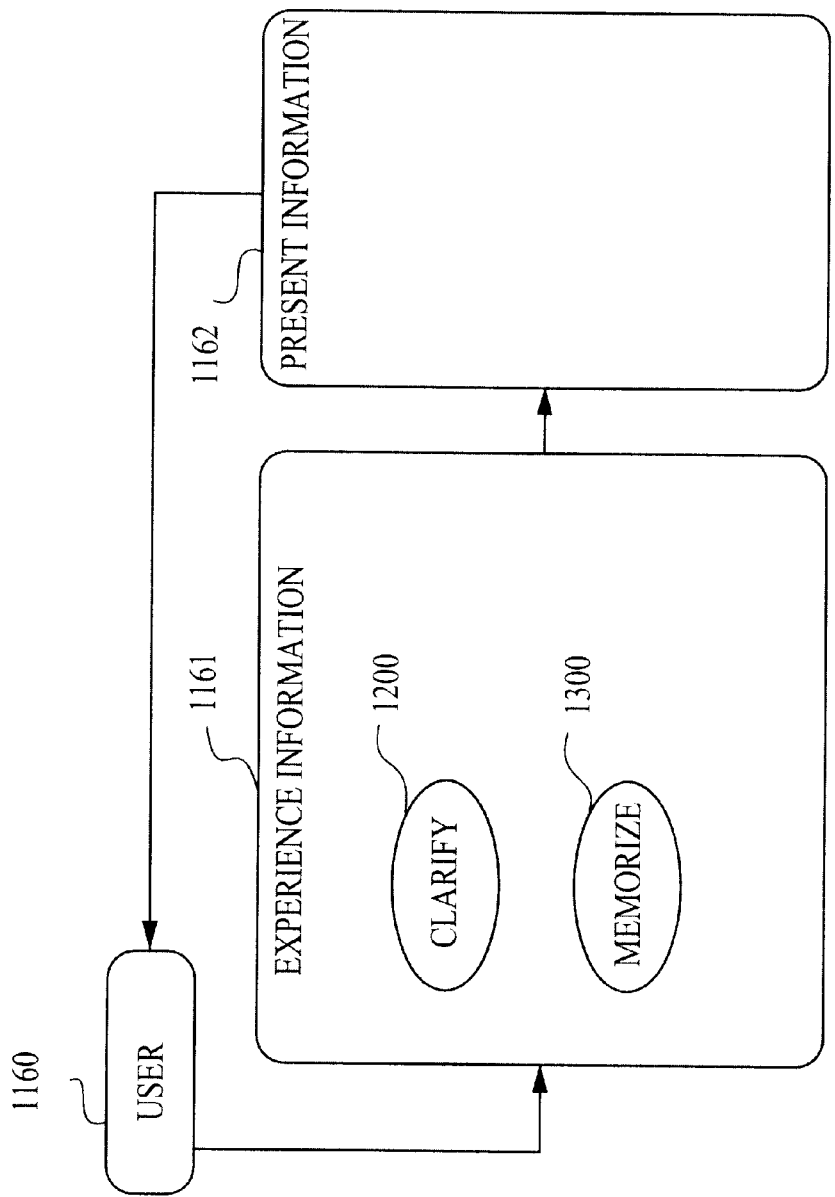

Operation of the invention may be further understood with reference to FIG. 11B. A user 1160 experiences information 1161 presented 1162 in accordance with the presentation structures of the invention outlined in FIG. 11A. In response thereto, having in mind certain objects, and in accordance with the control structures of the invention (i.e. the particular protocol in a given implementation through which the user invokes the functions of the invention), the user seeks to use the CLARIFY 1200 and MEMORIZE 1300 processes of the invention to find a mirror image of the objects which the user has in mind.

Figure 11C:
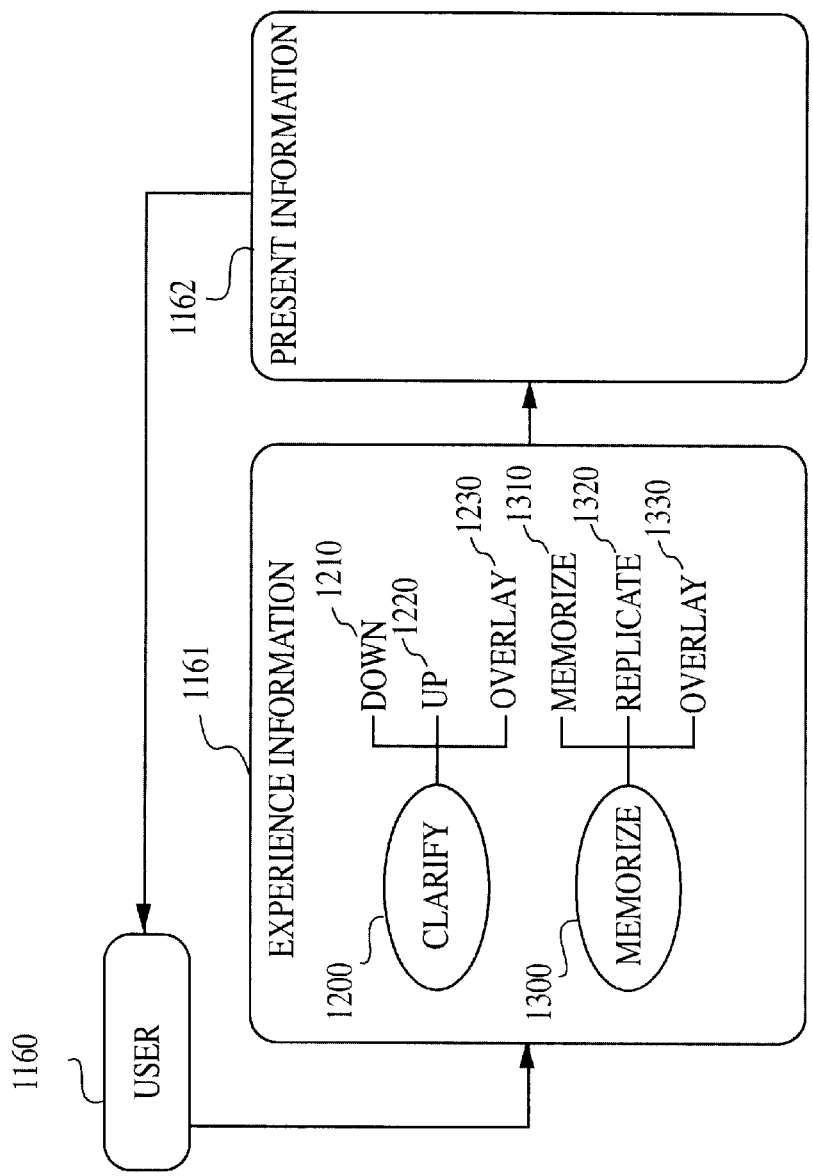
Figure 11D:
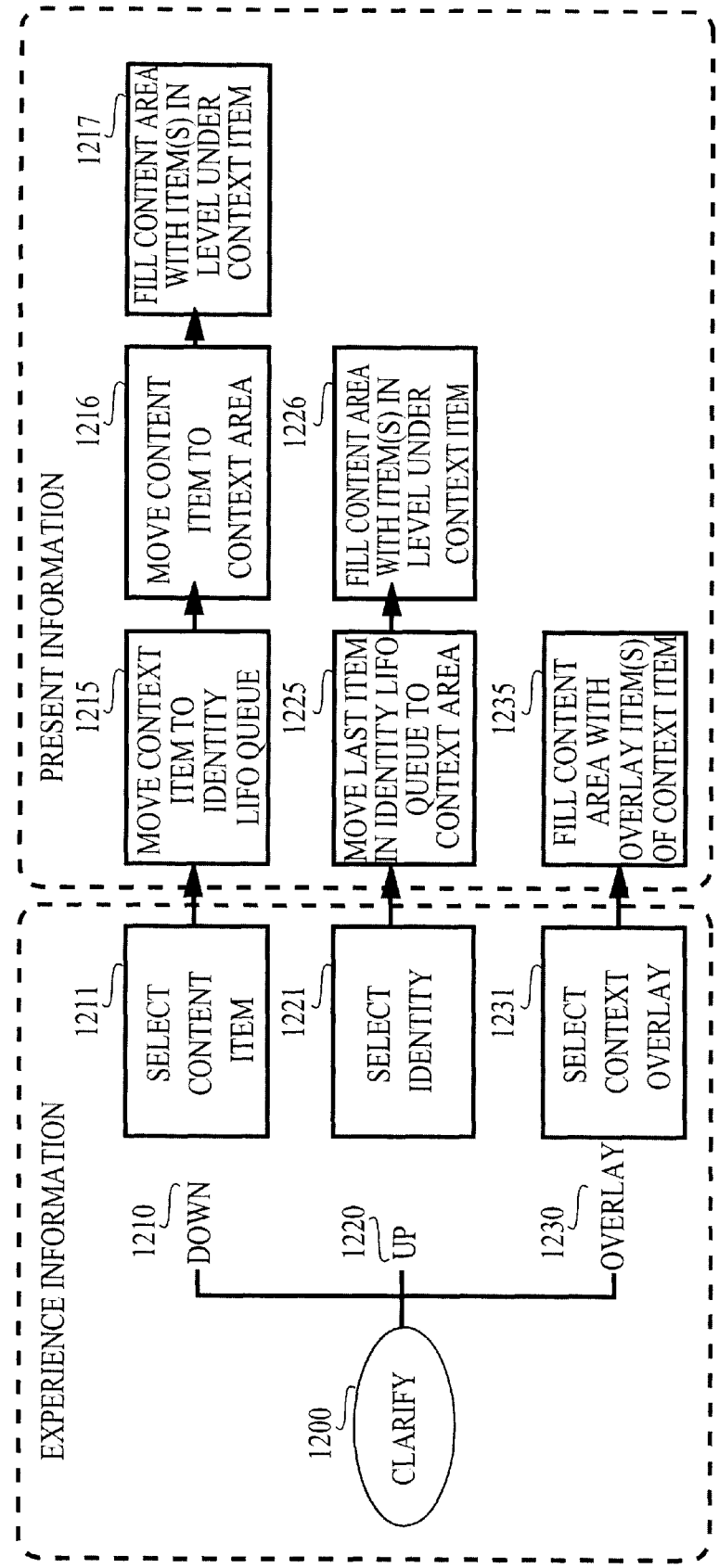
Figure 11E:
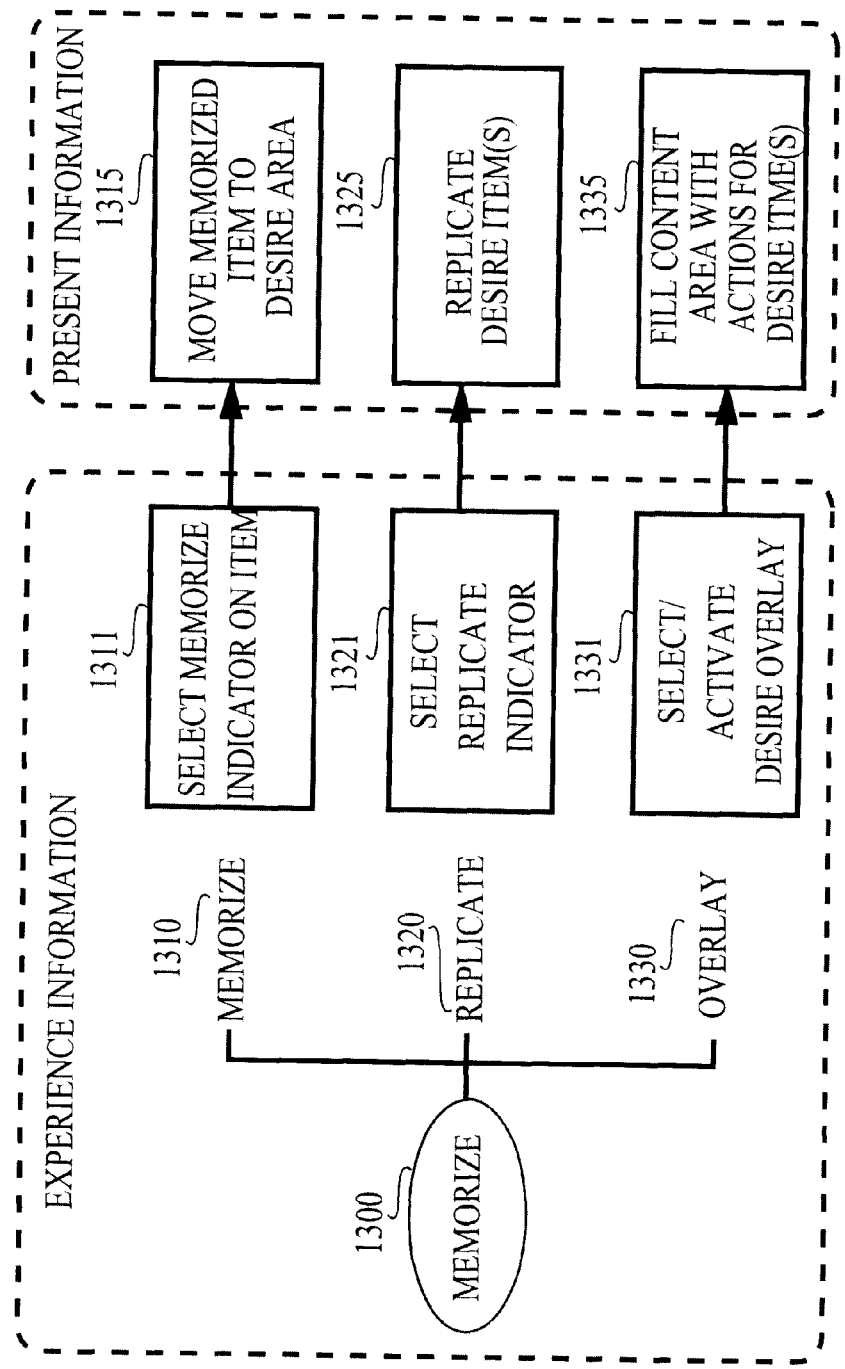

These functions of the invention are identified in FIG. 11C and shown in greater detail in FIGS. 11D and 11E. The CLARIFY process 1200 is comprised, minimally, of functions for navigating down 1210 and up 1220 through an information hierarchy and, optimally, for applying a context overlay 1330 for filtering the information in the hierarchy. The MEMORIZE process 1300 is comprised, minimally, of functions for memorizing 1310 selected units of information which mirror the content of the user's desire and then, when the user 1160 considers that a sufficient mirror content has been found, acting upon the memorized units by replication 1320; optimally, the MEMORIZE process 1300 also includes a function for applying a desire overlay 1330 for choosing among alternative actions. After each function is invoked, the presentation 1162 is altered and the user 1160 experiences 1161 the revised information, and then the user 1160 can continue the process by invoking another function.

With respect to each function, the user is provided (through a particular implementation protocol established in accordance with the invention) with a means for invoking the function, whereupon the presentation 1162 is altered, as will now be described with reference to FIGS. 11D and 11E. FIG. 11D is a detailed flow chart of the CLARIFY process 1200. Clarify down 1210 is invoked in the best mode of implementation by user selection 1211 of the CONTENT sub-area displaying the content item. In other implementations of the invention, the user control protocol for the clarify down function 1210 may in some other way associate the CLARIFY function with a particular unit of information, for example, by use of a temporal sequence and a CLARIFY button as shown in FIG. 8F or by use of an auditory and temporal combination as suggested in connection with FIG. 8L. However invoked, when the clarify down function 1210 is selected, the presentation is altered: first, if there is an item in the CONTEXT area (i.e. the parent item for the level displayed in the CONTENT area), that item is moved 1215 to the IDENTITY LIFO queue; second, the selected content item is moved 1216 to the CONTEXT area; and third, the CONTENT area is filled 1217 with the information items in the level under the selected content item which is now the parent item shown in the CONTEXT area.

Clarify up 1220 is invoked in the best mode by user selection 1221 of the IDENTITY area. In other implementations of the invention, the user control protocol for the clarify up function 1220 may in some other way allow the user to select the services of the IDENTITY LIFO queue, for example, by use of an arrow button as shown in FIG. 8F or by use of an auditory control as suggested in connection with FIG. 8L. However invoked, clarify up 1220 causes the last item in the IDENTITY LIFO queue to be moved 1225 back to the CONTEXT area; also, the CONTENT area is then filled 1226 with the information items in the level under the item which has been moved back to the CONTEXT area.

Overlay 1230 is invoked in the best mode by user selection 1231 of the CONTEXT area, which causes the CONTENT area to be filled 1235 with overlay items associated with the item in the CONTEXT area. These overlay items may be arranged in a hierarchy and may be operated on by the CLARIFY 1200 and MEMORIZE 1300 processes in the same manner as described herein for any other body of information arranged in a hierarchy, except that it is a design choice whether to allow the context overlay function to operate when a context overlay is active, because in certain circumstances (such as use of the context overlay to handle properties applicable across all units in a hierarchy) the overlay function 1230 will have no effect since the context overlay is already active.

FIG. 11E is a detailed flow chart of MEMORIZE process 1300. Memorize 1310 is invoked by user selection 1311 of a memorize indicator applicable to an item displayed in a CONTENT sub-area. Not every item in a CONTENT sub-area may have an applicable memorize indicator. In the best mode of implementation, a memorize indicator would be an area marked in the upper left corner of a CONTENT sub-area in a three-by-three grid. Replicate 1320 may be invoked by user selection of a replicate indicator, which in the best mode of implementation would be an area marked in the upper left corner of the DESIRE area. Replicate 1320 may also happen automatically following activation of a memorize indicator. While it is possible to implement the invention otherwise, a preferred embodiment would act automatically if no user choice between multiple alternatives is available.

Overlay 1330 is typically invoked automatically when alternate choices for action are available to the user immediately following activation of a memorize function or a replicate function. Activation of the overlay 1330 causes the CONTENT area to be filled 1335 with overlay items associated with the item(s) which have been memorized to the DESIRE area. These overlay items may be arranged in a hierarchy and may be operated on by the CLARIFY 1200 and MEMORIZE 1300 processes in the same manner as described herein for any other body of information arranged in a hierarchy. Indeed, an implementation of the invention may involve recursive application of context overlays upon desire overlays.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A user interface, comprising:
   means for displaying a body of information for a user;
   means for said user to clarify units of information in said body of information, said clarifying being to use a CLARIFICATION process to find one or more of said units of information, said CLARIFICATION process being a group of CLARIFICATION functions for navigation through said body of information and being invoked by user designation of display elements presented to said user by said displaying means; and
   means for said user to memorize said units of information, said memorizing being to invoke a MEMORIZATION process upon said one or more found units of information, said MEMORIZATION process being initiated by user designation of MEMORIZATION display elements presented to said user by said displaying means, and being consummated by an action denoted by one or more of said found units of information,
   wherein said body of information is organized into layers, each said layer being subordinate to a unit of information in another layer and each of said units of information being part of one or more of said layers, each said layer capable of being part of a plurality of hierarchies,
   wherein said displaying means includes a content area for displaying one of said layers containing one or more of said units of information,
   wherein said content area is divided into one or more content sub-areas as necessary for conveniently displaying said units of information, and
   wherein said clarifying means further comprises:
      means for selecting one of said displayed units of information; and
      means for subsequently displaying in said content area a layer of said body of information which is subordinate to said selected unit of information, said subsequent display of said subordinate layer thereby replacing said display of said layer,
      means for subsequently displaying in said content area a layer of said body of information which is subordinate to said selected unit of information, said subsequent display of said subordinate layer thereby replacing said display of said layer,
      further comprising a navigational control for subsequent redisplay in said content area of the layer most recently replaced by said clarifying means.

2. The interface of claim 1, further comprising context overlay means for said user to clarify and memorize properties of said units of information.

3. The interface of claim 1, further comprising desire overlay means for said user to clarify and memorize alternative choices for said memorized units of information.

4. The interface of claim 1, further comprising:
   context overlay means for said user to clarify and memorize properties of said units of information; and
   desire overlay means for said user to clarify and memorize alternative choices for said memorized units of information.

5. A user interface, comprising:
   means for displaying a body of information for a user;
   means for said user to clarify units of information in said body of information, said clarifying being to use a CLARIFICATION process to find one or more of said units of information, said CLARIFICATION process being a group of CLARIFICATION functions for navigation through said body of information and being invoked by user designation of display elements presented to said user by said displaying means; and
   means for said user to memorize said units of information, said memorizing being to invoke a MEMORIZATION process upon said one or more found units of information, said MEMORIZATION process being initiated by user designation of MEMORIZATION display elements presented to said user by said displaying means, and being consummated by an action denoted by one or more of said found units of information, wherein said body of information is a hierarchy of said units of information, said hierarchy being multi-hierarchical and having layers, wherein said displaying means includes a content area for displaying a layer of said multi-hierarchy, said layer containing one or more of said units of information, wherein said content area is divided into one or more content sub-areas as necessary for conveniently displaying said units of information, and wherein said clarifying means further comprises:

means for selecting one of said displayed units of information; and means for subsequently displaying in said content area a layer of said multi-hierarchy which is subordinate to said selected unit of information, said subsequent display of said subordinate layer thereby replacing said display of said layer, further comprising a navigational control for subsequent redisplay in said content area of the layer most recently replaced by said clarifying means.

6. The interface of claim 5, wherein said memorizing means further comprises means for selecting a memorization indicator, said memorization indicator being associated with a displayed unit of information.

7. The interface of claim 6, wherein said memorizing means further comprises means for acting upon said selected units of information.

8. The interface of claim 6, wherein said memorizing means further comprises optional means for collecting one or more of said selected units of information prior to activation of said acting means.

9. The interface of claim 8, wherein said acting means are activated automatically.

10. The interface of claim 8, wherein said acting means operates upon said body of information.

11. The interface of claim 8, wherein said acting means operates to connect said interface to an external system.

12. The interface of claim 8, wherein said acting means further comprise a user selectable replication indicator.

13. The interface of claim 12, wherein said navigational control is a last-in-first-out identity area.

14. The interface of claim 13, wherein said identity area contains representations of successively selected and clarified units of information, moved successively upon clarification into a context area and then into said identity area, and moved successively upon selection of said identity area out of said identity area into said context area.

15. The interface of claim 14, wherein said representations of units of information contained in said identity area are arranged in a symmetrical array.

16. The interface of claim 14, wherein said memorization indicator is a small area of said sub-area.

17. The interface of claim 16, wherein said selection is made by touching in said small area.

18. The interface of claim 16, wherein said selection is made by clicking a pointing device in said small area.

19. The interface of claim 16, wherein said content area is a two-dimensional array of said content sub-areas, said array having an equal number of said content sub-areas along each of said dimensions.

20. The interface of claim 19, wherein said array is a three-by-three array of said content sub-areas, each said sub-area being a square.

21. The interface of claim 19, wherein said context area has the dimensions of said content sub-area and is positioned above the rightmost column of said three-by-three array, said desire area has the dimensions of said content sub-area and is positioned above the leftmost column of said three-by-three array, and said identity area has the dimensions of said content sub-area and is positioned between said context area and said desire area.

22. The interface of claim 16, wherein said content area is a symmetrical array of said content sub-areas.

23. The interface of claim 22, wherein said array is symmetrical about a center point.

24. The interface of claim 19, wherein said memorization indicator small area is positioned within said sub-area such that the relationship of said small area to said sub-area is the same as the relationship of said desire area to said content area.

25. The interface of claim 21, wherein said memorization indicator small area is an upper left corner of said sub-area.

26. The interface of claim 2, wherein said context overlay means further comprises means for initiating operation of said clarifying means and said memorizing means upon a hierarchy of properties associated with said clarified unit of information, wherein said body of information is a hierarchy of said units of information, said hierarchy being multi-hierarchical and having layers, and wherein said displaying means includes a content area for displaying a layer of said multi-hierarchy, said layer containing one or more of said units of information.

27. The interface of claim 26, wherein said context initiating means further comprises:

a context area for displaying the unit of information most recently clarified, said content area displaying a layer subordinate to said clarified unit; and means for selecting said context area;

wherein said context overlay means further comprises means, operable upon completion of said properties memorizing means, for redisplay in said content area of said layer subordinate to said clarified unit, as filtered by said properties memorized and acted upon.

28. The interface of claim 8, further comprising:

context overlay means for said user to clarify and memorize properties of said units of information; and desire overlay means for said user to clarify and memorize alternative choices for said memorized units of information.

29. The interface of claim 28, wherein said context overlay means further comprises means for initiating operation of said clarifying means and said memorizing means upon a hierarchy of properties associated with said clarified unit of information.

30. The interface of claim 29, wherein said context initiating means further comprises:

a context area for displaying the unit of information most recently clarified, said content area displaying a layer subordinate to said clarified unit; and means for selecting said context area;

wherein said context overlay means further comprises means, operable upon completion of said properties memorizing means, for redisplay in said content area of said layer subordinate to said clarified unit, as filtered by said properties memorized and acted upon.

31. The interface of claim 30, wherein said acting means further comprise a user selectable replication indicator.

32. The interface of claim 31, wherein said navigational control is a last-in-first-out identity area.

33. The interface of claim 32, wherein said identity area contains representations of successively selected and clarified units of information, moved successively upon clarification into said context area and then into said identity area, and moved successively upon selection of said identity area out of said identity area into said context area.

34. The interface of claim 33, wherein said representations of units of information contained in said identity area are arranged in a symmetrical array.

35. The interface of claim 33, wherein said memorization indicator is a small area of said sub-area.

36. The interface of claim 35, wherein said content area is a two-dimensional array of said content sub-areas, said array having an equal number of said content sub-areas along each of said dimensions.

37. The interface of claim 28, wherein said desire overlay means further comprises means for initiating operation of said clarifying means and said memorizing means upon a hierarchy of alternative choices associated with units of information memorized but not acted upon.

38. The interface of claim 37, wherein said desire initiating means further comprises:
 a desire area for displaying said units of information memorized but not acted upon; and
 means for selecting said desire area.

39. The interface of claim 38, wherein said desire overlay means further comprises optional means, operable upon completion of said alternative choice memorizing means, for redisplay in said content area of said layer subordinate to said clarified unit.

40. The interface of claim 38, wherein said units of information memorized but not acted upon are displayed in a symmetrical array.

41. The interface of claim 39, wherein said acting means further comprise a user selectable replication indicator.

42. The interface of claim 41, wherein said navigational control is a last-in-first-out identity area.

43. The interface of claim 42, wherein said identity area contains representations of successively selected and clarified units of information, moved successively upon clarification into said context area and then into said identity area, and moved successively upon selection of said identity area out of said identity area into said context area.

44. The interface of claim 43, wherein said representations of units of information contained in said identity area are arranged in a symmetrical array.

45. The interface of claim 43, wherein said memorization indicator is a small area of said sub-area.

46. The interface of claim 45, wherein said content area is a two-dimensional array of said content sub-areas, said array having an equal number of said content sub-areas along each of said dimensions.

47. A user interface, comprising:
 a protocol for presenting a body of information to a user, said body being comprised of units of information, said presentation protocol using structural elements, each said element being distinguishable by said user from each other said element, at least one of said units of information being presented in at least one of said structural elements;
 a protocol for clarifying said body of information, said clarifying protocol having user operable functions, each said function being invoked by user designation of one or more of said structural elements, said designation of said one or more structural elements being uniquely associated with said function, operation of said functions being further associated with changes in presentation of said body of information through said structural elements; and
 a protocol for memorizing selected units of said body of information, said memorizing protocol having user operable functions, each said function being invoked by user designation of one or more of said structural elements, said designation of said one or more structural elements being uniquely associated with said function, operation of said functions being further associated with changes in presentation of said body of information through said structural elements,
 wherein said clarifying protocol is a CLARIFICATION process used to find one or more of said units of information by navigation through said body of information,
 wherein said memorizing protocol is a MEMORIZATION process consummated by an action denoted by said one or more found units of information
 wherein said body of information is organized into layers, each said layer being subordinate to a unit of information in another layer and each of said units of information being part of one or more of said layers,
 wherein said presentation protocol provides a content area for displaying one of said layers containing one or more of said units of information,
 wherein said content area is divided into one or more content sub-areas as each said layer capable of being part of a plurality of hierarchies, necessary for conveniently displaying said units of information, and
 wherein said clarifying protocol further provides:
  means for selecting one of said displayed units of information; and
  means for subsequently displaying in said content area a layer of said body of information which is subordinate to said selected unit of information, said subsequent display of said subordinate layer thereby replacing said display of said layer, and
  a navigational control for subsequent redisplay in said content area of the layer most recently replaced by said clarifying means.

48. The interface of claim 47, further comprising a context overlay for filtering said body of information, said context overlay applying said clarifying protocol to a body of property information and applying said memorizing protocol in order to select units of said body of property information for said filtering.

49. The interface of claim 47, further comprising a desire overlay for choosing among alternative action options with respect to said selected units of said body of information, said desire overlay applying said clarifying protocol to a body of action option information and applying said memorizing protocol in order to select units of said body of action option information for action.

50. The interface of claim 47, further comprising:
 a context overlay for filtering said body of information, said context overlay applying said clarifying protocol to a body of property information and applying said memorizing protocol in order to select units of said body of property information for said filtering; and
 a desire overlay for choosing among alternative action options with respect to said selected units of said body of information, said desire overlay applying said clarifying protocol to a body of action option information and applying said memorizing protocol in order to select units of said body of action option information for action.

51. The interface of claim 47, wherein said body of information is a hierarchy of said units of information, said hierarchy being multi-hierarchical and having layers.

52. The interface of claim 51, wherein said structural elements include
 a content area for displaying a layer of said multi-hierarchy, said layer containing one or more of said units of information;
 a context area for displaying a unit of information which is parent to said layer displayed in said content area; and
 an identity area for displaying a history of parents of said displayed layers.

53. The interface of claim 52, wherein said content area is divided into one or more content sub-areas as necessary for conveniently displaying said units of information.

54. The interface of claim 53, wherein said clarifying functions comprise:
   a clarifying down function, said down function being operable by user selection of one of said displayed units of information, said selected unit then being displayed in said context area, there being then displayed in said content area a layer of said multi-hierarchy which is child to said selected unit of information;
   a clarifying up function, said up function being operable by user selection of said identity area, there being then redisplayed in said content area the layer of said multi-hierarchy most recently replaced by said clarifying down function; and
   an optional context overlay function, operable by user selection of said context area, for displaying in said content properties associated with said parent unit displayed in said context area.

55. The interface of claim 54, wherein said structural elements include a desire area for collecting units of information selected by said user.

56. The interface of claim 55, wherein said memorizing functions comprise:
   a memorize function for moving a selected unit of information to said desire area;
   a replicate function for acting upon units of information collected in said desire area; and
   an optional desire overlay function for displaying in said content area alternative actions applicable to said collected units of information.

57. The interface of claim 56, wherein said memorize function is operable by user selection of a designated area within a content sub-area corresponding to said selected unit of information.

58. The interface of claim 56, wherein said memorize function is operable by sequential user selection, first, of a content sub-area corresponding to said selected unit of information and, second, of one of said structural elements designated for memorization.

59. The interface of claim 58, wherein said selected unit of information is displayed using a first structural element and said user selection is made using a second structural element.

60. The interface of claim 58, wherein said first structural element is a designated portion of a television screen and wherein said second structural element is a designated key on a telephone keypad, there being a unique correspondence evident to said user between said first structural element and said second structural element.

61. The interface of claim 56, wherein said replicate function is operable by user selection of a designated area within said desire area.

62. The interface of claim 56, wherein said replicate function is activated automatically following operation of said memorize function.

63. A method for finding, collecting and acting upon information, comprising the steps of:
   presenting a body of information, said body being comprised of units of information;
   clarifying said body of information, said clarifying being to use a CLARIFICATION process to find one or more of said units of information, said CLARIFICATION process being a group of CLARIFICATION functions for navigation through said body of information and being invoked by user designation of display elements presented to said user in said presenting step, said CLARIFICATION process enabling a user to find desired information; and
   memorizing selected units of said body of information, said memorizing being to invoke a MEMORIZATION process upon said one or more found units of information, said MEMORIZATION process being initiated by user designation of MEMORIZATION display elements presented to said user in said presenting step, and being consummated by an action denoted by said one or more found units of information, said MEMORIZATION process enabling said user to collect and act upon said desired information
   wherein said body of information is organized into layers, each said layer being subordinate to a unit of information in another layer and each of said units of information being part of one or more of said layers,
   wherein said presenting step provides a content area for displaying one of said layers containing one or more of said units of information, each said layer capable of being part of a plurality of hierarchies,
   wherein said content area is divided into one or more content sub-areas as necessary for conveniently displaying said units of information, and
   wherein said clarifying step further comprises the steps of:
      selecting one of said displayed units of information; and
      subsequently displaying in said content area a layer of said body of information which is subordinate to said selected unit of information, said subsequent display of said subordinate layer thereby replacing said display of said layer,
      wherein a navigational control is used for subsequent redisplay in said content area of the layer most recently replaced by said clarifying means.

64. The interface of claim 51, wherein said structural elements include
   a content area for displaying a layer of said multi-hierarchy, said layer containing one or more of said units of information; and
   a context area for displaying a unit of information which is parent to said layer displayed in said content area.

65. The interface of claim 64, wherein said content area is divided into one or more content sub-areas as necessary for conveniently displaying said units of information.

66. The interface of claim 65, wherein said clarifying functions comprise:
   a clarifying down function, said down function being operable by user selection of one of said displayed units of information, said selected unit then being displayed in said context area, there being then displayed in said content area a layer of said multi-hierarchy which is child to said selected unit of information;
   a clarifying up function, said up function being operable by user selection of one of said structural elements, there being then redisplayed in said content area the layer of said multi-hierarchy most recently replaced by said clarifying down function; and
   an optional context overlay function, operable by user selection of said context area, for displaying in said content area properties associated with said parent unit displayed in said context area.

* * * * *

UNITED STATES PATENT AND TRADEMARK OFFICE
CERTIFICATE OF CORRECTION

PATENT NO. : 6,583,800 B1
DATED : June 24, 2003
INVENTOR(S) : Ridgley et al.

It is certified that error appears in the above-identified patent and that said Letters Patent is hereby corrected as shown below:

Column 26,
Line 13, replace "layer" with -- unit of information --.
Lines 30-34, delete the paragraph.

Column 27,
Line 28, substitute "6" with -- 7 --.

Column 30,
Line 10, insert -- each said layer capable of being part of a plurality of hierarchies, --.
Lines 16-17, delete "each said layer capable of being part of a plurality of hierarchies,".

Column 32,
Line 18, insert -- each said layer capable of being part of a plurality of hierarchies, --.
Lines 21-22, delete "each said layer capable of being part of a plurality of hierarchies,".

Signed and Sealed this

Eleventh Day of April, 2006

JON W. DUDAS
*Director of the United States Patent and Trademark Office*